United States Patent
Miyazawa et al.

(10) Patent No.: US 6,844,032 B2
(45) Date of Patent: Jan. 18, 2005

(54) LIQUID CRYSTAL COMPOUNDS HAVING BIS(TRIFLUOROMETHYL) PHENYL RINGS, LIQUID CRYSTAL COMPOSITIONS AND LIQUID CRYSTAL DISPLAY DEVICES

(75) Inventors: Kazutoshi Miyazawa, Chiba (JP); Takashi Kato, Chiba (JP); Yasuhiro Kubo, Chiba (JP); Kanetsugu Terashima, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 107 days.

(21) Appl. No.: 10/108,712

(22) Filed: Mar. 29, 2002

(65) Prior Publication Data

US 2003/0077405 A1 Apr. 24, 2003

(30) Foreign Application Priority Data

Mar. 30, 2001 (JP) .................................. 2001-101796
Mar. 18, 2002 (JP) .................................. 2002-074735

(51) Int. Cl.[7] .................. C09K 19/30; C09K 19/34; C07D 239/02; C07D 213/78; C07D 319/06
(52) U.S. Cl. .............. 428/1.1; 252/299.61; 252/299.63; 252/299.66; 252/299.67; 544/303; 546/302; 546/303; 549/369; 570/127; 570/129; 570/185
(58) Field of Search ................ 252/299.61, 299.63, 252/299.66, 299.67; 544/303; 546/302, 303; 549/369; 570/127, 129, 185, 128; 428/1.1

(56) References Cited

FOREIGN PATENT DOCUMENTS

| DE | 43 38 348 | 5/1994 |
|---|---|---|
| DE | 43 36 391 | 4/1995 |
| DE | 195 31 135 | 2/1997 |
| DE | 101 57 670 | 6/2002 |
| DE | 101 57 674 | 6/2002 |
| EP | 0 184 012 | 6/1986 |
| EP | 0 844 295 | 5/1998 |
| EP | 0 949 232 | 10/1999 |
| JP | 11 349515 | 12/1999 |
| JP | 2001 114722 | 4/2001 |

*Primary Examiner*—Shean C. Wu
(74) *Attorney, Agent, or Firm*—Wenderoth, Lind & Ponack, L.L.P.

(57) ABSTRACT

The compound (1) having 2,3-bis(trifluoromethyl)-1,4-phenylene is stable chemically and has excellent miscibility with other liquid crystal compounds, large and negative dielectric anisotropy and proper optical anisotropy. A liquid crystal composition comprising the compound has large specific resistance and a large voltage holding ratio, and that the composition is useful for a liquid crystal display element. The compound (1) is represented by formula (1):

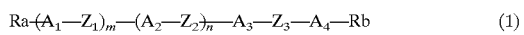

wherein Ra and Rb independently are alkyl having 1 to 20 carbons, any —$CH_2$— in the alkyl may be replaced by —O—, —S—, —CH=CH—, or —C≡C—, and any hydrogen may be replaced by halogen; $A_1$, $A_2$, $A_3$, and $A_4$ independently are 1,4-cyclohexylene, 1,4-cyclohexenylene, 1,3-dioxane-2,5-diyl, 1,4-phenylene, pyridine-2,5-diyl, pyrimidine-2,5-diyl, pyridazine-3,6-diyl, or 2,3-bis(trifluoromethyl)-1,4-phenylene, any hydrogen in these rings may be replaced by halogen, and at least one of $A_1$, $A_2$, $A_3$, and $A_4$ is 2,3-bis(trifluoromethyl)-1,4-phenylene; $Z_1$, $Z_2$ and $Z_3$ independently are a single bond, —$(CH_2)_2$—, —$(CF_2)_2$—, —COO—, —OCO—, —$CH_2O$—, —$OCH_2$—, —$CF_2O$—, —$OCF_2$—, —CH=CH—, —CF=CF—, —C≡C—, —$(CH_2)_4$—, —$(CH_2)_3O$—, or —$O(CH_2)_3$—; m and n independently are 0 or 1.

32 Claims, No Drawings

LIQUID CRYSTAL COMPOUNDS HAVING BIS(TRIFLUOROMETHYL) PHENYL RINGS, LIQUID CRYSTAL COMPOSITIONS AND LIQUID CRYSTAL DISPLAY DEVICES

TECHNICAL FIELD

This invention relates to a liquid crystal compound, a liquid crystal composition and a liquid crystal display element. More particularly, it relates to a new liquid crystal compound having 2,3-bis(trifluoromethyl)-1,4-phenylene, a liquid crystal composition comprising the compound, and a liquid crystal display element comprising the composition.

A technical term of a liquid crystal compound is used as a generic term for the compound having a liquid crystal phase and for the compound having no liquid crystal phase and being useful as a component of a liquid crystal composition. A liquid crystal compound(s), a liquid crystal composition(s) and a liquid crystal display element(s) maybe expressed herein simply as a compound(s), a composition(s) and an element(s), respectively. A compound (s) represented by formula (1) to formula (12) is expressed herein as a compound(s) (1) to a compounds) (12), respectively. In formulas (2) to (12), structural units such as B, D, E, and so forth surrounded by a hexagon express ring B, ring D, ring E, and so forth. Other hexagons are 1,4-cyclohexylene, 1,4-phenylene and pyrimidine-2,5-diyl.

A liquid crystal display element is classified into TN (twist nematic), TN-TFT (twisted nematic-thin film transistor), BTN (bistable twisted nematic), STN (super twisted nematic), IPS (in-plane switching), GH (guest host), DS (dynamic scattering), VA (vertical alignment), OCB (optically compensated bend), ECB (electrically controlled birefringence), PC (phase change), and so forth based on display a system.

For reducing consumption of electrical power in the element, driving voltage of the element is preferably low. Thus, a liquid crystal composition having a low threshold voltage is required. The threshold voltage (Vth) is represented by the following formula. See M. F. Leslie, Mol. Cryst. Liq. Cryst., 1970, 12, 57.

$$Vth = \pi (K/\epsilon_0 \Delta \epsilon)^{1/2}$$

In the formula, K is an elastic constant of a composition, $\epsilon_0$ represents an dielectric constant in a vacuum and $\Delta \epsilon$ is dielectric anisotropy. As is seen in the formula, there are two ways to decrease the threshold voltage, that is, increasing the dielectric anisotropy and decreasing the elastic constant. As it is not easy to control the elastic constant, the composition having large dielectric anisotropy is normally used. Accordingly, compounds having large dielectric anisotropy have been developed.

Another problem in the liquid crystal display element is a narrow viewing angle. IPS mode and VA mode were reported in 1995 and 1997, respectively, to improve it. See Symposium on Liquid Crystals, 2A07, 1995; ASIA DISPLAY '95, 557, 1995; ASIA DISPLAY '95, 1995; SID97 DIGEST, 1997, 845. In these modes, a composition having negative dielectric anisotropy and small optical anisotropy is used.

The first object of this invention is to provide a liquid crystal compound being stable chemically and having excellent miscibility with other liquid crystal compounds, large and negative dielectric anisotropy and proper optical anisotropy. The second object is to provide a liquid crystal composition comprising the compound and having large specific resistance and a large voltage holding ratio, and a liquid crystal display element comprising the composition.

SUMMARY OF THE INVENTION

The present inventors found that the compound (1) having 2,3-bis(trifluoromethyl)-1,4-phenylene is stable chemically and has excellent miscibility with other liquid crystal compounds, large and negative dielectric anisotropy and proper optical anisotropy. They also found that a liquid crystal composition comprising the compound has large specific resistance and a large voltage holding ratio, and that the composition is useful for a liquid crystal display element. An embodiment of this invention for attaining the objects is as follows. Preferable examples of terminal groups, rings and bonding groups in the compound (1) are also described.

1. A liquid crystal compound represented by formula (1):

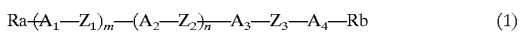

$$Ra-(A_1-Z_1)_m-(A_2-Z_2)_n-A_3-Z_3-A_4-Rb \quad (1)$$

wherein Ra and Rb independently are alkyl having 1 to 20 carbons, any —$CH_2$— in the alkyl may be replaced by —O—, —S—, —CH=CH—, or —C≡C—, and any hydrogen may be replaced by halogen.

An example is given for the meaning of "any —$CH_2$— in the alkyl may be replaced by —O—, —CH=CH—, and so forth". A part of the groups, when any —$CH_2$— in $C_4H_9$— is replaced by —O— or —CH=CH—, is $C_3H_7O$—, $CH_3$—O—$(CH_2)_2$—, $CH_3$—O—$CH_2$—O—, $H_2C$=CH—$(CH_2)_3$—, $CH_3$—CH=CH—$(CH_2)_2$—, and $CH_3$—CH=CH—$CH_2$—O—. As seen above, the term of "any" means "at least one selected indiscriminately". In consideration of stability of a compound, $CH_3$—O—$CH_2$—O— in which oxygen and oxygen are not adjacent is preferable to $CH_3$—O—O—$CH_2$— in which oxygen and oxygen are adjacent.

Preferable Ra or Rb is alkyl, alkoxy, alkoxyalkyl, alkoxyalkoxy, alkylthio, alkylthioalkoxy, alkenyl, alkenyloxy, alkenyloxyalkyl, alkoxyalkenyl, alkynyl, and alkynyloxy. These groups in which at least one hydrogen is replaced by halogen are also preferable. Preferable halogen is fluorine and chlorine. In these groups, a straight chain is preferable to a branched chain. Branched Ra or Rb is preferable when the compound (1) is optically active. Especially preferable Ra or Rb is alkyl, alkoxy, alkenyl, and alkenyloxy.

Preferable configuration of —CH=CH— in the alkenyl depends on the position of a double bond. Trans-configuration is preferable in the alkenyl such as 1-propenyl, 1-butenyl, 1-pentenyl, 1-hexenyl, 3-pentenyl, 3-hexenyl. Cis-configuration is preferable in the alkenyl such as 2-butenyl, 2-pentenyl, 2-hexenyl. Alkenyl having preferable configuration has a high clearing point or a wide temperature range of a liquid crystal phase. See Mol. Cryst. Liq. Cryst., 1985, 131, 109.

Concrete Ra or Ra is methyl, ethyl, propyl, butyl, pentyl, hexyl, heptyl, octyl, nonyl, decyl, methoxy, ethoxy, propoxy, butoxy, pentyloxy, hexyloxy, heptyloxy, methoxymethyl, methoxyethyl, methoxypropyl, ethoxymethyl, ethoxyethyl, ethoxypropyl, propoxymentyl, vinyl, 1-propenyl, 2-propenyl, 1-butenyl, 2-butenyl, 3-butenyl, 1-pentenyl, 2-pentenyl, 3-pentenyl, 4-pentenyl, 2-propenyloxy, 2-butenyloxy, 2-pentenyloxy, 1-propynyl, and 1-pentynyl.

Concrete Ra or Rb is also 2-fluoroethyl, 3-fluoropropyl, 2,2,2-trifluoroethyl, 2-fluorovinyl, 2,2-difluorovinyl, 2-fluoro-2-cyanovinyl, 3-fluoro-1-propenyl, 3,3,3-trifluoro-1-propenyl, 4-fluoro-1-propenyl, and 4,4-difluoro-3-butenyl. Especially preferable Ra or Rb is ethyl, propyl and pentyl.

$A_1$, $A_2$, $A_3$, and $A_4$ independently are 1,4-cyclohexylene, 1,4-cyclohexenylene, 1,3-dioxane-2,5-diyl, 1,4-phenylene, pyridine-2,5-diyl, pyrimidine-2,5-diyl, pyridazine-3,6-diyl, or 2,3-bis(trifluoromethyl)-1,4-phenylene. Any hydrogen in these rings may be replaced by halogen, and at least one of $A_1$, $A_2$, $A_3$, and $A_4$ is 2,3-bis(trifluoromethyl)-1,4-phenylene as shown below.

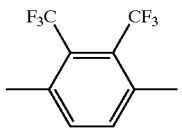

Preferable $A_1$, $A_2$, $A_3$, or $A_4$ is 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, 2,3,5,6-tetrafluoro-1,4-phenylene, pyridine-2,5-diyl, 3-fluoropyridine-2,5-diyl, pyrimidine-2, 5-diyl, pyridazine-3,6-diyl, and 2,3-bis(trifluoromethyl)-1, 4-phenylene. Trans is preferable to cis in the configuration of 1,4-cyclohexylene and 1,3-dioxane-2,5-diyl.

$Z_1$, $Z_2$ and $Z_3$ independently are a single bond, —$(CH_2)_2$—, —$(CF_2)_2$—, —COO—, —OCO—, —$CH_2O$—, —$OCH_2$—, —$CF_2O$—, —$OCF_2$—, —CH=CH—, —CF=CF—, —C≡C—, —$(CH_2)_4$—, —$(CH_2)_3O$—, or —$O(CH_2)_3$—.

Preferable $Z_1$, $Z_2$ or $Z_3$ is a single bond, —$(CH_2)_2$—, —COO—, —OCO—, —$CH_2O$—, —$CF_2O$—, —$OCF_2$—, —CH=CH—, —CF=CF—, —C≡C—, —$(CH_2)_4$—, and —$(CH_2)_3O$—. Trans is preferable to cis in the configuration of —CH=CH— and —CF=CF—.

m and n independently are 0 or 1. The compound wherein m and n are 0 has two rings. The compound wherein m is 1 and n is 0 or m is 0 and n is 1 has three rings. The compound wherein m and n are 1 has four rings. The compound (1) may comprise an isotope such as $^2H$ (deuterium) and $^{13}C$ in an amount more than its natural abundance, because there is no large difference in the physical properties of the compound.

2. The compound according to item 1 wherein m and n are 0 in formula (1) described in item 1.
3. The compound according to item 1 wherein m is 0 and n is 1 in formula (1) described in item 1.
4. The compound according to item 1 wherein m is 1 and n is 1 in formula (1) described in item 1.
5. The compound according to any one of items 1 to 4 wherein Ra and Rb independently are alkyl having 1 to 20 carbons, alkoxy having 1 to 19 carbons or alkenyl having 2 to 21 carbons.
6. The compound according to any one of items 1 to 4 wherein Ra and Rb independently are alkyl having 1 to 20 carbons, alkoxy having 1 to 19 carbons or alkenyl having 2 to 21 carbons; and $Z_1$, $Z_2$ and $Z_3$ independently are a single bond, —$(CH_2)_2$—, —$(CH_2)_4$—, —$CF_2O$—, or —$OCF_2$—.
7. The compound according to item 6 wherein at least one of $Z_1$, $Z_2$ and $Z_3$ is —$CF_2O$—.
8. A compound represented by formulas (a) to (m):

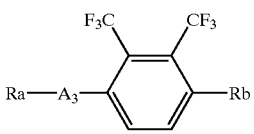
(a)

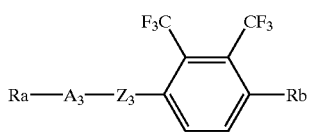
(b)

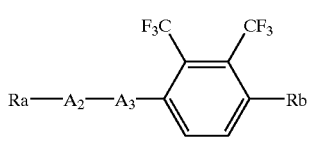
(c)

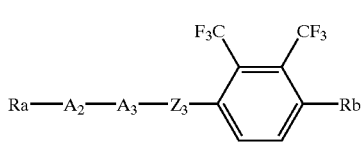
(d)

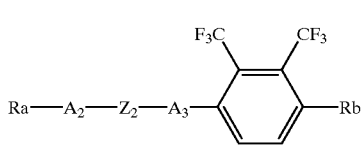
(e)

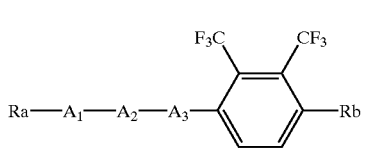
(f)

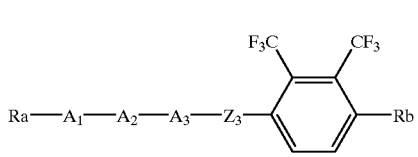
(g)

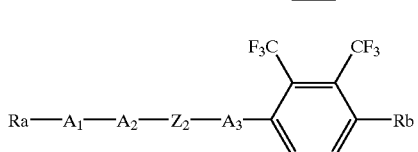
(h)

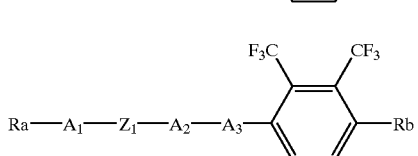
(i)

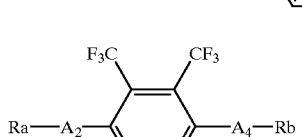
(j)

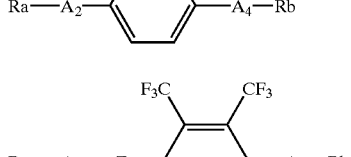
(k)

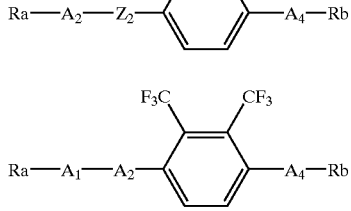
(l)

-continued

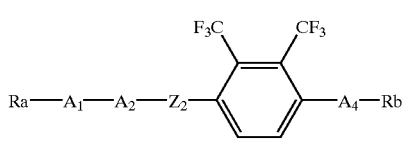
(m)

wherein Ra and Rb independently are alkyl having 1 to 20 carbons, any —CH$_2$— in the alkyl may be replaced by —O— or —CH═CH—, and any hydrogen may be replaced by halogen; A$_1$, A$_2$, A$_3$, and A$_4$ independently are 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, 2,3,5,6-tetrafluoro-1,4-phenylene, pyridine-2,5-diyl, 3-fluoropyridine-2,5-diyl, pyrimidine-2,5-diyl, pyridazine-3,6-diyl, or 2,3-bis(trifluoromethyl)-1,4-phenylene, and at least one of A$_1$, A$_2$, A$_3$, and A$_4$ is 2,3-bis(trifluoromethyl)-1,4-phenylene; Z$_1$, Z$_2$ and Z$_3$ independently are a single bond, —(CH$_2$)$_2$—, —(CF$_2$)$_2$—, —COO—, —OCO—, —CH$_2$O—, —OCH$_2$—, —CF$_2$O—, —OCF$_2$—, —CH═CH—, —CF═CF—, —C≡C—, —(CH$_2$)$_4$—, —(CH$_2$)$_3$O—, or —O(CH$_2$)$_3$—; and m and n independently are 0 or 1.

9. A liquid crystal composition comprising at least one compound described in any one of items 1 to 8.

10. The composition according to item 9, further comprising at least one compound selected from the group consisting of the compounds represented by formulas (2), (3) and (4):

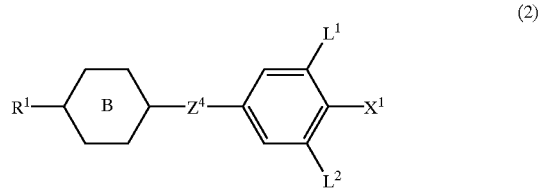
(2)

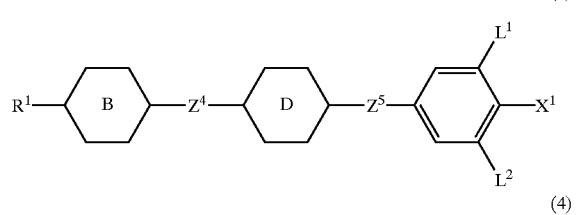
(3)

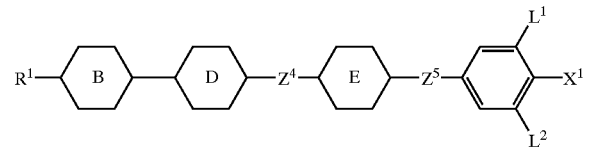
(4)

wherein R$^1$ is alkyl having 1–10 carbons, any —CH$_2$— in the alkyl may be replaced by —O— or —CH═CH—, and any hydrogen may be replaced by fluorine; X$^1$ is fluorine, chlorine, —OCF$_3$, —OCHF$_2$, —CF$_3$, —CHF$_2$, —CH$_2$F, —OCF$_2$CHF$_2$, or —OCF$_2$CHFCF$_3$; rings B and D independently are 1,4-cyclohexylene, 1,3-dioxane-2,5-diyl or 1,4-phenylene in which any hydrogen may be replaced by fluorine; ring E is 1,4-cyclohexylene or 1,4-phenylene in which any hydrogen may be replaced by fluorine; and Z$^4$ and Z$^5$ independently are —(CH$_2$)$_2$—, —(CH$_2$)$_4$—, —COO—, —CF$_2$O—, —OCF$_2$—, —CH═CH—, or a single bond; and L$^1$ and L$^2$ independently are hydrogen or fluorine.

11. The composition according to item 9, further comprising at least one compound selected from the group consisting of the compounds represented by formulas (5) and (6):

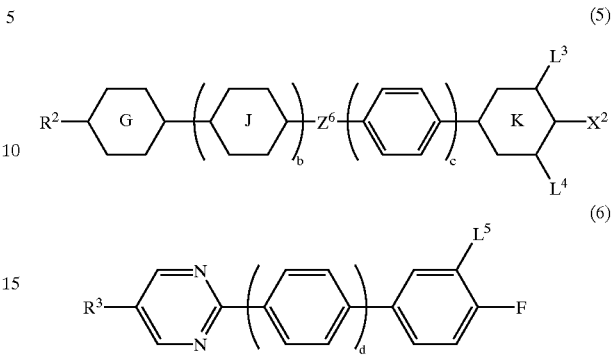

wherein R$^2$ and R$^3$ independently are alkyl having 1 to 10 carbons, any —CH$_2$— in the alkyl may be replaced by —O— or —CH═CH— and any hydrogen may be replaced by fluorine; X$^2$ is —CN or —C≡C—CN; ring G is 1,4-cyclohexylene, 1,4-phenylene, 1,3-dioxane-2,5-diyl, or pyrimidine-2,5-diyl; ring J is 1,4-cyclohexylene, pyrimidine-2,5-diyl or 1,4-phenylene in which any hydrogen may be replaced by fluorine; ring K is 1,4-cyclohexylene or 1,4-phenylene; Z$^6$ is —(CH$_2$)$_2$—, —COO—, —CF$_2$O—, —OCF$_2$—, or a single bond; L$^3$, L$^4$ and L$^5$ independently are hydrogen or fluorine; and b, c and d independently are 0 or 1.

12. The composition according to item 9, further comprising at least one compound selected from the group consisting of the compounds represented by formulas (7), (8) and (9):

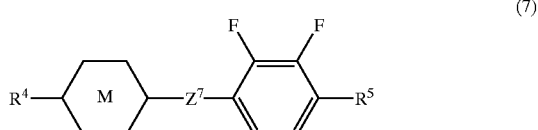
(7)

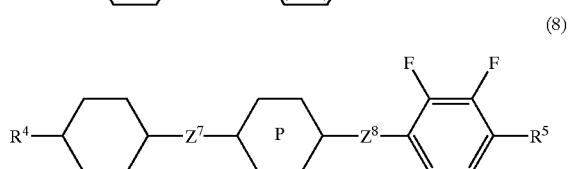
(8)

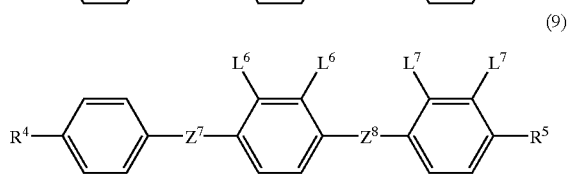
(9)

wherein R$^4$ and R$^5$ independently are alkyl having 1 to 10 carbons, any —CH$_2$— in the alkyl may be replaced by —O— or —CH═CH—, and any hydrogen may be replaced by fluorine; rings M and P independently are 1,4-cyclohexylene or 1,4-phenylene; Z$^7$ and Z$^8$ independently are —(CH$_2$)$_2$—, —COO— or a single bond; L$^6$ and L$^7$ independently are hydrogen or fluorine, and at least one of L$^6$ and L$^7$ is fluorine.

13. The composition according to item 10, further comprising at least one compound selected from the group consisting of the compounds represented by formulas (10), (11) and (12):

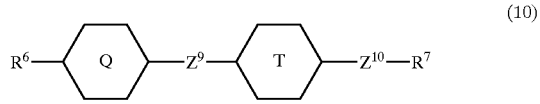
(10)

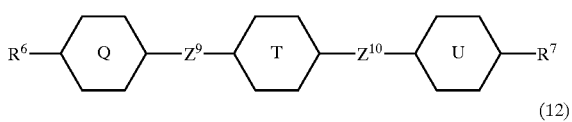
(11)

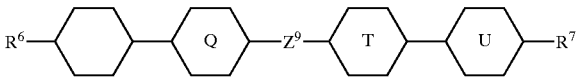
(12)

wherein $R^6$ and $R^7$ independently are alkyl having 1 to 10 carbons, any —$CH_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; $Z^9$ and $Z_{10}$ independently are —C≡C—, —COO—, —($CH_2$)$_2$—, —CH=CH—, or a single bond.

14. The composition according to item 11, further comprising at least one compound selected from the group consisting of the compounds represented by formulas (10), (11) and (12) described in item 13.
15. The composition according to item 12, further comprising at least one compound selected from the group consisting of the compounds represented by formulas (10), (11) and (12) described in item 13.
16. The composition according to item 13, further comprising at least one compound selected from the group consisting of the compounds represented by formulas (5) and (6) described in item 11.
17. The composition according to items 9 to 16, further comprising at least one optically active compound.
18. A liquid crystal display element comprising the composition described in any one of items 9 to 17.

In the compounds (2) to (12), preferable groups are as follows. Straight alkyl is preferable to branched alkyl. Trans is preferable to cis in the configuration of 1,4-cyclohexylene and 1,3-dioxane-2,5-diyl. Meaning of the phrase in "any —$CH_2$— in the alkyl may be replaced by —O— or —CH=CH—" is described in item 1 of the embodiment. Symbols such as $R^1$, ring B, and so forth were used in plural compounds and these $R^1$ (or ring B and so forth) may be identical or may be different each other. These compounds may comprise an isotope such as $^2H$ (deuterium) and $^{13}C$ in an amount more than its natural abundance, because there is no large difference in the physical properties of the compound.

DETAILED DESCRIPTION OF THE PREFERRED EMBODIMENT

Firstly, the compound (1) of this invention is further explained. The compound (1) is two rings-, three rings- and four rings-compounds having 2,3-bis(trifluoromethyl)-1,4-phenylene. The compound is strongly stable physically and chemically and is excellent in miscibility with other compounds. A composition comprising the compound is stable under the conditions adopted when an element is normally used. Keeping the composition even at low temperature does not allow the compound to separate out as a solid. The compound has a large, negative dielectric anisotropy and a proper value of optical anisotropy.

Physical properties such as optical anisotropy can be controlled by properly selecting a terminal group, a ring and a bonding group of the compound (1). An effect of a kind of terminal groups Ra and Rb, rings $A_1$ to $A_4$, and bonding groups $Z_1$ to $Z_3$, on the physical properties of compound (1) will be explained below. By adding the compound (1) to a composition, the physical properties of the compound (1) influences those of the composition. As the compound (1) has large and negative dielectric nisotropy, it is useful as a component in a composition for IPS mode and VA mode. The compound can also be added to a composition for modes such as TN, STN, TN-TFT, and so forth.

When Ra or Rb in the compound (1) is straight, a temperature range of a liquid crystal phase is wide and viscosity is small. When Ra or Rb is branched, miscibility with other liquid crystal compounds is excellent. The compound in which Ra or Rb is an optically active group is useful as a chiral dopant. The addition of the compound to a composition prevents a reversed twisted domain that is formed in an element. The compound that Ra or Rb is not optically active group is useful as a component of a composition.

When ring $A_1$, $A_2$, $A_3$, or $A_4$ in the compound (1) is 1,4-phenylene in which any hydrogen is replaced by halogen, pyridine-2,5-diyl or 1,3-dioxane-2,5-diyl, dielectric anisotropy is large. When the ring is 1,4-phenylene in which any hydrogen may be replaced by halogen, pyridine-2,5-diyl, pyrimidine-2,5-diyl, or pyridazine-3,6-diyl, optical anisotropy is large. When the ring is 1,4-cyclohexylene, 1,4-cyclohexenylene or 1,3-dioxane-2,5-diyl, optical anisotropy is small.

When at least two rings are 1,4-cyclohexylene, a clearing point is high, optical anisotropy is small, and viscosity is small. When at least one ring is 1,4-phenylene, optical anisotropy is relatively large, orientational order parameter is large. When at least two rings are 1,4-phenylene, optical anisotropy is large, a temperature range of a liquid crystal phase is wide, and a clearing point is high.

When a bonding group, $Z_1$, $Z_2$ or $Z_3$ is a single bond, —($CH_2$)$_2$—, —$CH_2O$—, —$OCH_2$—, —$CF_2O$—, —$OCF_2$—, —CH=CH—, —CF=CF—, or —($CH_2$)$_4$—, viscosity is small. When the bonding group is a single bond, —($CH_2$)$_2$—, —$CF_2O$—, —$OCF_2$—, —CH=CH—, or —($CH_2$)$_4$— viscosity is smaller. When the bonding group is —CH=CH— or —CF=CF—, a temperature range of a liquid crystal phase is wide, and a ratio of elastic constants is large. When the bonding group is —C≡C—, optical anisotropy is large.

When the compound (1) has two rings or three rings, viscosity is small, and when it has three rings or four rings, a clearing point is high. As described above, the compound having desired physical properties can be obtained by selecting properly a kind of a terminal group, a ring, a bonding group, and the number of the ring.

Preferable example of the compound (1) is the compounds (1a-1) to (1d-9). Meaning for symbols of Ra, Rb, $Z_1$, $Z_2$ and $Z_3$ in these compounds is identical to that described in item 1 of the embodiment. In rings of 1,4-cyclohexylene, 1,4-cyclohexenylene, 1,3-dioxane-2,5-diyl, 1,4-phenylene, pyridine-2,5-diyl, pyrimidine-2,5-diyl, or pyridazine-3,6-diyl present in these compounds, any hydrogen may be replaced by halogen such as fluorine. A black dot in 1,4-cyclohexylene and 1,3-dioxane-2,5-diyl means that configuration of these rings is trans.

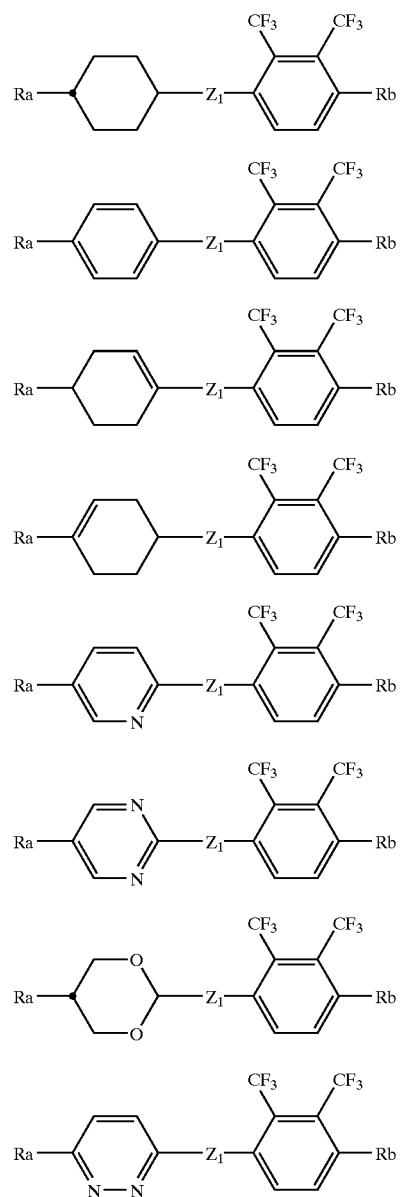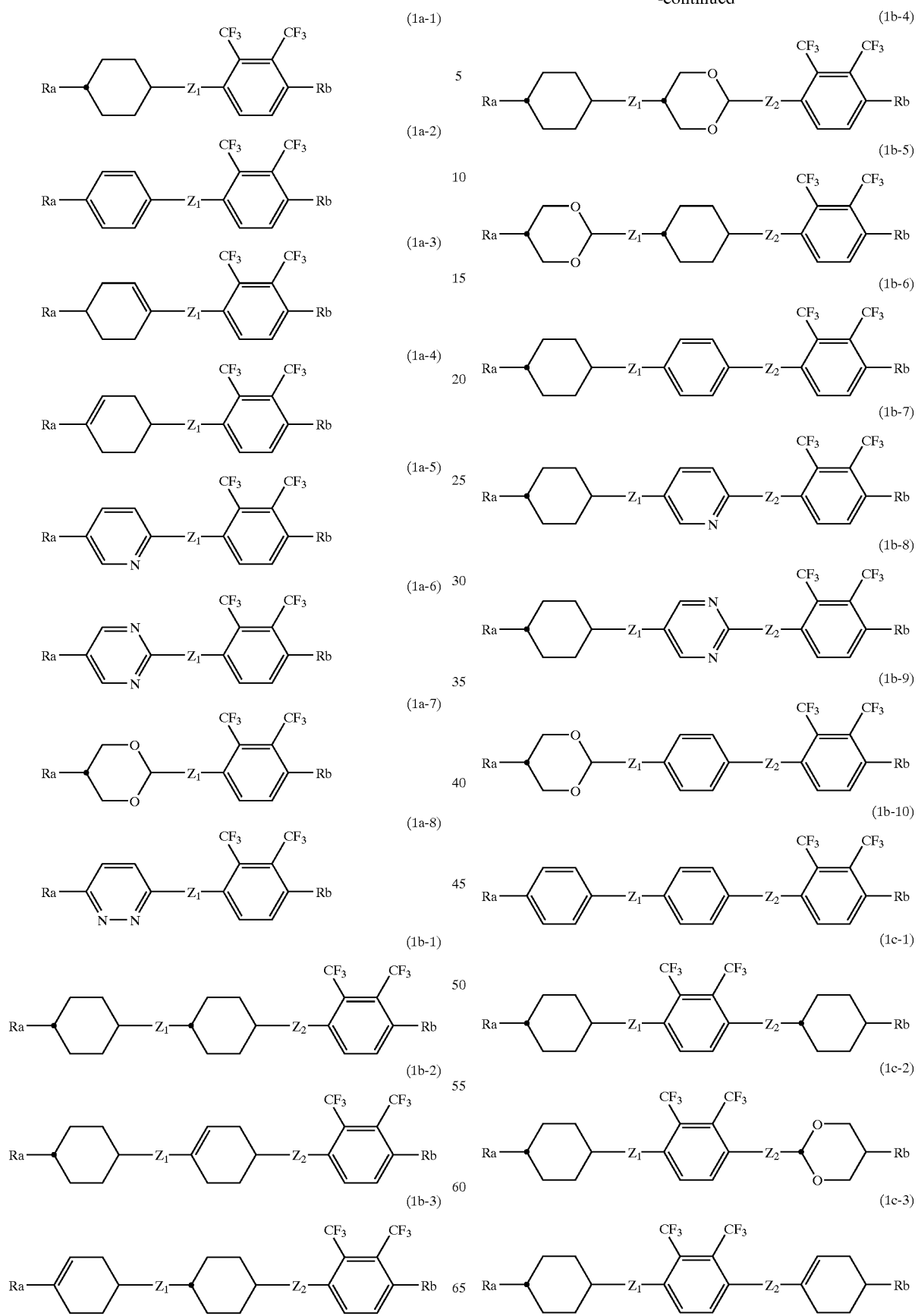

(1c-4)
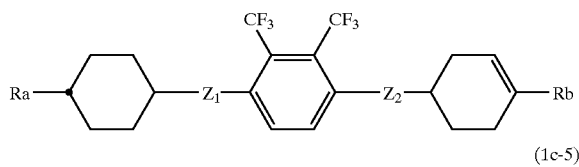

(1c-5)
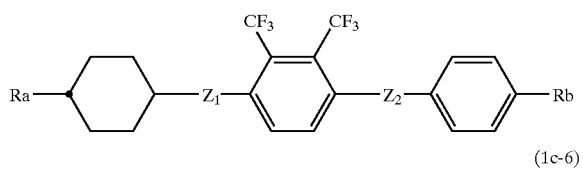

(1c-6)
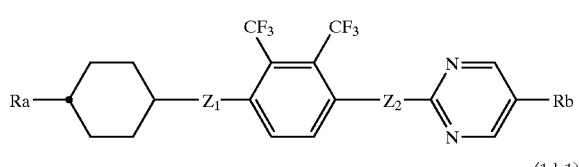

(1d-1)
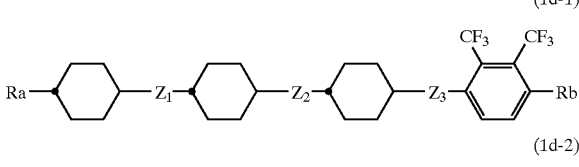

(1d-2)
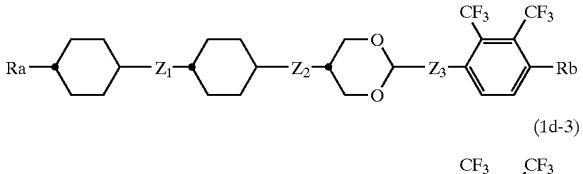

(1d-3)
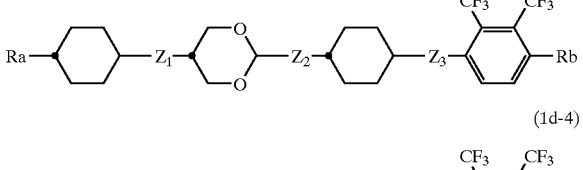

(1d-4)
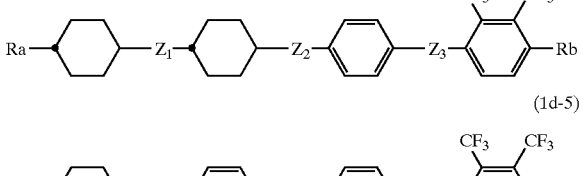

(1d-5)
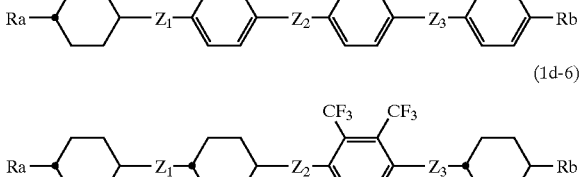

(1d-6)
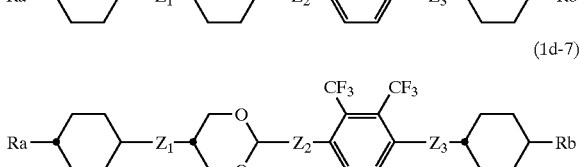

(1d-7)
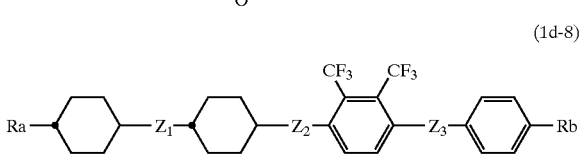

(1d-8)
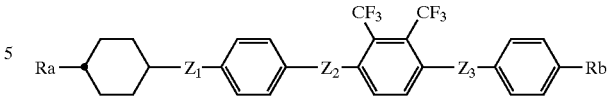

(1d-9)
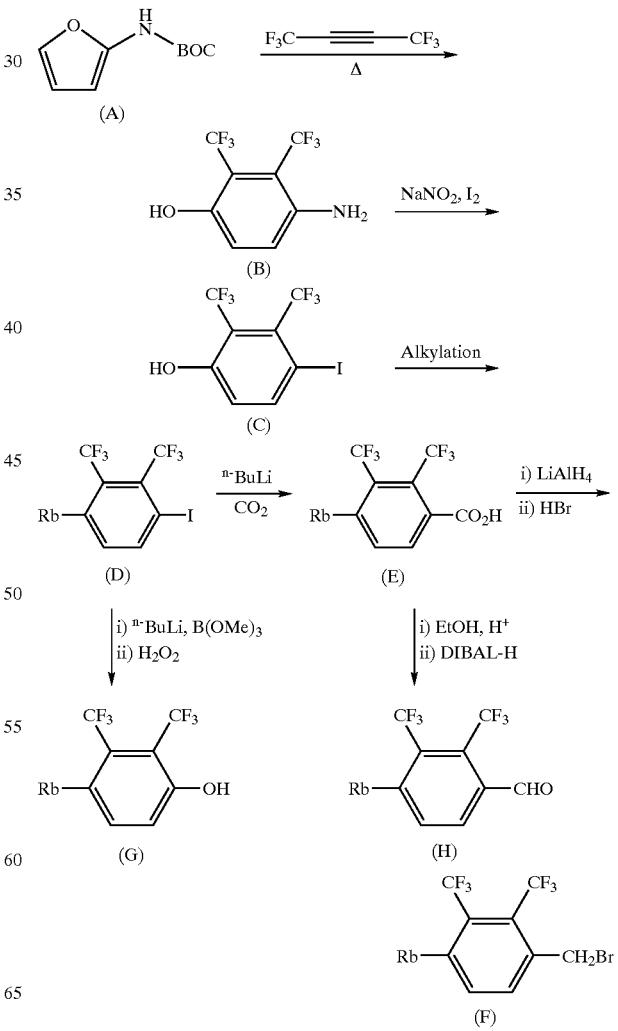

The compound (1) can be prepared by an appropriate combination of methods in organic synthetic chemistry. A method of introducing objective terminal groups, rings and bonding groups to a starting material is described in books such as Organic Syntheses, John Wiley & Sons, Inc., Organic Reactions, John Wiley & Sons, Inc., Comprehensive Organic Synthesis, Pergamon Press, Shin-Jikken Kakagu Koza (Maruzen).

One example of a method for preparing 2,3-bis(trifluoromethyl)-1,4-phenylene ring is shown in the following scheme. A compound having this ring is prepared based on this method. This compound is a starting material for the preparation of the compound (1). After explaining the scheme, one example of the method for the formation of bonding groups will be described.

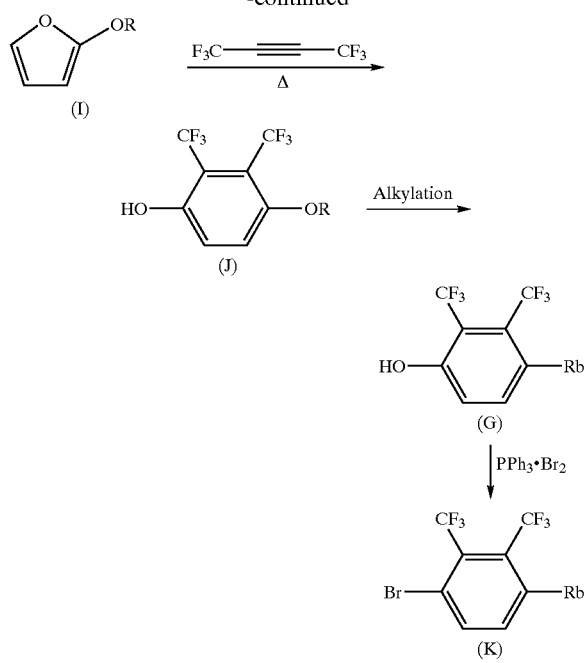

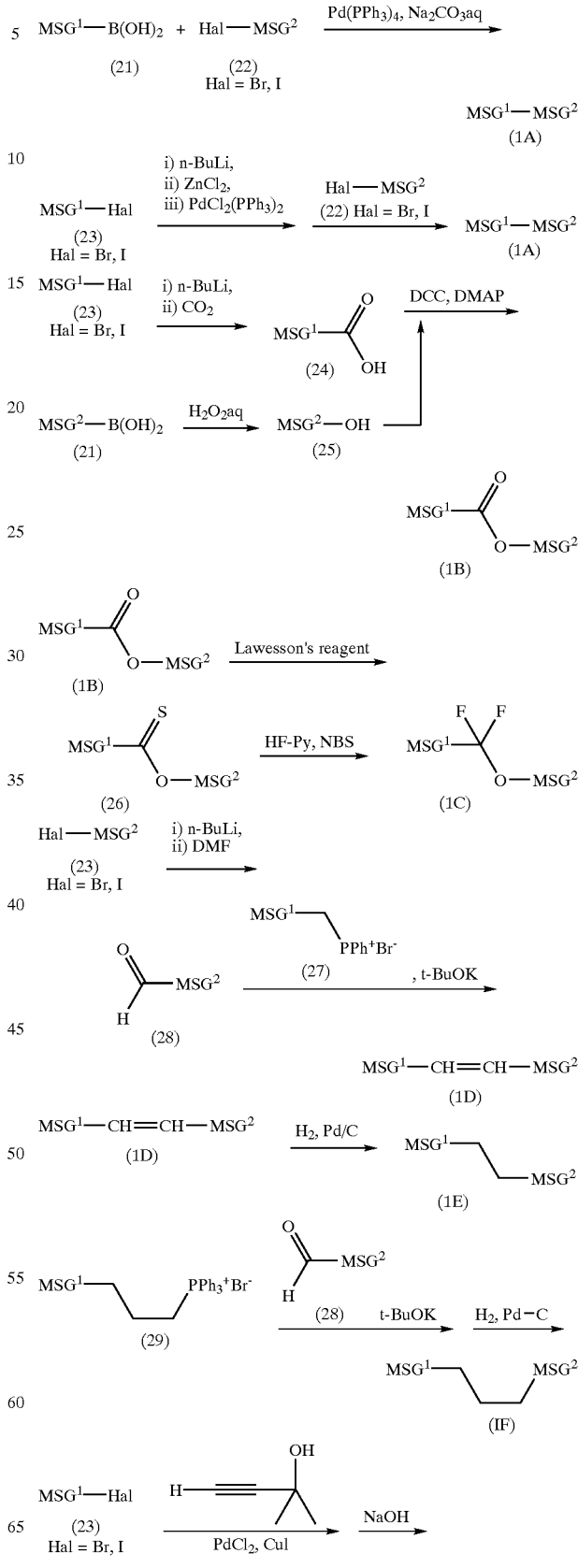

This example is based on the method described in Org. Lett., 2000, 2(21), 3345. Aniline derivative (B) is prepared by the Diels-Alder reaction of 1,1,1,4,4,4-hexafluoro-2-butyne with furan derivative (A) at high temperature. This compound is converted to iodide (C) by the Sandmeyer reaction described in Org. Synth. Coll., Vol. 2, 1943, 355. The compound (D) having Rb group is obtained by the alkylation of the compound (C) with alkyl halide, alkenyl halide or alkynyl halide. Meaning for symbol of Rb in the compound (D) is identical to that described in item 1 of the embodiment. After the compound (D) is converted to the boric acid derivative, the compound (G) is obtained by oxidation according to the method described in J. Am. Chem. Soc., 1960, 82, 4708. The compound (G) is also prepared by alkylation of aniline derivative (B), followed by conversion to diazonium salt and then by hydrolysis.

The benzoic acid (E) is obtained by the reaction of the compound (D) with alkyllithium and then with carbon dioxide. The compound (E) is converted to benzylbromide (F) by the reduction with lithium aluminum hydride and so forth and by halogenation with hydrobromic acid and so forth. On the other hand, benzaldehyde (H) is obtained from compound (E) by esterification followed by reduction with diisobutylaluminum hydride and so forth.

Phenol (J) is prepared by the similar reaction using the furan derivative (I; R is alkyl) as a starting material instead of the compound (A). The compound (G) having alkyl, alkenyl or alkynyl is obtained by the cross-coupling catalyzed by organometallic compounds or transition metals, after converting a hydroxyl group in the compound (J) into a reactive functional group such as tosyloxy and mesyloxy. The cross-coupling is described in Metal-Catalyzed Cross-Coupling Reactions (Wiley-VCH, 1998). The obtained phenol (G) is converted to the compound (K) by halogenation.

One example of the method for the formation of a bonding group, $Z_1$, $Z_2$ or $Z_3$, is first shown in a scheme, which is then explained in item (I) to item (XI). In the scheme, $MSG^1$ or $MSG^2$ is a monovalent organic group having at least one ring. Plural $MSG^1$ (or $MSG^2$) may be identical or different each other. The compounds (1A) to (1K) correspond to the compound (1).

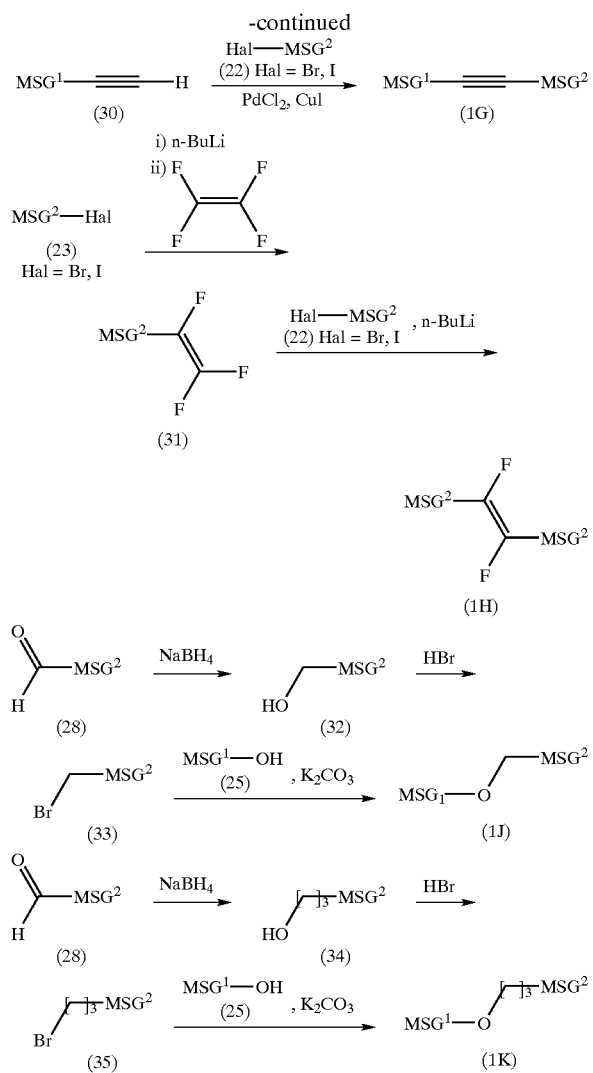

(I) Formation of a Single Bond

The compound (1A) is prepared by the reaction of arylboronic acid (21) with the compound (22) in the presence of catalysts such as an aqueous solution of carbonate and tetrakis(triphenylphosphine)palladium. The compound (1A) is also prepared by the reaction of the compound (23) prepared by a known method with n-butyllithium and then zinc chloride, and with the compound (22) in the presence of a catalyst such as dichlorobis(triphenylphosphine) palladium.

(II) Formation of —COO— and —OCO—

The compound (24) is obtained by the reaction of the compound (23) with n-butyllithium followed by carbon dioxide. The compound (1B) is prepared by dehydration of the compound (24) and phenol (25) prepared by a known method in the presence of DDC (1,3-dicyclohexylcarbodiimide) and DMAP (4-dimethylaminopyridine). The compound having —OCO— is also prepared by this method.

(III) Formation of —CF$_2$O— and —OCF$_2$—

The compound (26) is obtained by treating the compound (1B) with a sulfurating agent such as Lawesson's reagent. The compound (1C) having —CF$_2$O— is prepared by fluorination of the compound (26) with hydrogen fluoride-pyridine complex and NBS(N-bromosuccinimide). See M. Kuroboshi et al., Chem. Lett., 1992, 827. The compound (1C) is also prepared by fluorination of the compound (26) with (diethylamino) sulfur trifluoride. See W. H. Bunnelle et al., J. Org. Chem., 1990, 55, 768. The compound having —OCF$_2$— is also prepared by this method.

(IV) Formation of —CH=CH—

The compound (23) is treated with n-butyllithium and then formamide such as N,N-dimethylformamide to give aldehyde (28). The compound (1D) is prepared by the reaction of the aldehyde (28) with phoshine ylide which is generated by the treatment of phosphinium salt (27) prepared by a known method with a base such as potassium t-butoxide. As cis isomer may be formed depending on the reaction conditions, it is isomerized to trans isomer by a known method on request.

(V) Formation of —(CH$_2$)$_2$—

The compound (1E) is prepared by hydrogenation of the compound (1D) in the presence of a catalyst such as palladium carbon.

(VI) Formation of —(CH$_2$)$_4$—

The compound having —CH=CH—(CH$_2$)$_2$— is obtained using phosphonium salt (29) instead of the phosphonium salt (27) according to the method described in item (IV). The compound is subjected to a catalytic hydrogenation to prepare the compound (1F).

(VII) Formation of —C≡C—

The compound (23) is reacted with 2-methyl-3-butyn-2-ol in the presence of catalysts of palladium dichloride and copper halide, followed by deprotection under the basic conditions to give the compound (30). The compound (1G) is prepared by the reaction of the compound (30) with the compound (22) in the presence of catalysts of palladium dichloride and copper halide.

(VIII) Formation of —CF=CF—

The compound (31) is obtained by the reaction of the compound (23) with n-butyllithiun and then tetrafluoroethylene. The compound (1H) is prepared by the reaction of the compound (22) with n-butyllithiun and then the compound (31).

(IX) Formation of —CH$_2$O— and —OCH$_2$—

The compound (32) is obtained by reduction of the compound (28) with a reducing agent such as sodium borohydride. The compound (33) is obtained by halogenation of the compound (32) with hydrobromic acid. The compound (1J) is prepared by the reaction of the compound (33) with the compound (25) in the presence of potassium carbonate.

(X) Formation of —(CH$_2$)$_3$O— and —O(CH$_2$)$_3$—

The compound (1K) is prepared using the compound (34) instead of the compound (32) according to the method of item (IX).

(XI) Formation of —(CF$_2$)$_2$—

The compound having —(CF$_2$)$_2$— is obtained by fluorination of diketone (—COCO—) with sulfur tetrafluoride in the presence of a catalyst of hydrogen fluoride according to the method described in J. Am. Chem. Soc., 2001, 123, 5414.

Secondly, the composition of this invention is further explained. Amount of the compound (percentage) described below is weight percent based on the total weight of the composition. The composition may comprise plural compounds selected only from the compound (1). Preferably, the composition comprises at least one compound selected from the compound (1) in the ratio of 1 to 99%. The composition may further comprise at least one compound selected from the group consisting of the compounds (2), (3) and (4), at least one compound selected from the group consisting of the compounds (5) and (6), or at least one compound selected from the group consisting of the compounds (7), (8) and (9). The composition may further comprise at least one compound selected from the group consisting of the compounds (10), (11) and (12) for the purpose of controlling a temperature range of a liquid crystal phase, viscosity, optical anisotropy, dielectric anisotropy, threshold voltage, and so forth. The composition may further comprise other compounds for the purpose of controlling the physical properties.

The compounds (2), (3) and (4) are used mainly for the composition for TN-TFT mode, because dielectric anisotropy is positive and large, and thermal and chemical stability is excellent. In the composition, the amount of these compounds is 1 to 99%. Preferable amount is 10 to 97%. More preferable amount is 40 to 95%. The compounds (10), (11) or (12) may be further added to the composition for the purpose of controlling a temperature range of a liquid crystal phase, viscosity, optical anisotropy, dielectric anisotropy, or threshold voltage.

The compounds (5) and (6) are used mainly for the composition for STN and TN modes, because dielectric anisotropy is positive and very large. These compounds are used for the purpose of widening a temperature range of a liquid crystal phase, controlling viscosity and optical anisotropy, decreasing threshold voltage, improving sharpness of the threshold voltage, and so forth. In the composition for STN or TFT mode, the amount of compound (5) or (6) is 1 to 99%. Preferable amount is 10 to 97%. More preferable amount is 40 to 95%. The compounds (10), (11) or (12) maybe further added to the composition for the purpose of controlling a temperature range of a liquid crystal phase, viscosity, optical anisotropy, dielectric anisotropy, or threshold voltage.

The compounds (7), (8) and (9) are used mainly for the composition for VA mode, because dielectric anisotropy is negative. The compound (7) is used for the purpose controlling viscosity, optical anisotropy and threshold voltage.

The compound (8) is used for the purpose of increasing a clearing point, increasing optical anisotropy and decreasing threshold voltage, and so forth. With an increase in the amount of these compounds, threshold voltage is decreased and viscosity increased. Thus, smaller amount is preferable as long as the required value of threshold voltage is satisfied. As dielectric anisotropy of these compounds is negative and its absolute value is 5 or less, preferable amount is 40% or more. More preferable amount is 40 to 80%. For the purpose of controlling an elastic constant and a voltage-transmittance curve, these compounds may be added to a composition having positive dielectric anisotropy, preferably in the amount of 30% or less.

The absolute value of dielectric anisotropy is small in the compounds (10), (11) and (12). The compound (10) is used mainly for the purpose of controlling viscosity and optical anisotropy. The compounds (11) and (12) is used for the purpose of increasing a clearing point to widen a temperature range of a liquid crystal phase or controlling optical anisotropy. With an increase in the amount of the compounds (10), (11) and (12), threshold voltage is increased and viscosity is decreased. Thus, larger amount is preferable as long as the required value of threshold voltage is satisfied. in the composition for TN-TFT mode, preferable amount of these compounds is 40% or less. More preferable amount is 35% or less. In the composition for STN or TN mode, preferable amount is 70% or less. More preferable amount is 60% or less.

Preferable compounds (2) to (12) are compounds (2-1) to (2-9), compounds (3-1) to (3-97), compounds (4-1) to (4-33), compounds (5-1) to (5-56), compounds (6-1) to (6-3), compounds (7-1) to (7-3), compounds (8-1) to (8-5), compounds (9-1) to (9-3), compounds (10-1) to (10-11), compounds (11-1) to (11-18) and compounds (12-1) to (12-6), respectively. In these compounds, the symbols $R^1$, $R^2$, $R^3$, $R^4$, $R^5$, $R^6$, $R^7$, $X^1$, and $X^2$ have the same meaning as described in item 1 of the embodiment of this invention.

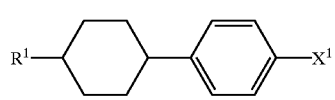

(2-1)

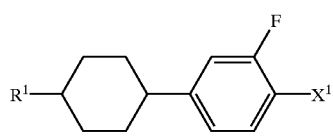

(2-2)

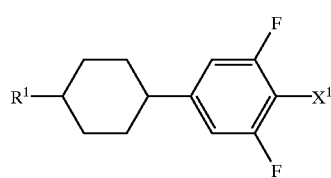

(2-3)

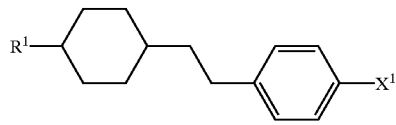

(2-4)

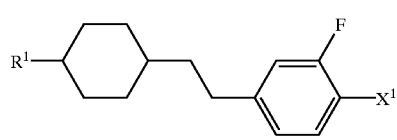

(2-5)

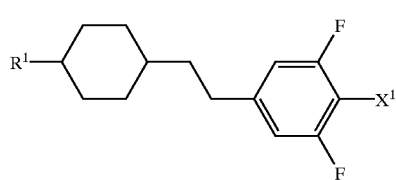

(2-6)

-continued
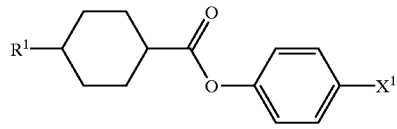
(2-7)
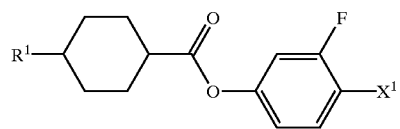
(2-8)
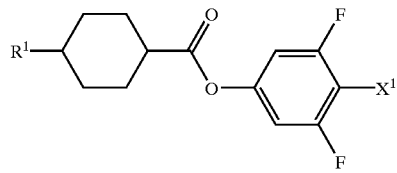
(2-9)
(3-1)
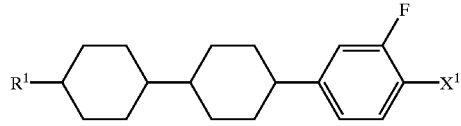
(3-2)
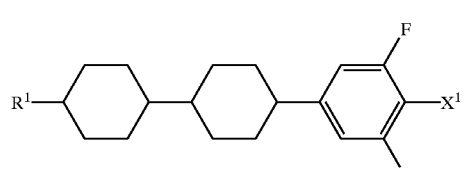
(3-3)
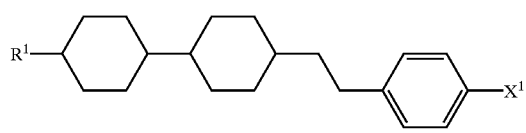
(3-4)
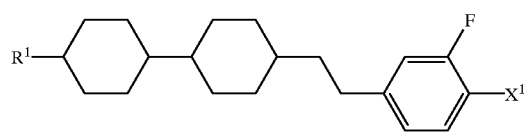
(3-5)
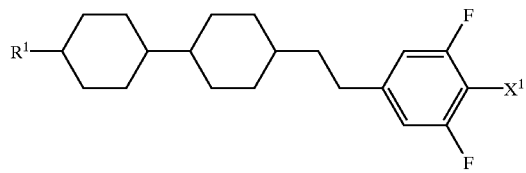
(3-6)
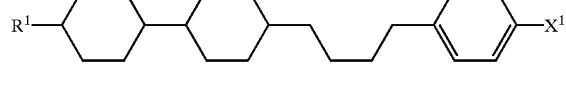
(3-7)
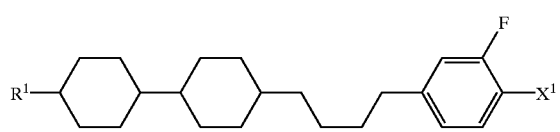
(3-8)
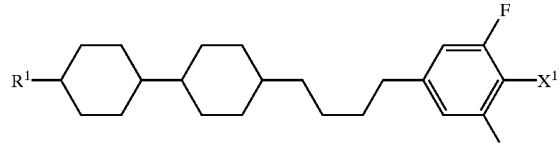
(3-9)
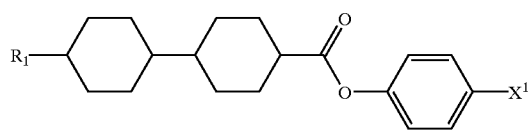
(3-10)
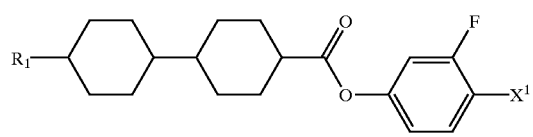
(3-11)
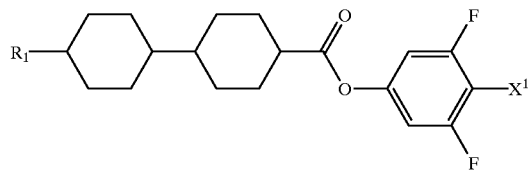
(3-12)
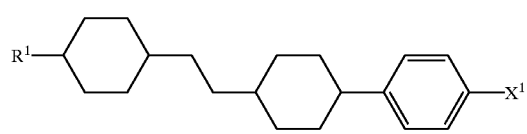
(3-13)

(3-14)
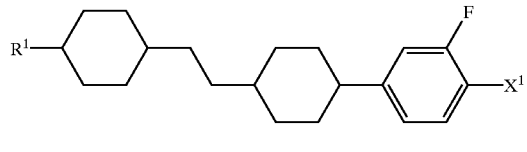
(3-15)
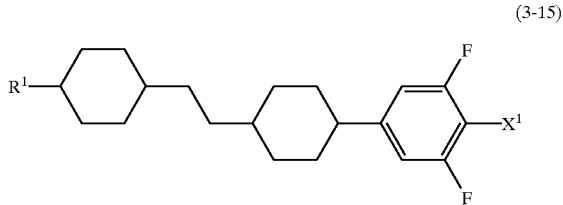
(3-16)
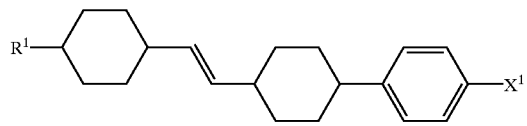
(3-17)
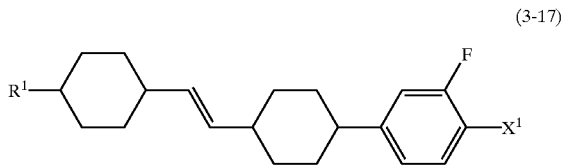
(3-18)
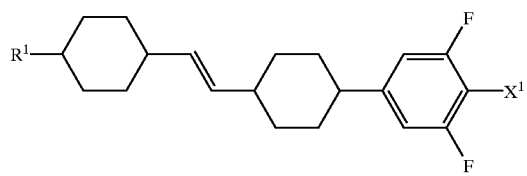
(3-19)
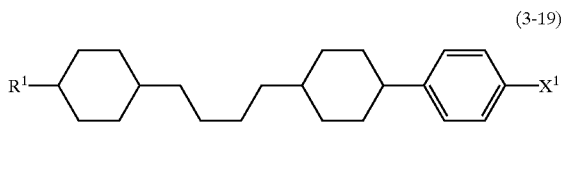
(3-20)
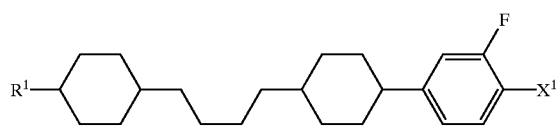
(3-21)
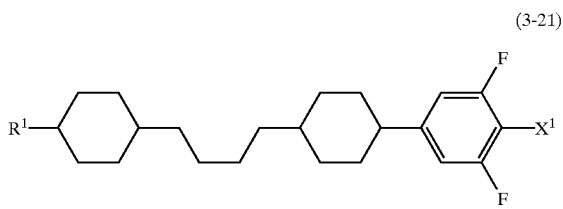
(3-22)
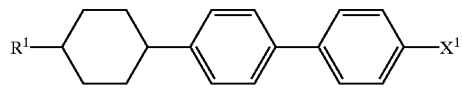
(3-23)
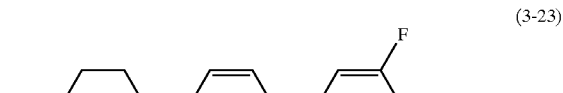
(3-24)
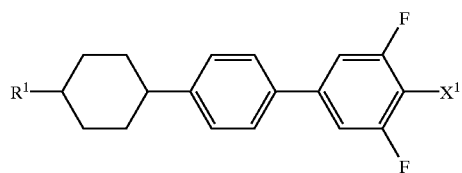
(3-25)
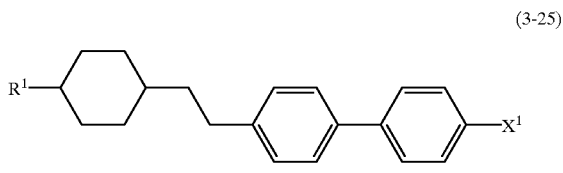
(3-26)
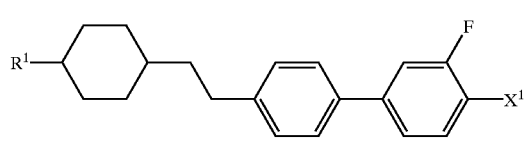
(3-27)
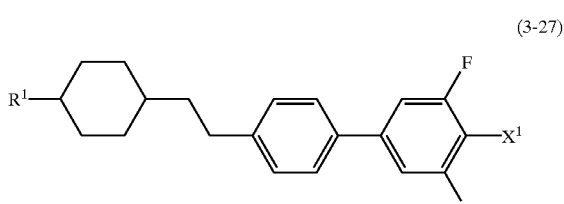
(3-28)
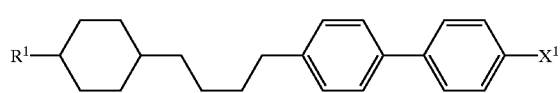
(3-29)
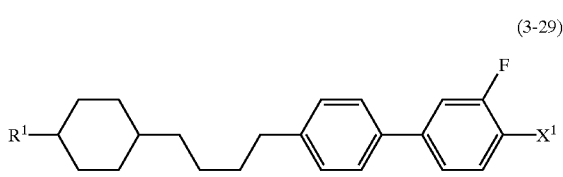

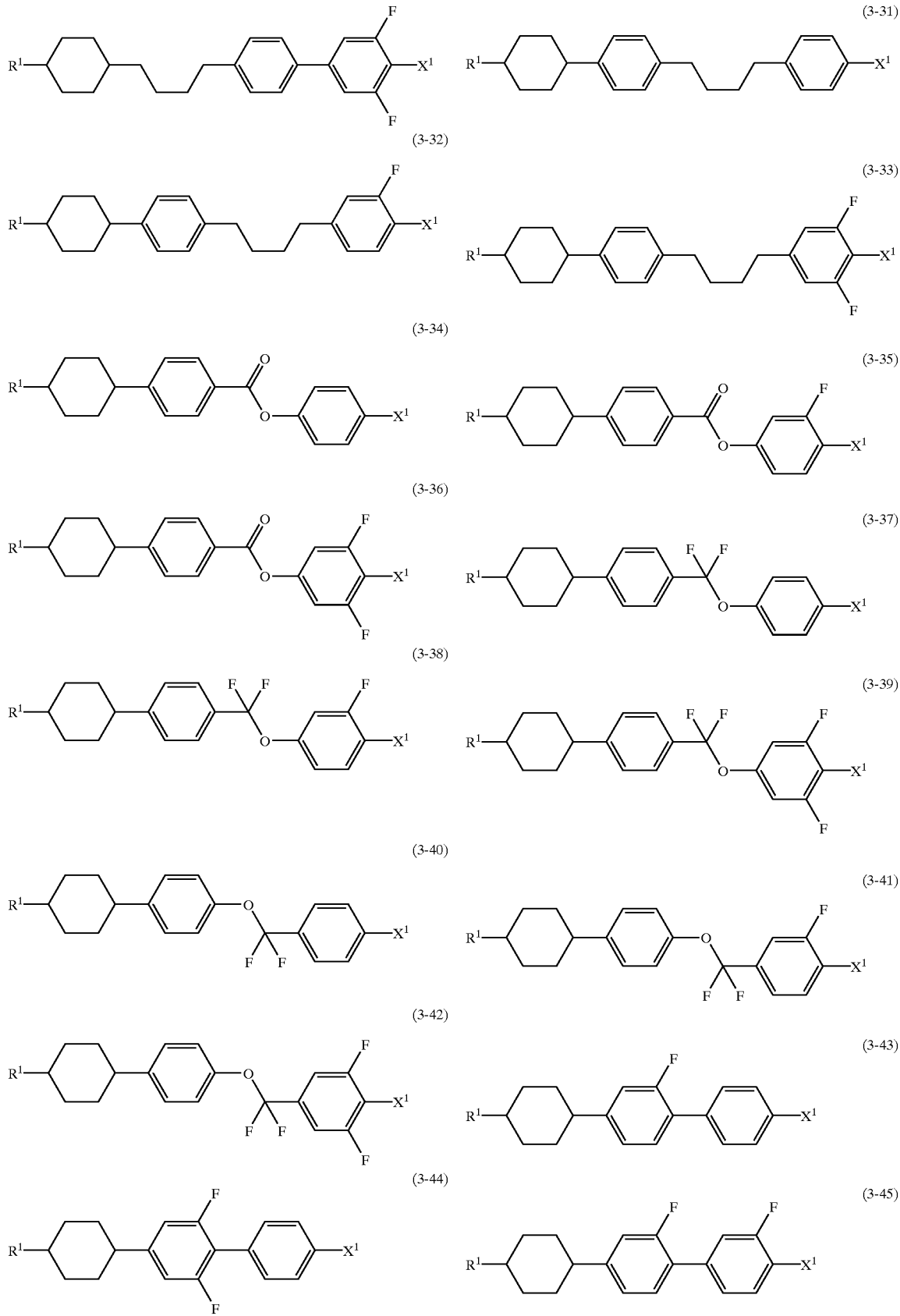

-continued
(3-46)
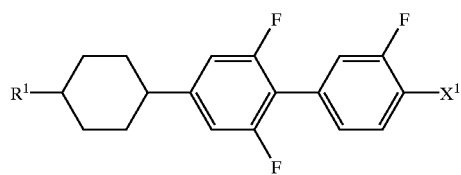
(3-47)
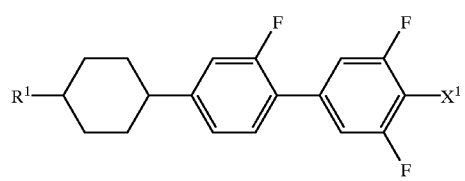
(3-48)
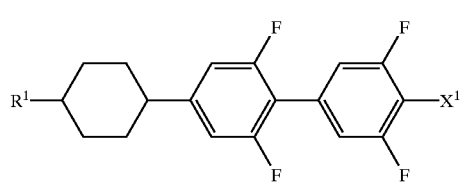
(3-49)
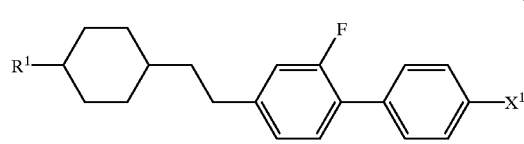
(3-50)
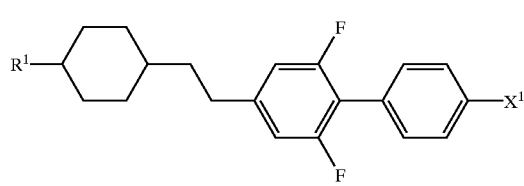
(3-51)
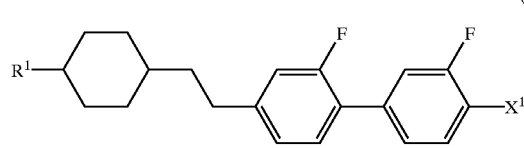
(3-52)
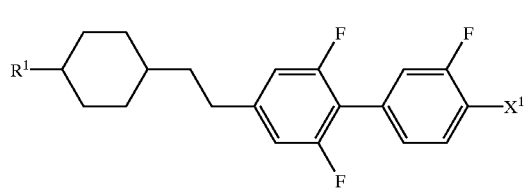
(3-53)
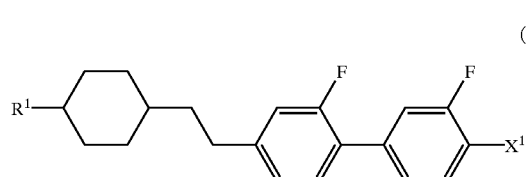
(3-54)
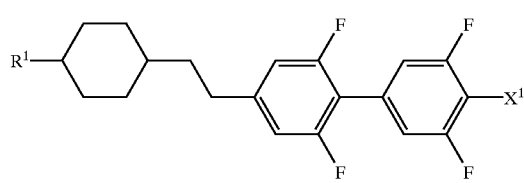
(3-55)
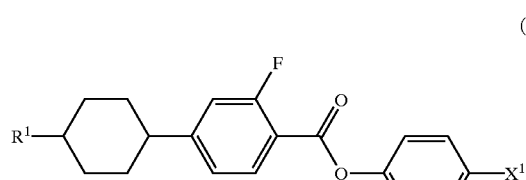
(3-56)
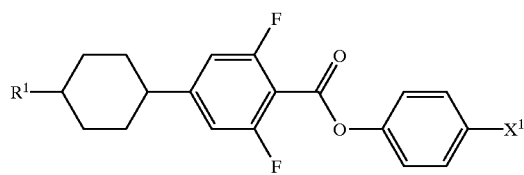
(3-57)
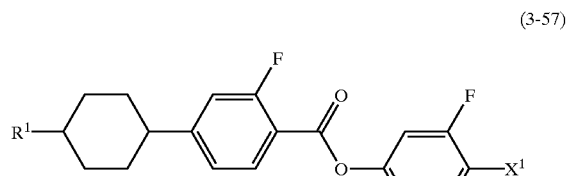
(3-58)
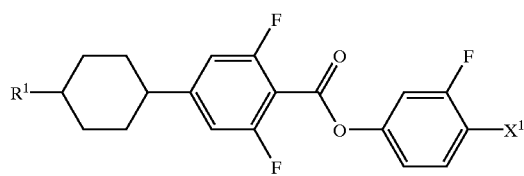
(3-59)
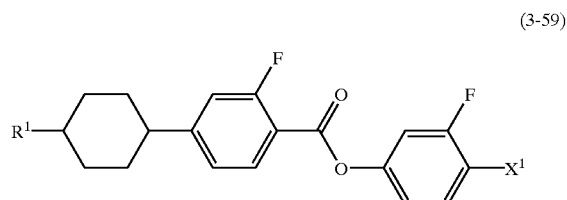

-continued
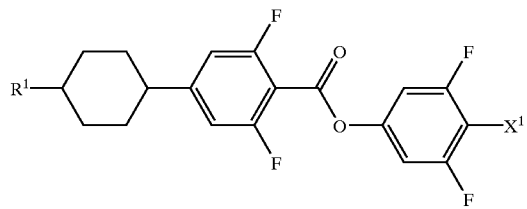
(3-60)
(3-61)
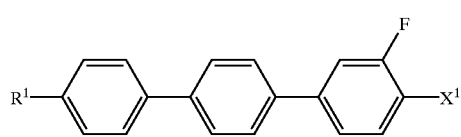
(3-62)
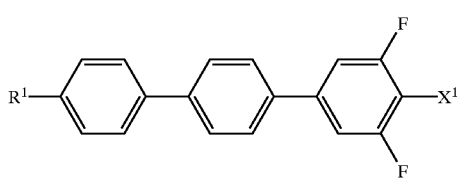
(3-63)
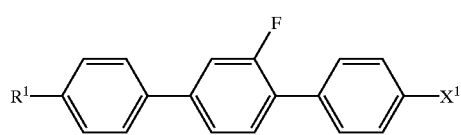
(3-64)
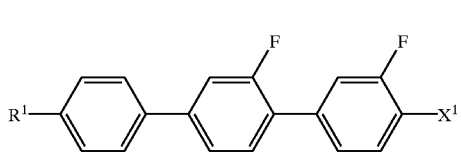
(3-65)
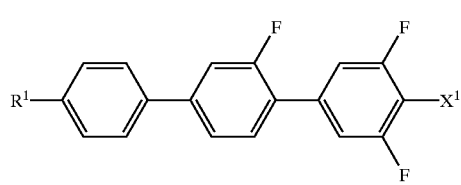
(3-66)
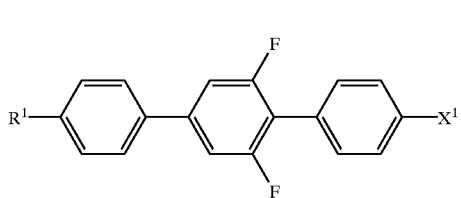
(3-67)
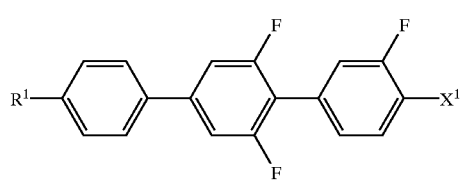
(3-68)
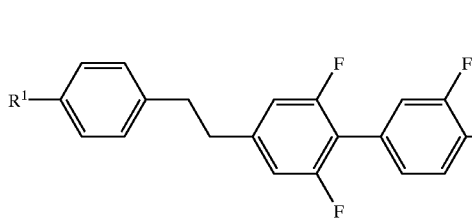
(3-69)
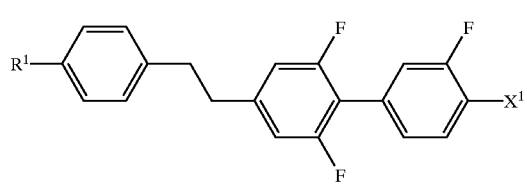
(3-70)
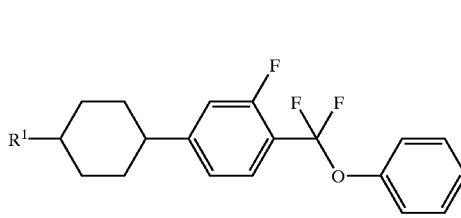
(3-71)
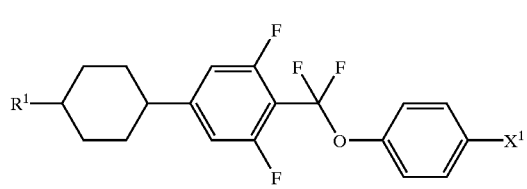
(3-72)
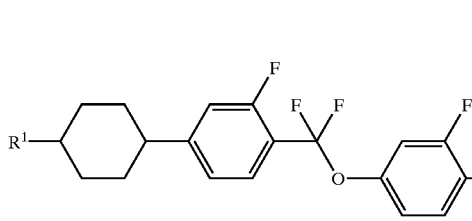
(3-73)

-continued
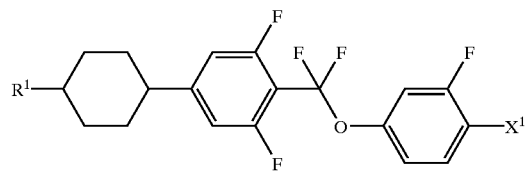
(3-74)
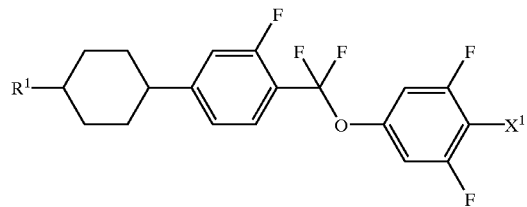
(3-75)
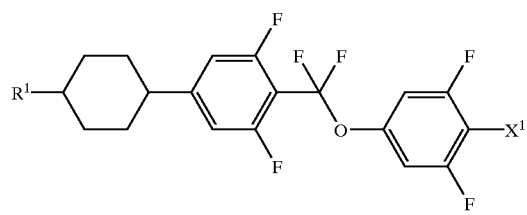
(3-76)
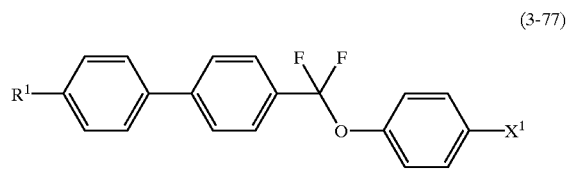
(3-77)
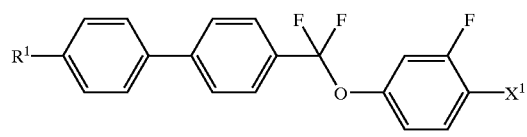
(3-78)
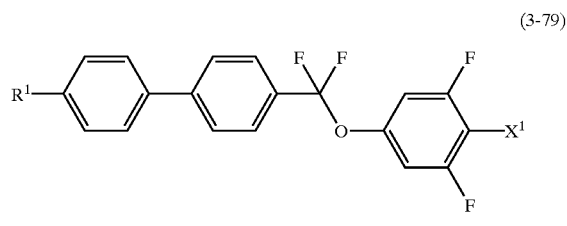
(3-79)
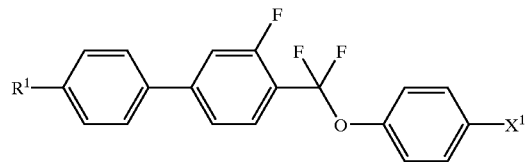
(3-80)
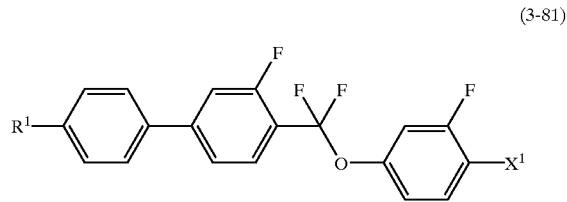
(3-81)
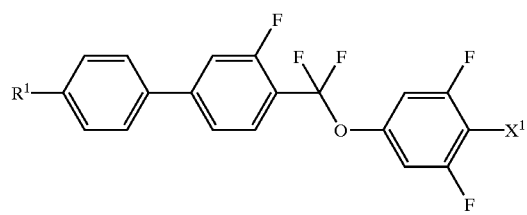
(3-82)
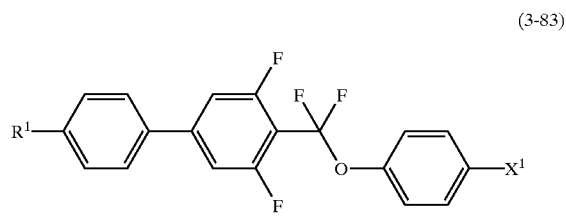
(3-83)
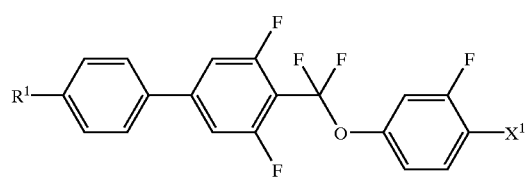
(3-84)
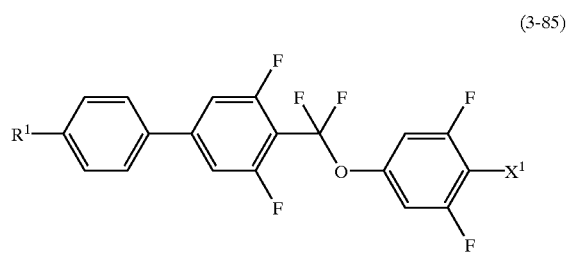
(3-85)

-continued
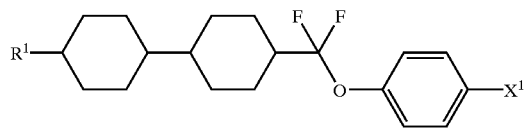
(3-86)
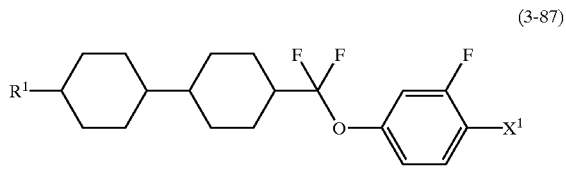
(3-87)
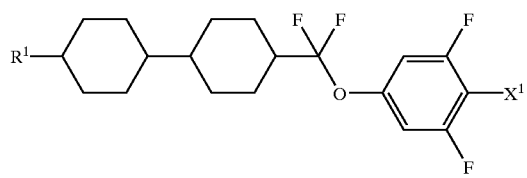
(3-88)
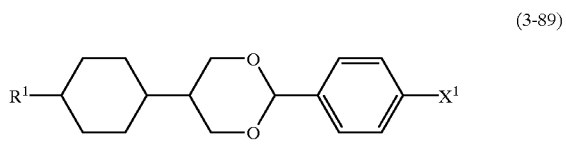
(3-89)
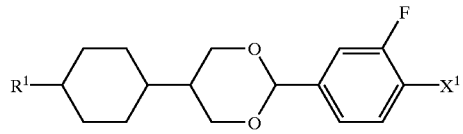
(3-90)
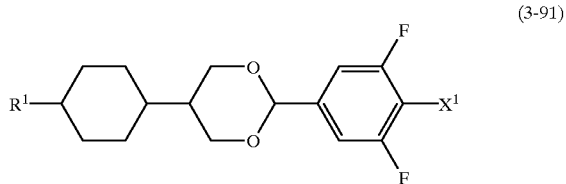
(3-91)
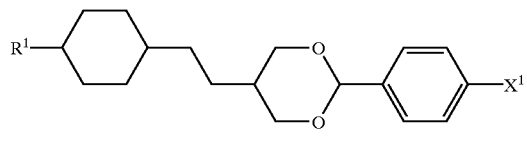
(3-92)
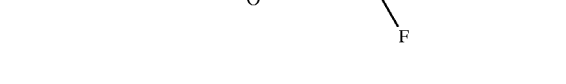
(3-93)
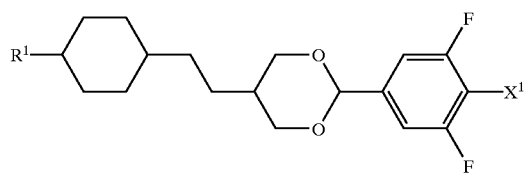
(3-94)
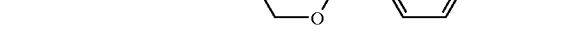
(3-95)
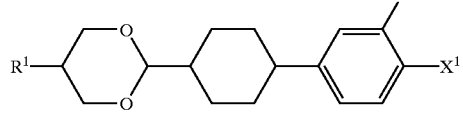
(3-96)
(3-97)
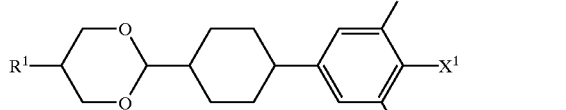
(4-1)
(4-2)
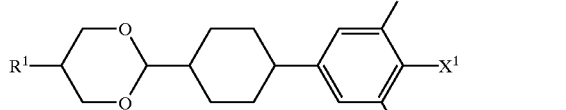
(4-3)
(4-4)

-continued
(4-5)
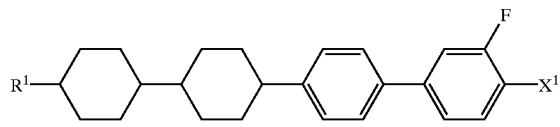
(4-6)
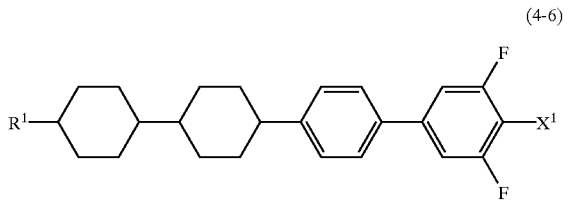
(4-7)
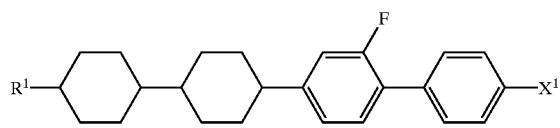
(4-8)
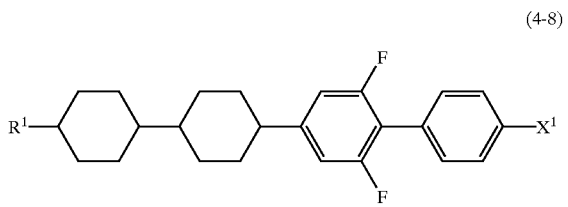
(4-9)
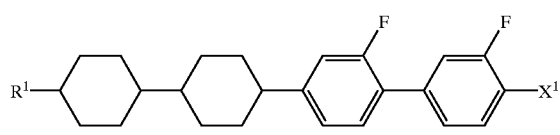
(4-10)
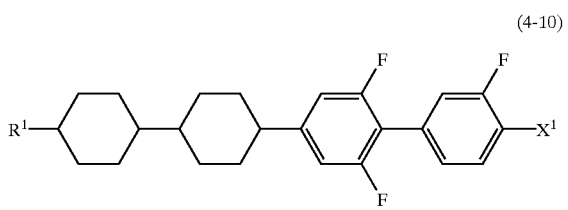
(4-11)
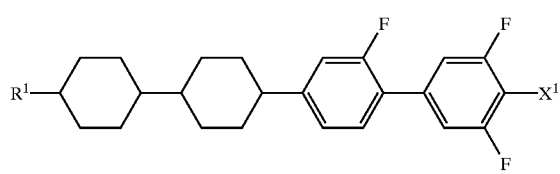
(4-12)
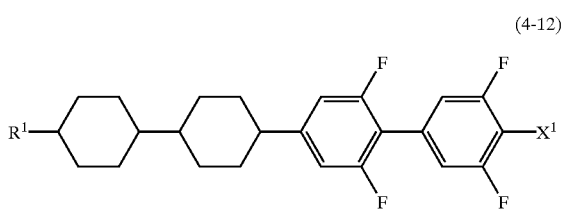
(4-13)
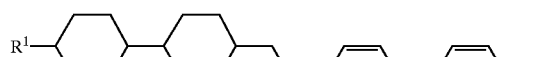
(4-14)
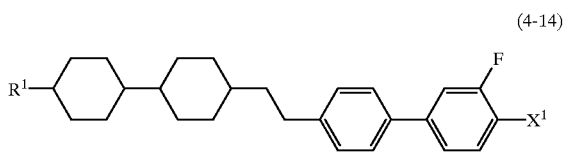
(4-15)
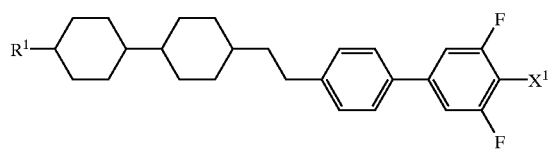
(4-16)
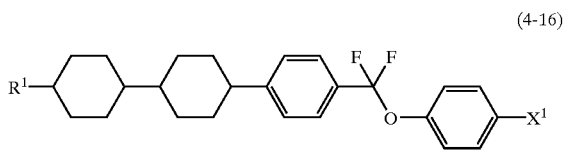
(4-17)
(4-18)

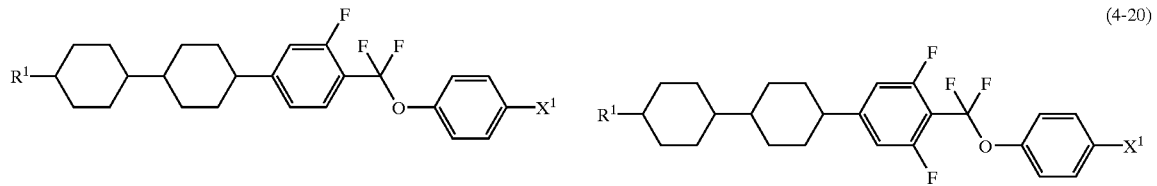
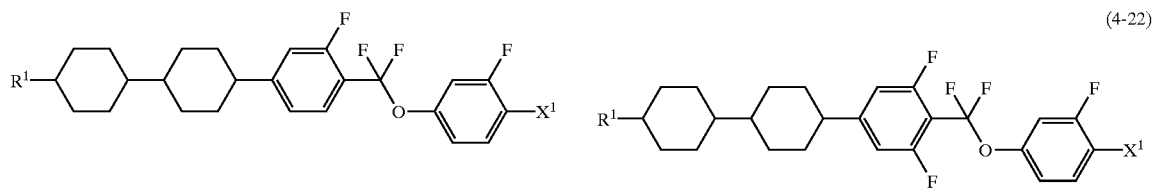
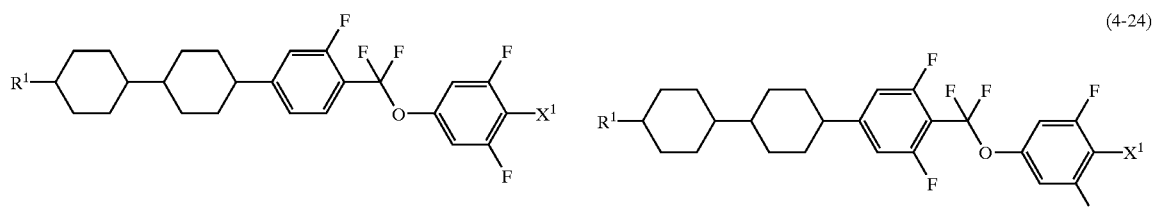
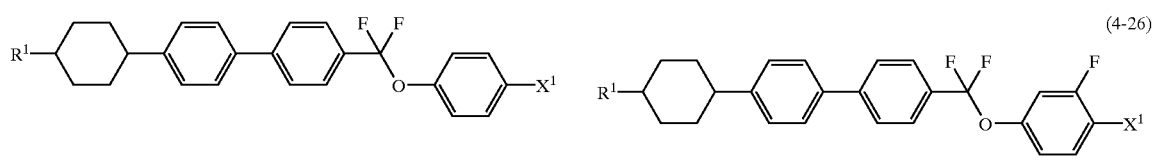
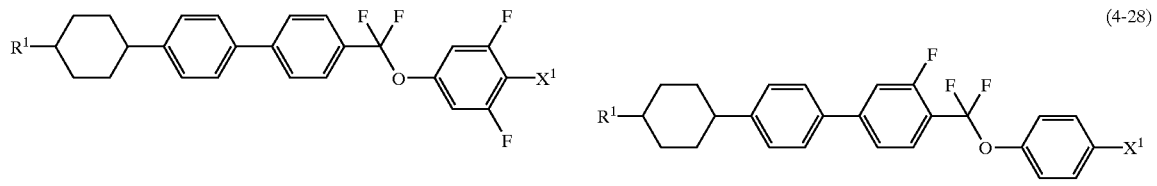
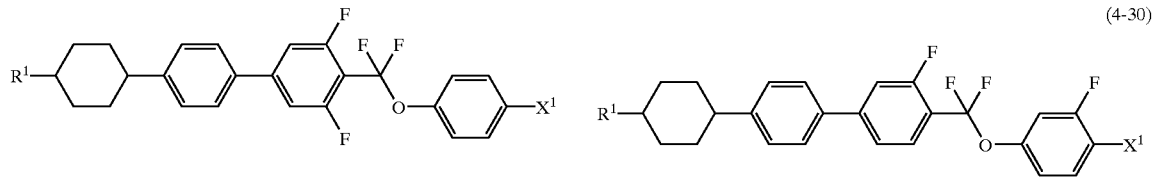
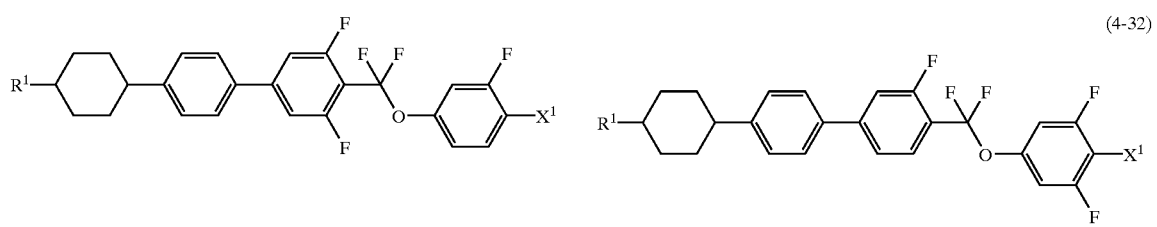

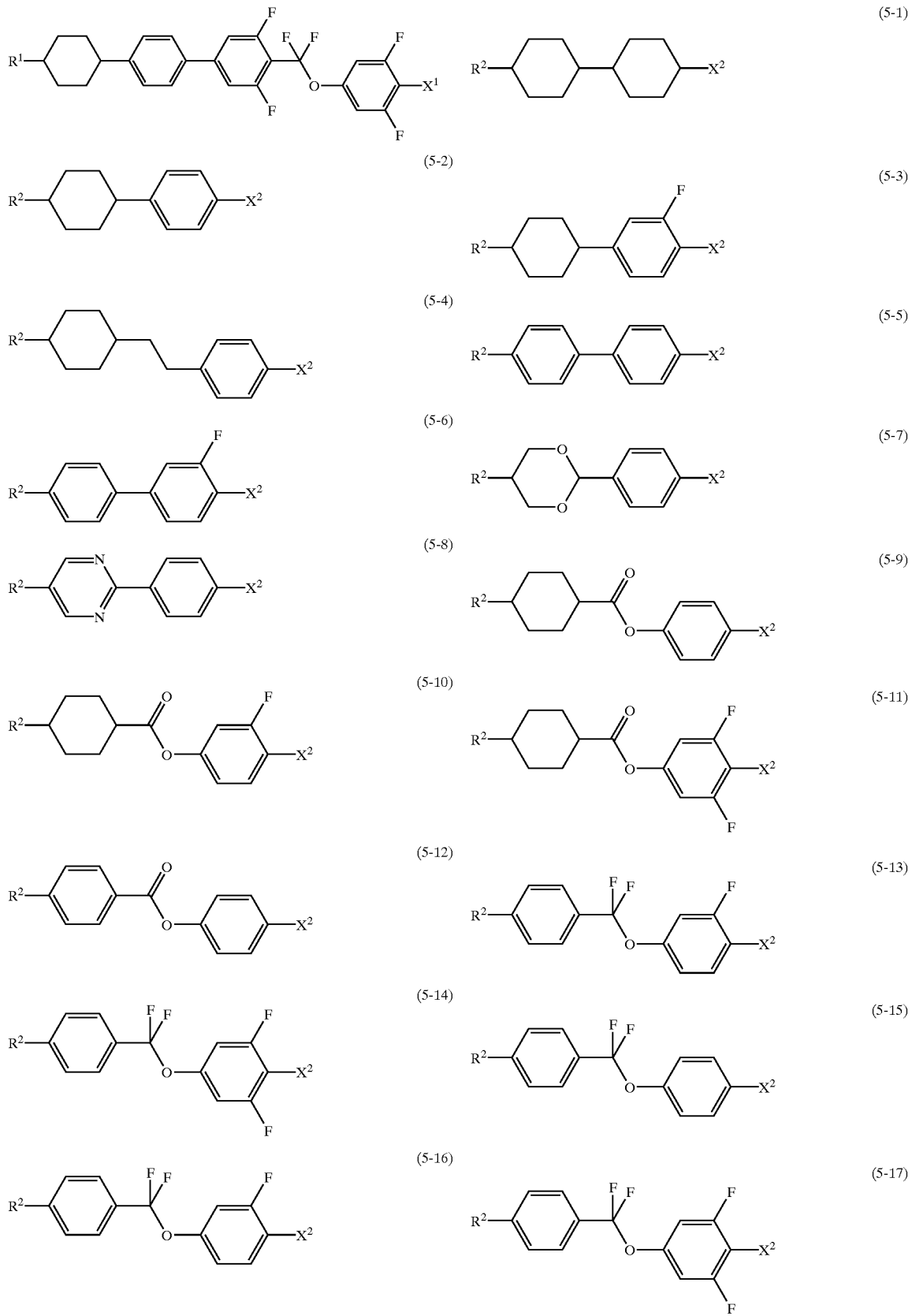

-continued
(5-18) 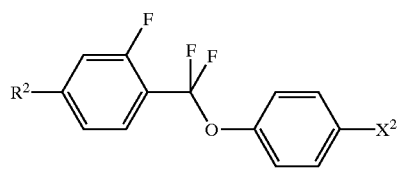
(5-19) 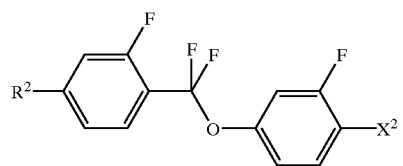
(5-20) 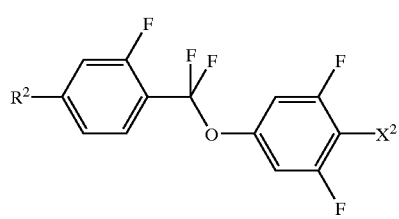
(5-21) 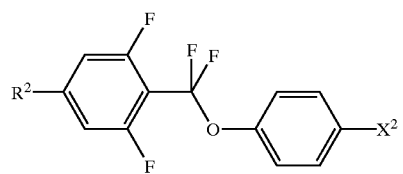
(5-22) 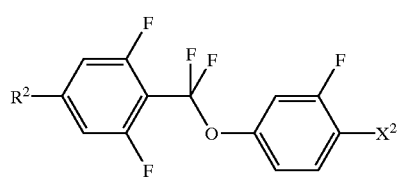
(5-23) 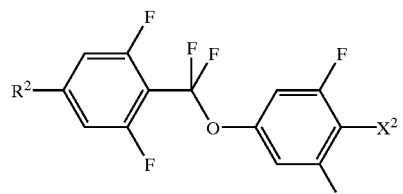
(5-24) 
(5-25) 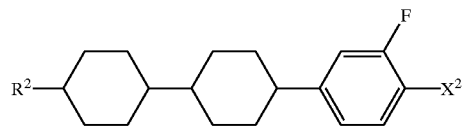
(5-26) 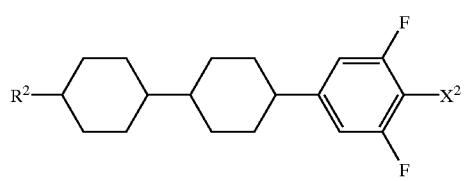
(5-27) 
(5-28) 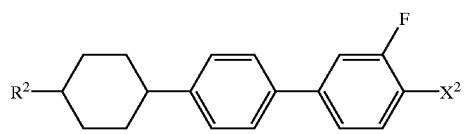
(5-29) 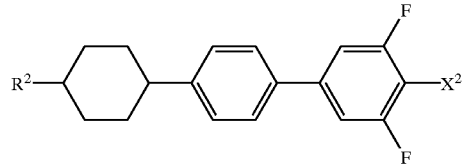
(5-30) 
(5-31) 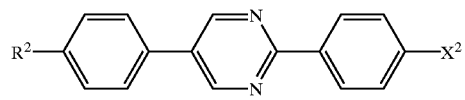
(5-32) 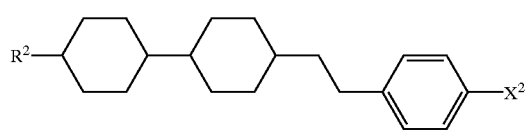
(5-33) 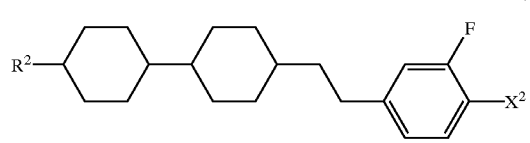

-continued
(5-34)
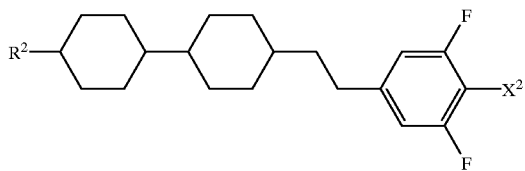
(5-35)
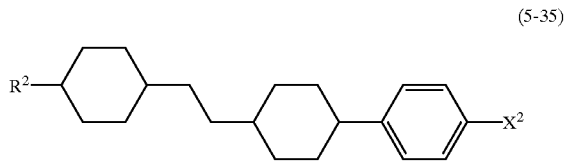
(5-36)
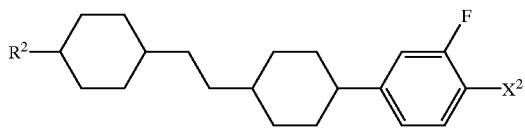
(5-37)
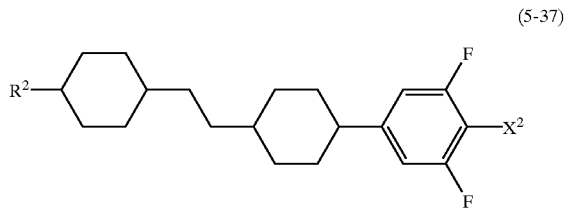
(5-38)
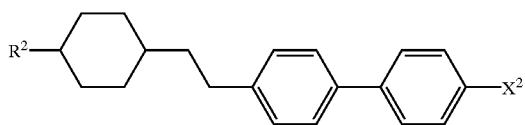
(5-39)
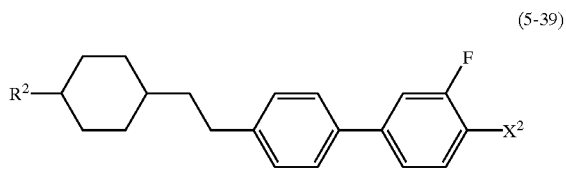
(5-40)
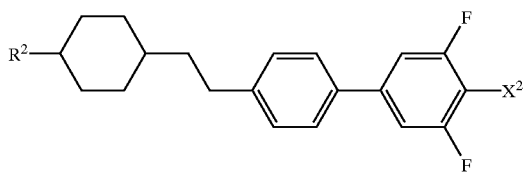
(5-41)
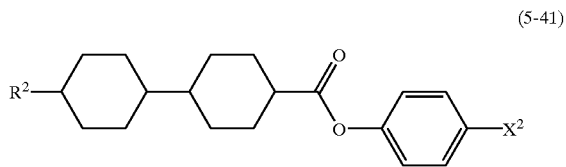
(5-42)
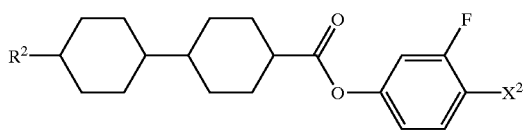
(5-43)
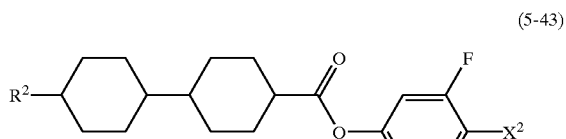
(5-44)
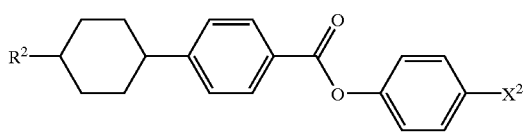
(5-45)
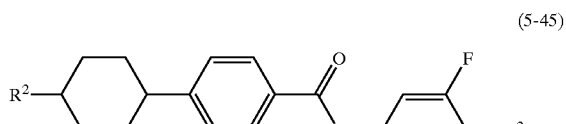
(5-46)
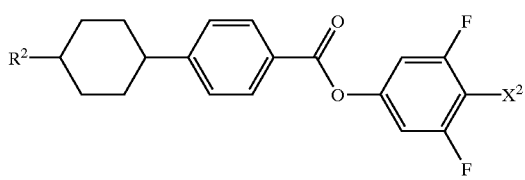
(5-47)
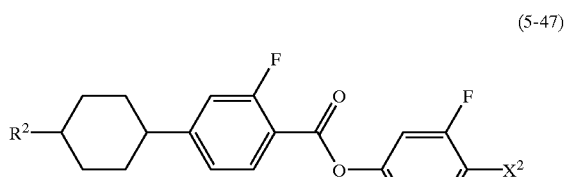

-continued
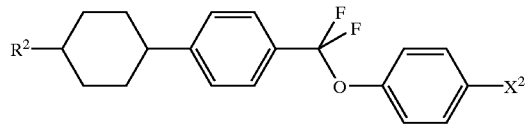
(5-48)
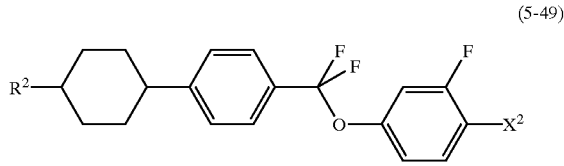
(5-49)
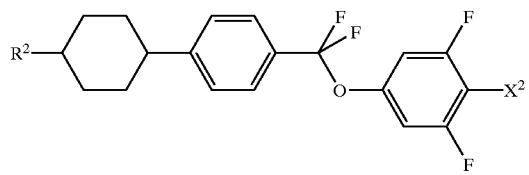
(5-50)
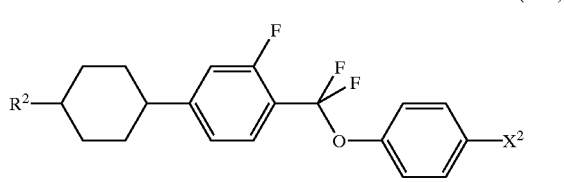
(5-51)
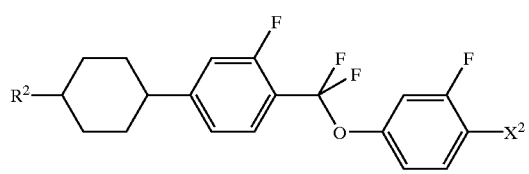
(5-52)
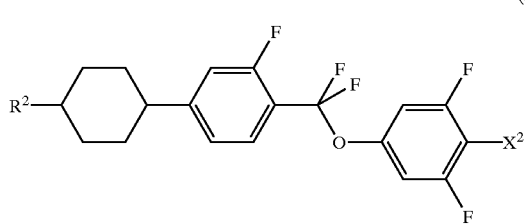
(5-53)
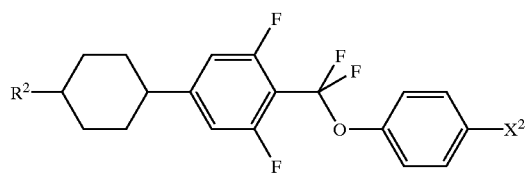
(5-54)
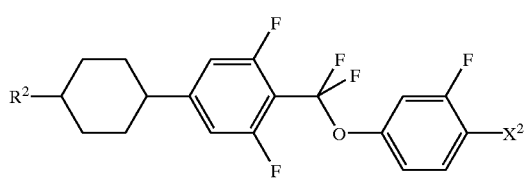
(5-55)
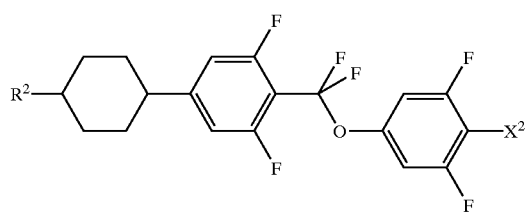
(5-56)
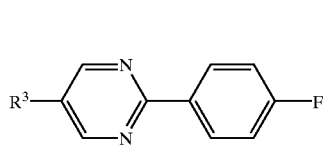
(6-1)
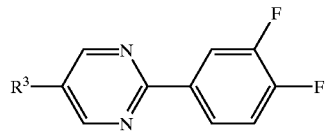
(6-2)
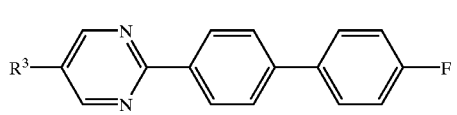
(6-3)
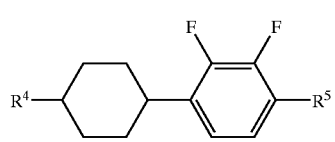
(7-1)
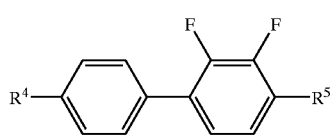
(7-2)
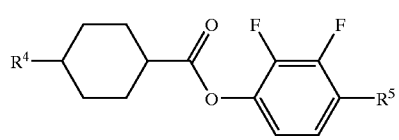
(7-3)
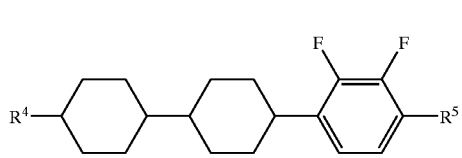
(8-1)

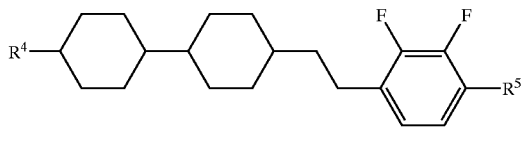
(8-2)
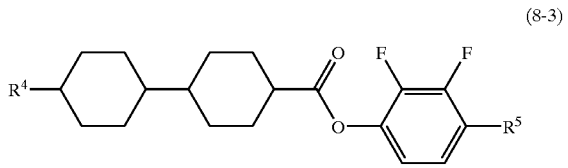
(8-3)
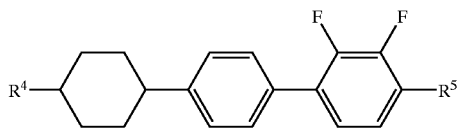
(8-4)
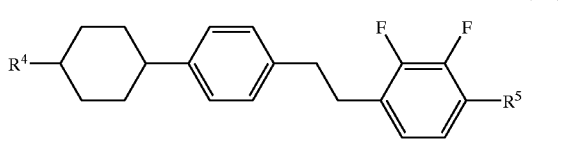
(8-5)
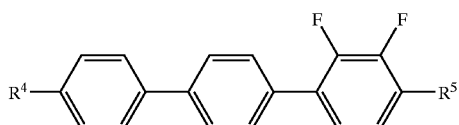
(9-1)
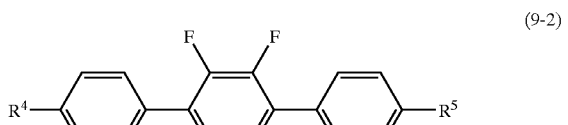
(9-2)
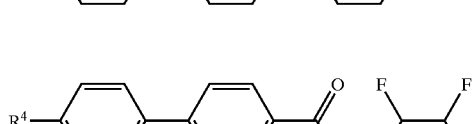
(9-3)
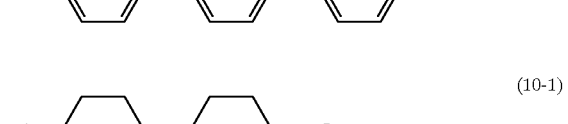
(10-1) (10-2) (10-3) (10-4) (10-5) (10-6) (10-7) (10-8) (10-9) (10-10) (10-11) (11-1) (11-2)
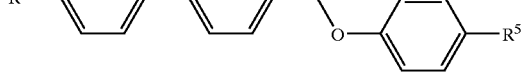
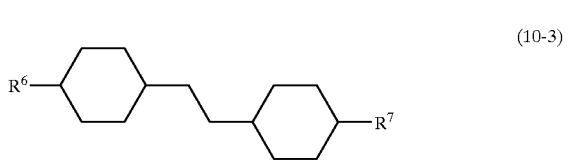
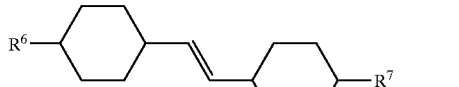

-continued
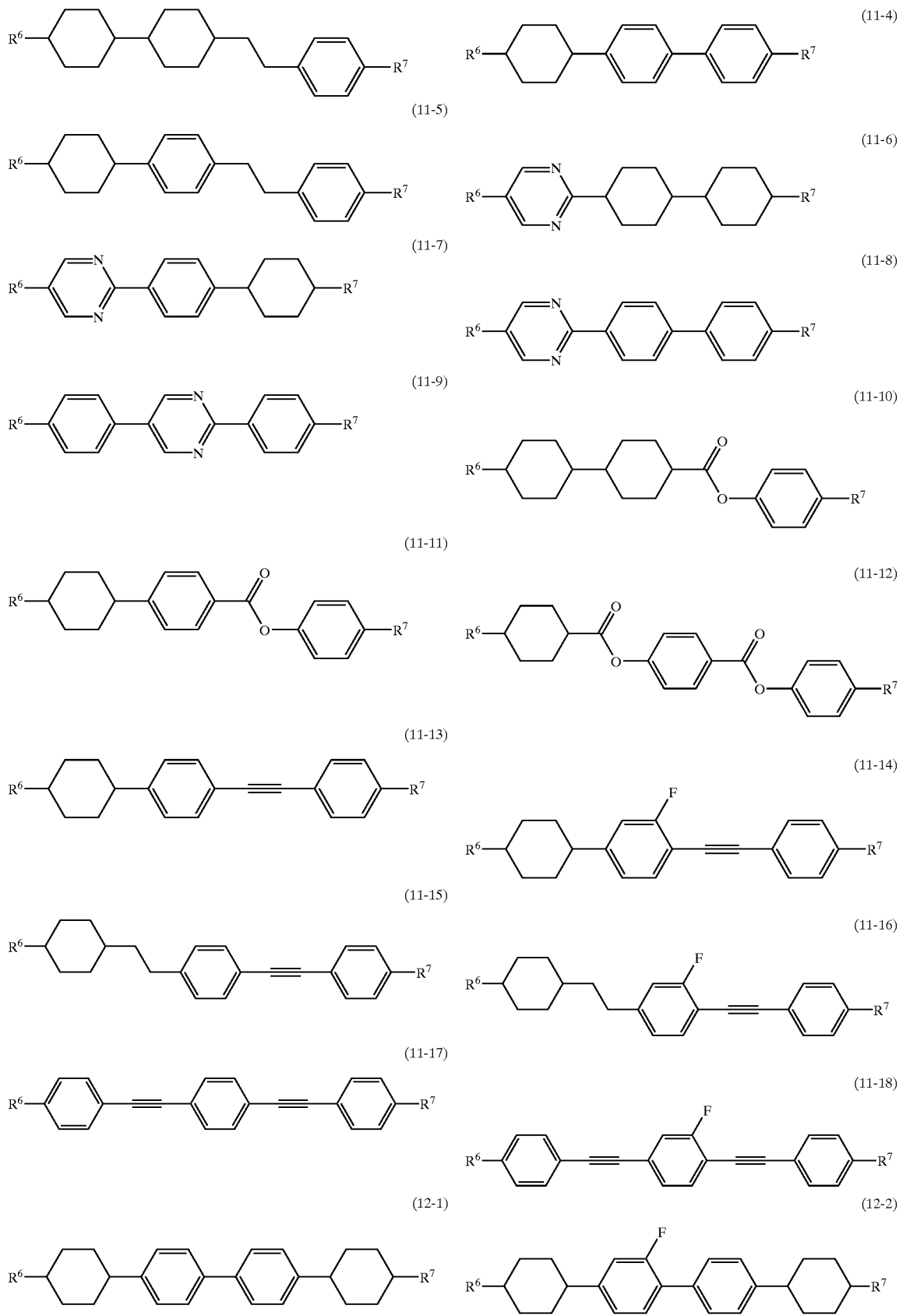

(12-3)
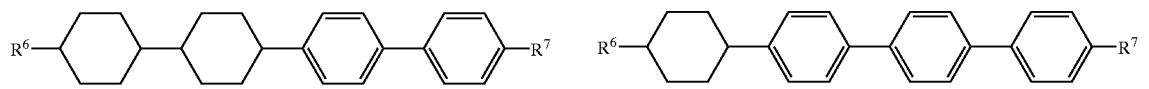
(12-4)
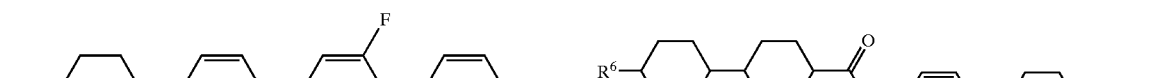
(12-5)
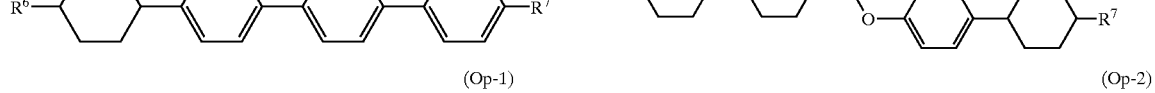
(12-6)
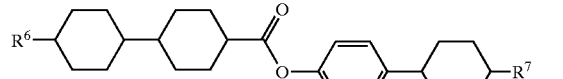
(Op-1)
(Op-2)
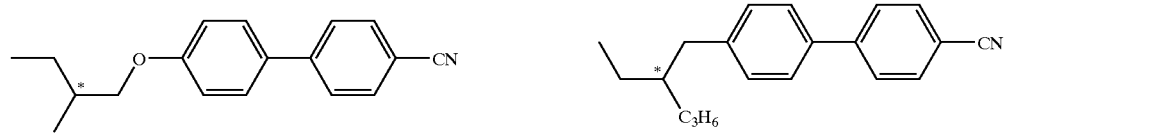
(Op-3)
(Op-4)
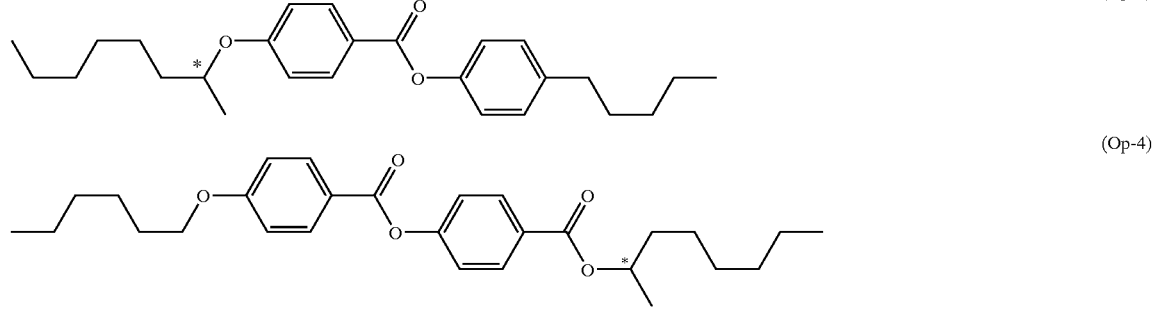
(Op-5)
(Op-6)
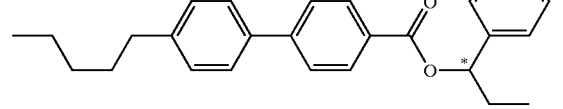
(Op-7)
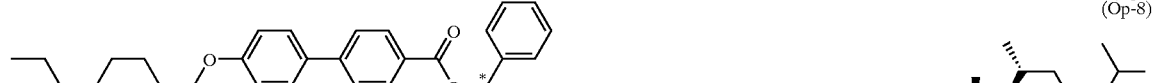
(Op-8)
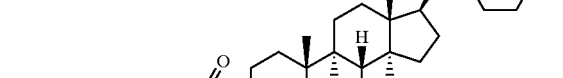
(Op-9)
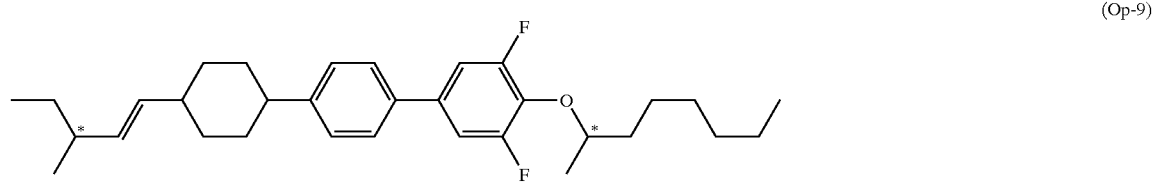
(Op-10)
(Op-11)
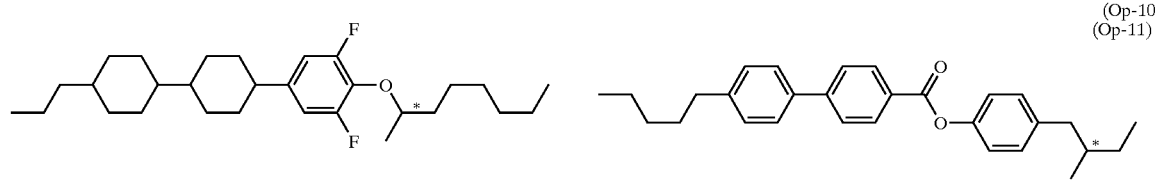

(Op-12)

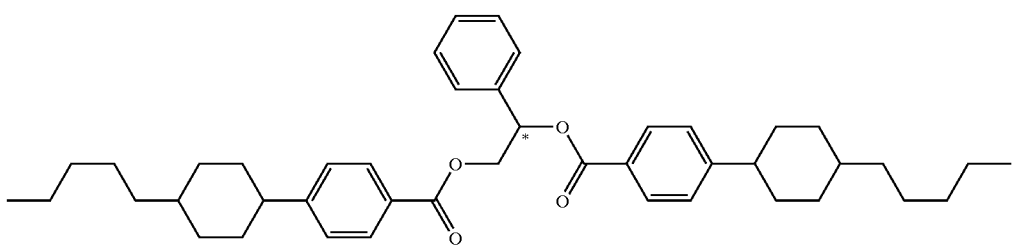

The composition of this invention is prepared by known methods. For example, compounds as a component are mixed and dissolved each other by heating. Physical properties of the composition may be controlled by the addition of appropriate additives to the composition. Such additives are well known by those skilled in the art. A chiral dopant is added for the purpose of inducing a helical structure of liquid crystals to give desired twist angle. Examples of the chiral dopant are optically active compounds (Op-1) to (Op-12) given above.

The pitch of a twist is controlled by the addition of the chiral dopant to the composition. Preferable pitch is in the range from 40 to 200 micrometers for TN and TFT modes. Preferable pitch is in the range from 6 to 20 micrometers for STN mode. Preferable pitch is in the range from 1.5 to 4 micrometers for BTN mode. Relatively larger amount of a chiral dopant is added to the composition for PC mode. At least two chiral dopants may be added for the purpose of controlling temperature dependence of the pitch.

The composition of this invention can be used for modes of TN, TN-TFT, STN, GH, DS, ECB, and so forth. The composition for GH mode is prepared by adding a dichroic dye which is a compound such as merocyanine, styryl, azo, azomethine, azoxy, quinophthalone, anthraquinone, tetrazine, and so forth. The composition of this invention can also be used for NCAP which is prepared by microcapsulating nematic liquid crystals, and a polymer dispersed liquid crystal display element (PDLCD) which is prepared by forming a three-dimensional polymer network in liquid crystals, for example, a polymer network liquid crystal display element (PNLCD) and so forth.

EXAMPLES

Thirdly, the invention is further explained by the examples. This invention is not limited by these examples. In a phase transition temperature of the compounds, C, Sm, SmA, SmB, N, and I are crystals, a smectic phase, a smectic A phase, a smectic B phase, a nematic phase, and an isotropic phase, respectively, and a phase transition in a parenthesis means that it is monotropic. Unit of the temperature is ° C. Obtained compounds were identified based on the data from NMR spectra, mass-spectra, and so forth. In NMR spectra, s is singlet, d is doublet, t is triplet, q is quartet, and m is multiplet. THF stands for tetrahydrofuran, DME stands for ethylene glycol dimethyl ether, and NBS stands for N-bromosuccinimide. The following composition was used for the measurement of dielectric anisotropy (Δ∈, 25° C.) in the compound (1). A sample was prepared by adding 15 wt % of the compound (1) to 85 wt % of this composition. A method of measurement will be described later. A value of dielectric anisotropy was calculated by extrapolating a value measured.

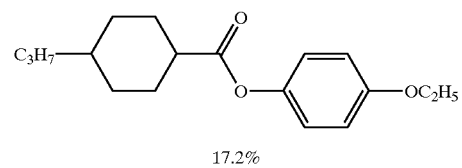

17.2%

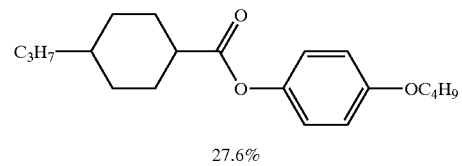

27.6%

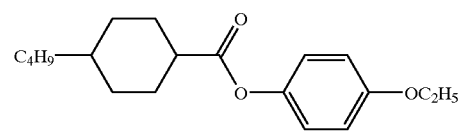

20.7%

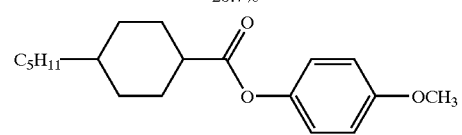

20.7%

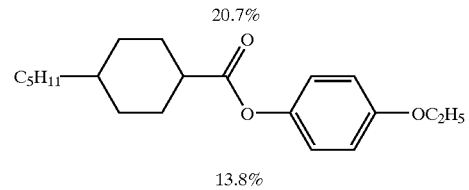

13.8%

Example 1

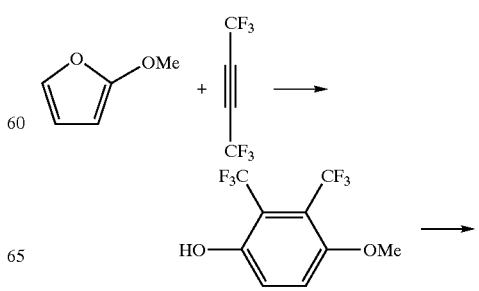

-continued

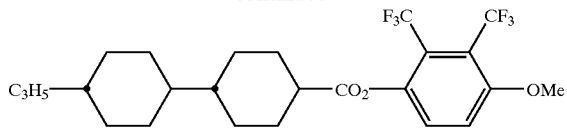

(1) Preparation of 4-methoxy-2,3-bis(trifluoromethyl) phenol 1,1,1,4,4,4-Hexafluoro-2-butyne (7.2 g, 44.4 mmol) was condensed into a 300 ml tube for sealing which had been cooled with liquid nitrogen, and 2-methoxyfuran (3.5 g, 35.7 mmol) and dried benzene (50 ml) were further added slowly. After the tube was sealed, it was heated at 85° C. for 5 hours in an oil bath. After unreacted 1,1,1,4,4,4-hexafluoro-2-butyne was removed from the reaction mixture, the residue was concentrated under reduced pressure to afford pale yellow crystals. Recrystallization of the crystals from pentane gave the title compound (5.9 g, 64%; pale yellow crystals).

(2) Preparation of 4-methoxy-2,3-bis(trifluoromethyl) phenyl 4-(4-propylcyclohexyl)cyclohexanecarboxylate A mixture of 4-methoxy-2,3-bis(trifluoromethyl)phenol (1.0 g, 3.8 mmol), 4-(4-propylcyclohexyl)cyclohexanecarboxylic acid (0.97 g, 3.8 mmol), dicyclohexylcarbodiimide (0.83 g, 4.0 mmol), 4-dimethylaminopyridine (47 mg, 0.39 mmol), and dry methylene chloride (40 ml) was stirred at room temperature for two hours. Water (1 ml) was added to the reaction mixture, which was stirred for one hour, then the solvent was removed under reduced pressure. The residue was purified by column chromatography (silica gel, an eluent is toluene) to give the title compound (1.13 g, 59%, colorless crystals). The value of $R_f$ of this compound was 0.68 (toluene) and dielectric anisotropy was −9.5 (extrapolated).

Cr (86.7 SmA) 129.1 N 164.9 I.

$^1$H-NMR(500 MHz, CDCl$_3$): δ 0.89(t, $^3$J=7.1 Hz, 3H), 0.96–1.17(m, 11H), 1.30 –1.36(m, 2H), 1.50–1.57(m, 2H), 1.75(q, $^2$J=12.0 Hz, 4H), 1.87(d, $^2$J=10.7 Hz, 2H), 2.17(d, $^2$J=11.1 Hz, 2H), 2.38–2.54(m, 1H), 3.95(s, 3H), 7.24(d, $^3$J=11.0 Hz, 2H), 7.26(d, $^3$J=11.0 Hz, 2H).

$^{19}$F-NMR(470 MHz, CDCl$_3$): δ −56.0(q, $^5$J$_{FF}$=16.5 Hz, 3F), −55.2(q, $^5$J$_{ff}$=16.5 Hz, 3F).

MS(70 eV, CI), m/z(%): 495(100, MH$^+$4), 494(85, M$^+$).

Example 2

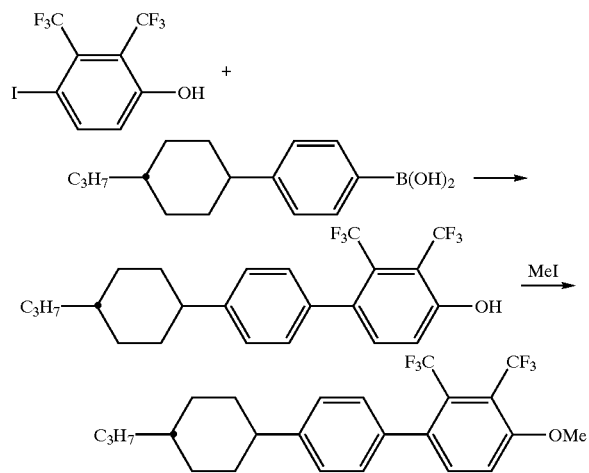

(1) Preparation of 4'-(4-propylcyclohexyl)-4-hydroxy-2,3-bis(trifluoromethyl)-1,1'-biphenyl 4-Iodo-2,3-bis(trifluoromethyl)phenol (200 mg, 0.56 mmol) prepared in accordance with the method of Gui-Dong Zhu et. al., (Organic Lett., 2000, 2(21), 3345), Pd$_2$(dba)$_3$ (26 mg, 0.028 mmol), tri(o-tolyl)phosphine (26 mg, 0.084 mmol), 4-(4-propylcyclohexyl)phenylboronic acid (275 mg, 1.12 mmol), K$_3$PO$_4$ (237 mg, 1.12 mmol), and dry DME (7 ml) were placed in a 30 ml tube for sealing in an atmosphere of dry nitrogen and was sealed. The sealed tube was heated for 6 hours in an oil bath at 80° C. The reaction mixture was cooled to room temperature, poured into diethyl ether (50 ml) and then the organic layer was washed twice with water (30 ml). After the organic layer was dried over anhydrous magnesium sulfate, the solvent was removed under reduced pressure. The obtained residue was purified by column chromatography (silica gel, an eluent is ethyl acetate) to give the title compound (123 mg, 51%).

(2) Preparation of 4'-(4-propylcyclohexyl)-4-methoxy-2,3-bis(trifluoromethyl)-1,1'-biphenyl To a mixture of 4'-(4-propylcyclohexyl)-4-hydroxy-2,3-bis(trifluoromethyl)-1,1'-biphenyl (100 mg, 0.23 mmol), potassium carbonate (32 mg, 0.23 mmol) and methanol (10 ml), methyl iodide (65.3 mg, 0.46 mmol) in an atmosphere of dry nitrogen was added dropwise over 1 hour and was heated under reflux for 3 hours. The reaction mixture was cooled to room temperature, poured into toluene (20 ml), and then the organic layer was washed twice with water (20 ml). After the organic layer was dried over anhydrous magnesium sulfate, the solvent was removed under reduced pressure. The residue was purified by column chromatography (silica gel, an eluent is toluene) to give the title compound (88.9 mg, 87%, colorless crystals).

Example 3

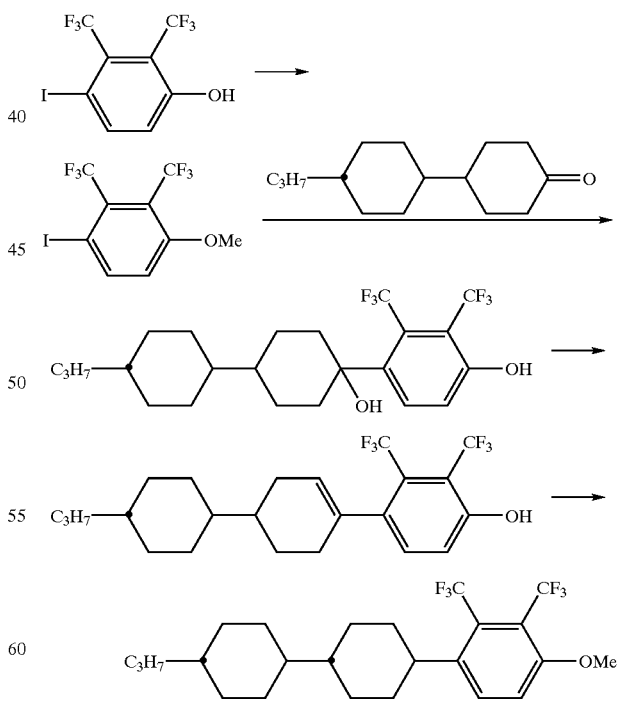

(1) Preparation of 4-iodo-2,3-bis(trifluoromethyl)-1-methoxybenzene

To a mixture of 4-iodo-2,3-bis(trifluoromethyl)phenol (2.0 g, 5.61 mmol), potassium carbonate (0.78 g, 5.61 mmol)

and methanol (20 ml), methyl iodide (1.73 g, 12.2 mmol) was added dropwise over one hour, and was heated under reflux for additional one hour. Methanol (15 ml) was distilled off from the reaction mixture, and the residue was extracted with diethyl ether (30 ml). The solvent was removed under reduced pressure, and the residue was distilled to give the title compound (1.27 g, 61%).

(2) Preparation of 4-[1-hydroxy-4-(4-propylcyclohexyl)cyclohexyl]-2,3-bis(trifluoromethyl)-1-methoxybenzene In an atmosphere of dry nitrogen, to 4-iodo-2,3-bis(trifluoromethyl)anisole (1.27 g, 3.43 mmol) in dry THF (30 ml), n-BuLi in hexane (1.65 M; 2.28 ml, 3.77 mmol) was added dropwise at −78° C. over one hour, and was stirred at the same temperature for additional one hour. To the reaction mixture formed, 4-(4-propylcyclohexyl)cyclohexanone (756 mg, 3.40 mmol) in dry THF (5 ml) was added dropwise over one hour. The reaction mixture was returned to room temperature and further stirred for 5 hours. The reaction mixture was cooled to 0° C., to which was added slowly 2M-hydrochloric acid (2 ml). Toluene (30 ml) was added to the reaction mixture and was stirred sufficiently. The separated organic layer was washed twice with saturated brine (20 ml), and dried over anhydrous magnesium sulfate. Removal of the solvent under reduced pressure gave the title compound (1.53 g, 100%). This compound was used for the subsequent reaction without purification.

(3) Preparation of 4-[4-(4-propylcyclohexyl)cyclohexe-1-yl]-2,3-bis(trifluoromethyl)-1-methoxybenzene A mixture of 4-[1-hydroxy-4-(4-propylcyclohexyl)cyclohexyl]-2,3-bis(trifluoromethyl)-1-methoxybenzene (1.5 g, 3.31 mmol), p-toluenesulfonic acid monohydrate (63 mg, 0.33 mmol) and toluene (15 ml) was placed in a Jean-Stoke equipment and was heated under reflux for 3 hours while removing water produced. The reaction mixture obtained was returned to room temperature, washed twice with water (15 ml) and dried over anhydrous magnesium sulfate. After the solid was removed by filtration, the solvent was removed under reduced pressure. The residue was purified by column chromatography (silica gel, an eluent is toluene) to give the title compound (1.22 g, 85%).

(4) Preparation of 4-[4-(4-propylcyclohexyl)cyclohexyl]-2,3-bis(trifluoromethyl)-1-methoxybenzene A mixture of 4-[4-(4-propylcyclohexyl)cyclohexe-1-yl]-2,3-bis(trifluoromethyl)-1-methoxybenzene (1.2 g, 2.76 mmol), 5%-palladium carbon (120 mg) and ethanol (30 ml) was stirred in an atmosphere of hydrogen for 12 hours. The catalyst was removed by filtration, and the filtrate was concentrated under reduced pressure. The residue was purified by column chromatography (silica gel, an eluent is toluene) and then recrystallized from ethanol five times to give the title compound (435 mg, 35%, colorless crystal).

Example 4

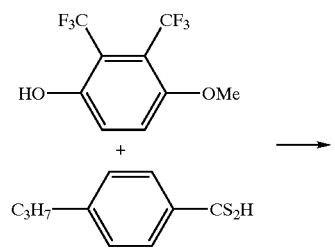

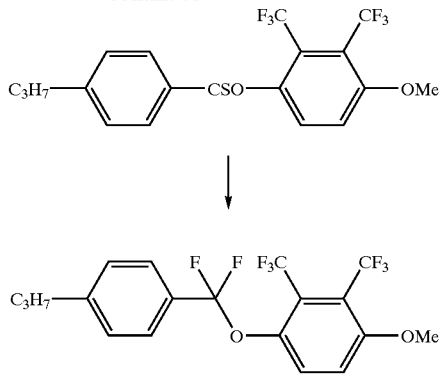

(1) Preparation of 4-methoxy-2,3-bis(trifluoromethyl)phenyl 4-propylphenylthiocarboxylate In an atmosphere of dry nitrogen, 4-propylbenzene dithiocarboxylic acid (1.7 g, 8.65 mmol) in dry THF (5 ml) was added to a suspension of 60%-sodium hydride (865 mg, 21.6 mmol) and dry THF (5 ml) at 0° C. The reaction mixture was stirred for one hour at the same temperature. 4-Methoxy-2,3-bis(trifluoromethyl)phenol (1.5 g, 5.77 mmol) in dry THF (5 ml) was added to the reaction mixture at 5° C. and was stirred for additional one hour at the same temperature. After the addition of iodine (6.0 g, 23.8 mmol) in dry THF (20 ml), the reaction mixture was stirred at room temperature for 24 hours. The reaction mixture was extracted with toluene (50 ml), the organic layer was washed with 2M-hydrochloric acid (30 ml), saturated sodium thiosulfate (30 ml), and water (30 ml) successively, and dried over anhydrous magnesium sulfate. After the solid was removed by filtration, the filtrate was concentrated under reduced pressure. The residue was purified by column chromatography (silica gel, eluent is toluene/heptane=3/7) to give the title compound (640 mg, 26%, yellow crystals).

(2) Preparation of 4-methoxy-2,3-bis(trifluoromethyl)phenyl α,α-difluoro-4-propylbenzyl ether HF-pyridrine complex (900 mg) was added dropwise at −68° C. to NBS (420 mg, 2.36 mmol) in dry methylene chloride (5 ml). Then, 4-methoxy-2,3-bis(trifluoromethyl)phenyl 4-propylphenyl thiocarboxylate (500 mg, 1.18 mmol) in dry methylene chloride (15 ml) was added at the same temperature, and was stirred for one hour. The reaction mixture obtained was poured into a saturated aqueous solution of sodium hydrogen carbonate (100 ml), the separated organic layer was washed with water (50 ml), and dried over anhydrous magnesium sulfate. After the solvent was removed under reduced pressure, the residue was purified by column chromatography (silica gel; an eluent is toluene/heptane=3/7) to give the title compound (221 mg, 44%, colorless oil). The $R_f$ value of this compound was 0.46 (toluene) and dielectric anisotropy was −6.8 (extrapolated). Mp: 28.2° C.

$^1$H-NMR(500 MHz, CDCl$_3$): δ 0.98(t, $^3$J=7.3 Hz, 3H), 1.65–1.73(m, 2H), 2.67(t, $^3$J=7.5 Hz, 2H), 4.00(s, 3H), 7.19–7.32(m, 4H), 7.66–7.71(m, 2H).

$^{19}$F-NMR(470 MHz, CDCl$_3$): δ −64.5(d, $^6$J$_{FF}$=4.4 Hz, 2F), −56.1 (q, $^5$J$_{FF}$=16.7 Hz, 3F), −54.1(q of t, $^5$J$_{FF}$=16.7 Hz, $^6$J$_{FF}$=4.4 Hz, 3F).

MS(70 eV, EI), m/z(%):428(7, M$^+$), 409(7, M$^+$−F), 169 (100).

Example 5

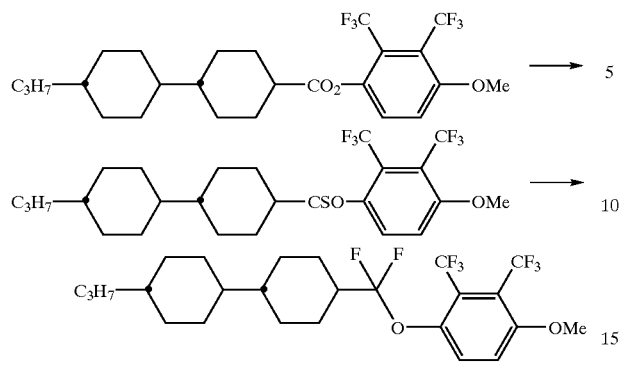

(1) Preparation of 4-methoxy-2,3-bis(trifluoromethyl) phenyl trans-4-(trans-4-propylcyclohexyl) cyclohexylthiocarboxylate In an atmosphere of dry nitrogen, 4-methoxy-2,3-bis (trifluoromethyl)phenyl 4-(4-propylcyclohexyl) cyclohexanecarboxylate (7.0 g, 14.2 mmol) prepared in Example 1, and 2,4-bis(4-methoxyphenyl)-1,3-dithia-2,4-diphosphetan-2,4-disulfide (Lawesson's reagent, 8.6 g, 21.3 mmol) were added to mesitylene (50 ml), and was stirred at 160° C. for 7 hours. After cooling gradually to room temperature and adding water (100 ml), the mixture was extracted with toluene (200 ml). The extract was washed successively with a saturated aqueous solution of sodium carbonate (50 ml) and then water (50 ml), and dried over anhydrous magnesium sulfate. After the solvent was removed under reduced pressure, the residue was purified by column chromatography (silica gel, an eluent is toluene/heptane=3/7) to give the title compound (2.1 g, 29%, yellow crystals).

(2) Preparation of 4-methoxy-2,3-bis(trifluoromethyl) phenyl α,α-difluoro-α-(trans-4-(trans-4-propylcyclohexyl)cyclohexyl)methyl ether HF-pyridine complex (3.0 g) was added dropwise at −68° C. to NBS (1.4 mg, 7.9 mmol) in dry methylene chloride (15 ml). Then, 4-methoxy-2,3-bis(trifluoromethyl)phenyl trans-4-(trans-4-propylcyclohexyl)cyclohexylthiocarboxylate (2.0 g, 3.9 mmol) in dry methylene chloride (30 ml) was added at the same temperature and the mixture was stirred for additional one hour. The reaction mixture obtained was poured into a saturated aqueous solution of sodium hydrogencarbonate (300 ml), the separated organic layer was washed with water (150 ml), and dried over anhydrous magnesium sulfate. After the solvent was removed under reduced pressure, the residue was purified by column chromatography (silica gel, an eluent is tioluene/heptane=3/7) to give the title compound (830 mg, 41%, colorless crystals). The $R_f$ value of this compound was 0.56 (toluene/heptane=3/7) and dielectric anisotropy was −7.2 (extrapolated).

Cr 99.3 N 118.5 I.

$^1$H-NMR(500 MHz, CDCl$_3$): δ 0.87 (t, $^3$J=7.4 Hz, 3H), 0.96–1.16(m, 11H), 1.25–1.40(m, 4H), 1.68–1.78(m, 4H), 1.81–1.87(m, 2H), 1.99–2.06 (m, 3H), 3.93(s, 3H), 7.20(d, $^3$J=9.4 Hz, 1H), 7.53(d, $^3$J=9.4 Hz, 1H).

$^{19}$F-NMR(470 MHz, CDCl$_3$): δ −77.92~−77.85(m, 2F), −56.1(q, $^5$J$_{FF}$=16.5 Hz, 3F), −54.3(qof t, $^5$J$_{FF}$=16.5 Hz, $^6$J$_{FF}$=3.8 Hz, 3F).

MS(70 eV, EI), m/z(%): 516(9, M$^+$), 260(100).

Example 6

The following compounds are prepared in a manner similar to those described in Examples 1 to 5. The compounds prepared in Examples 1 to 5 are also exemplified. Among these compounds, there are compounds having —(CH$_2$)$_2$— as a bonding group. It is possible to prepare the corresponding compounds having —C≡C—, —(CH$_2$)$_3$—O— or —O—(CH$_2$)$_3$— instead of the compounds having —(CH$_2$)$_2$—. In these compounds, a black dot shows that the configuration is trans. A value of dielectric anisotropy is obtained by extrapolating a measured value.

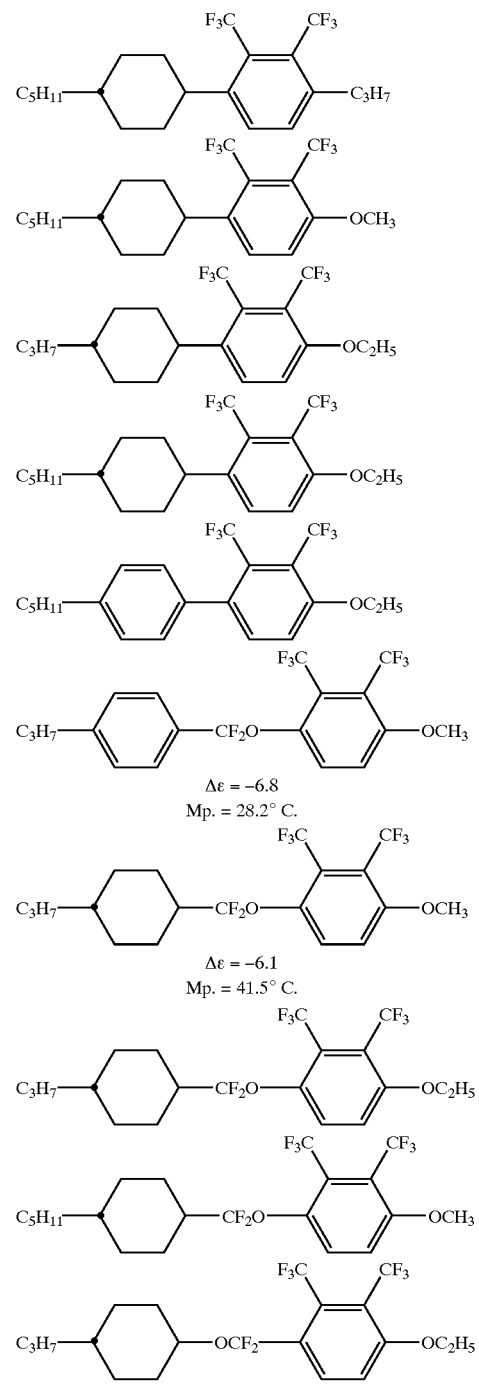

Δε = −6.8
Mp. = 28.2° C.

Δε = −6.1
Mp. = 41.5° C.

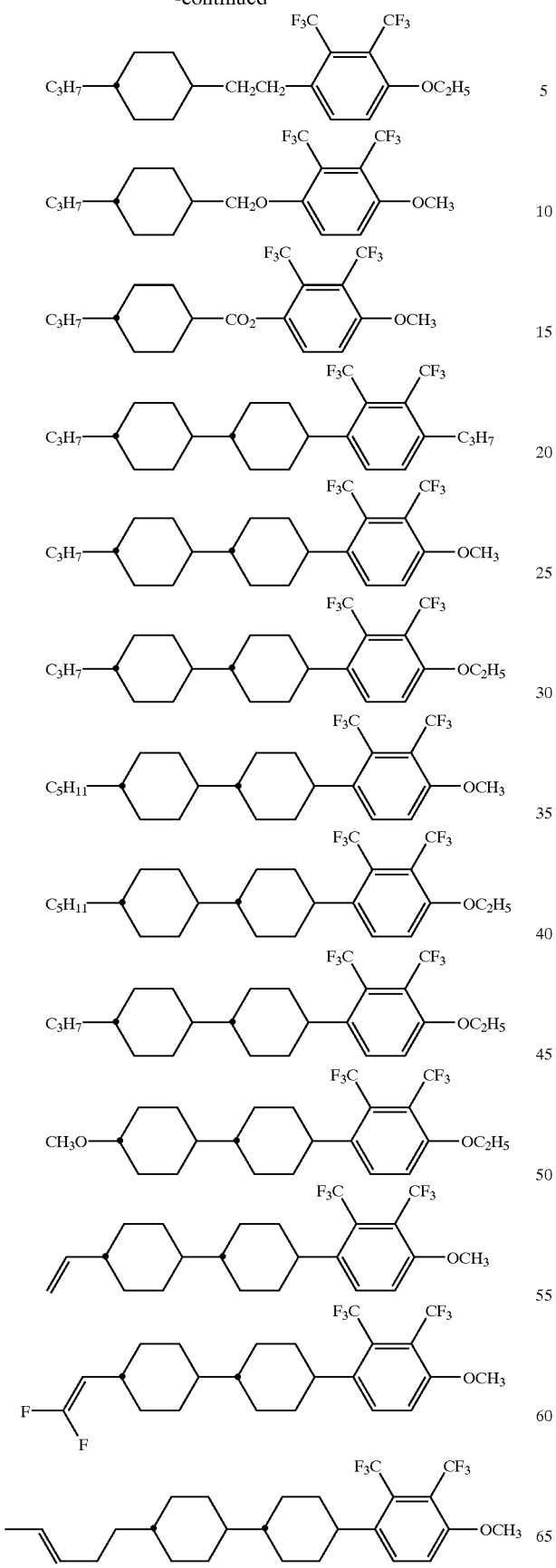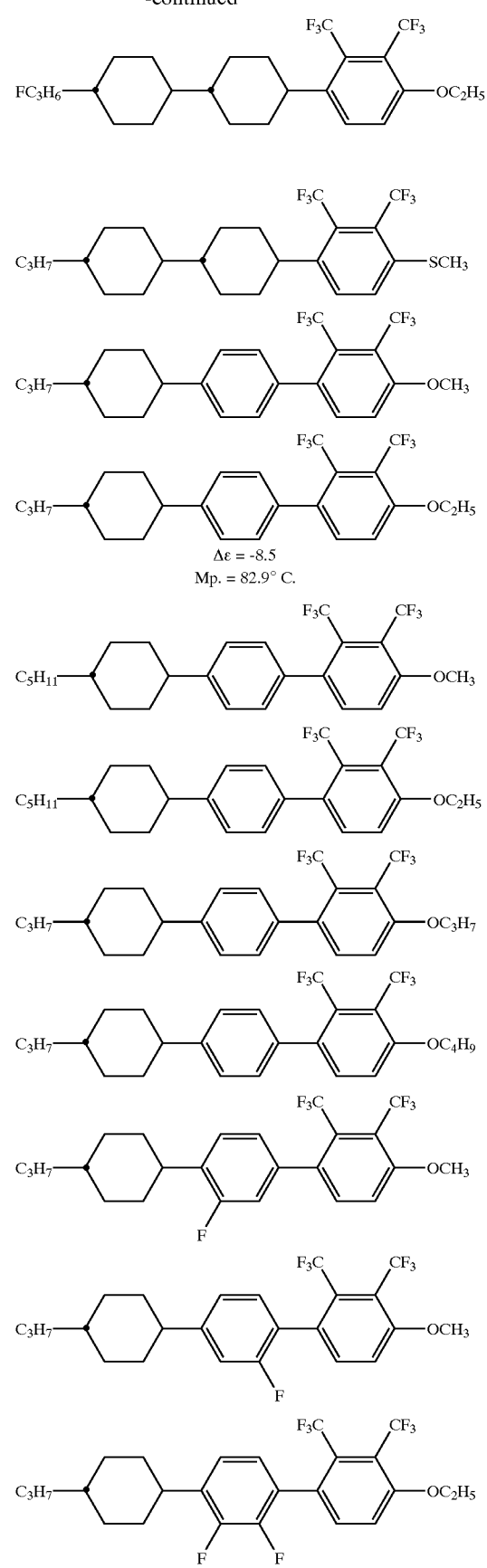

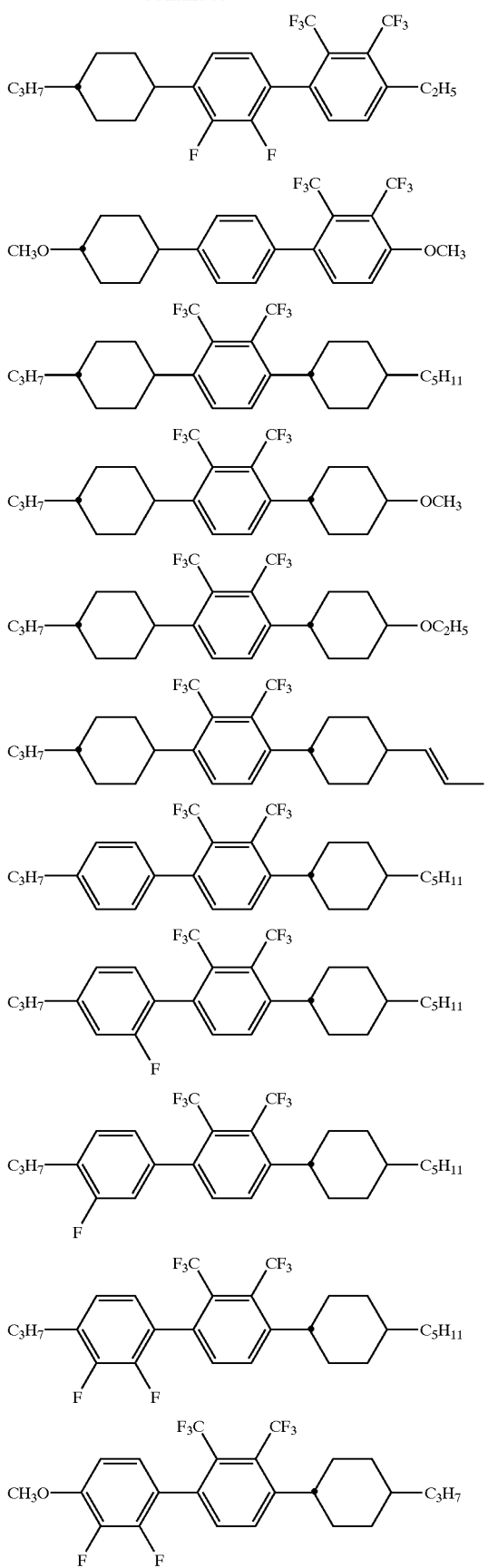
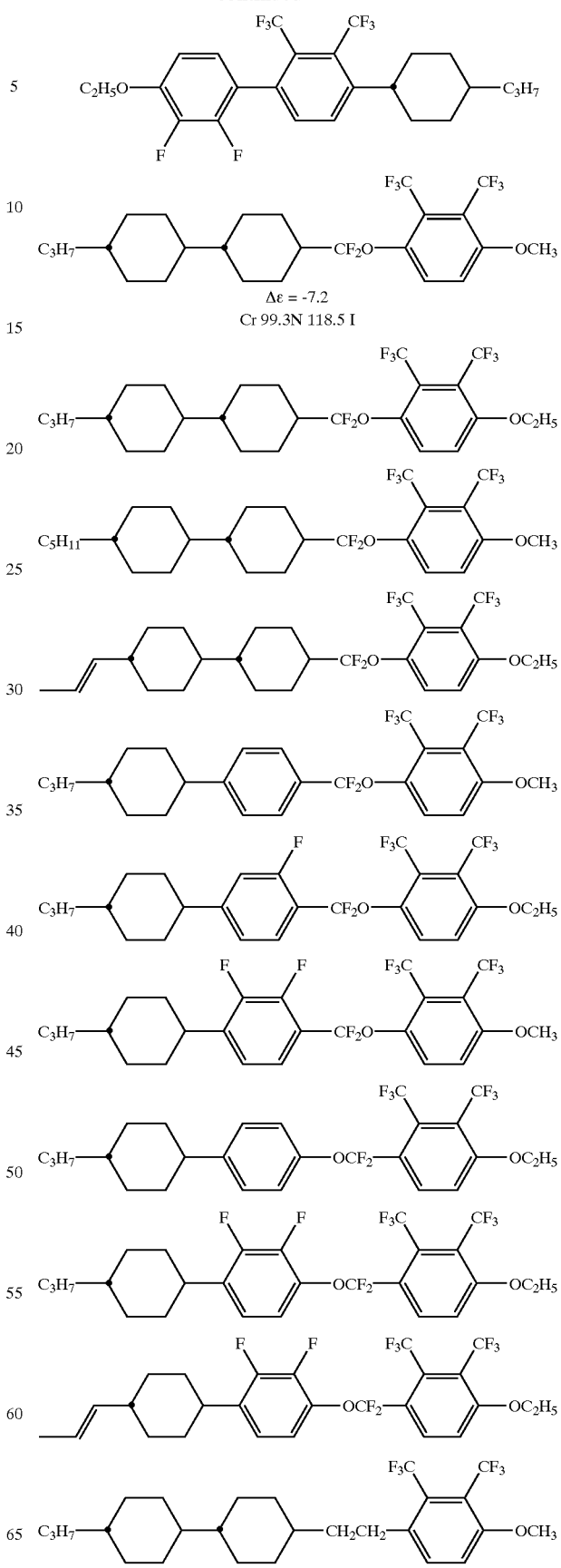

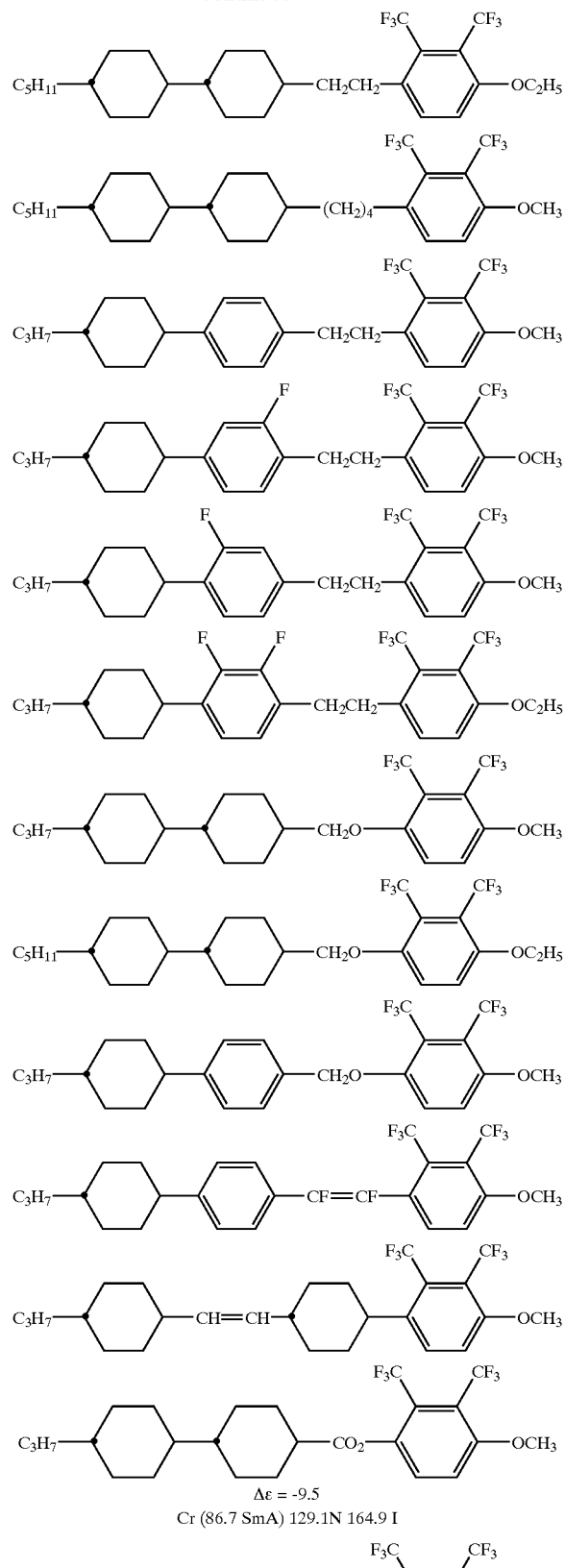
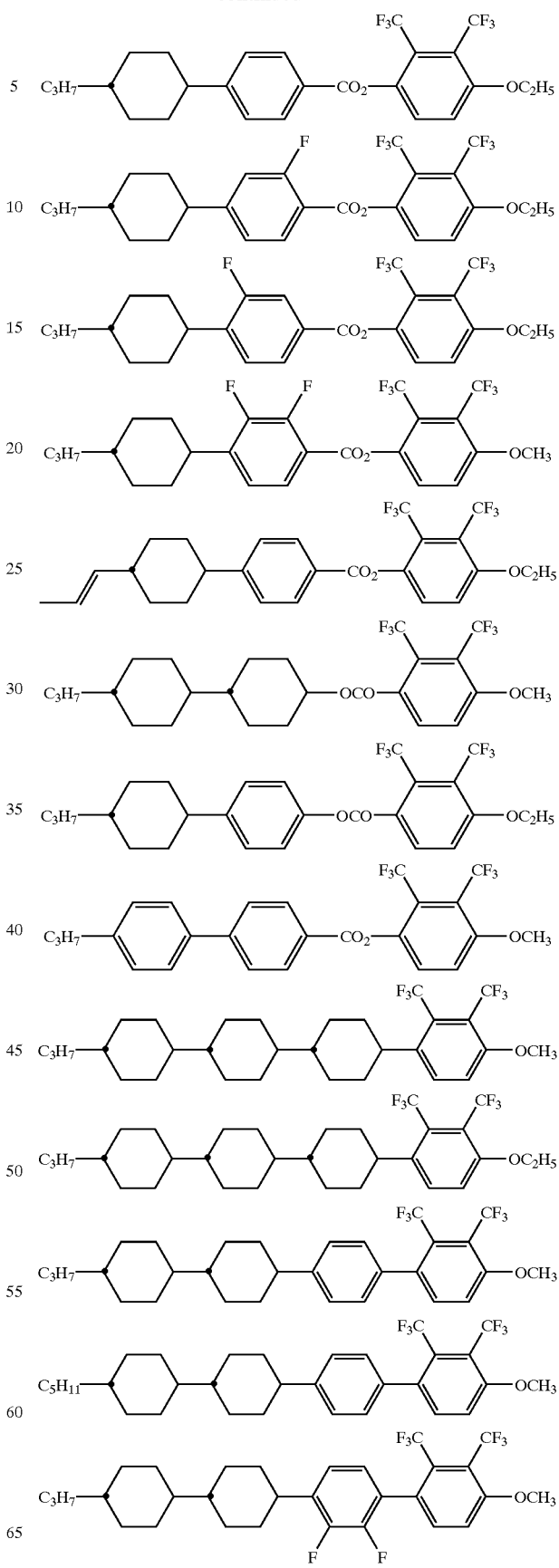

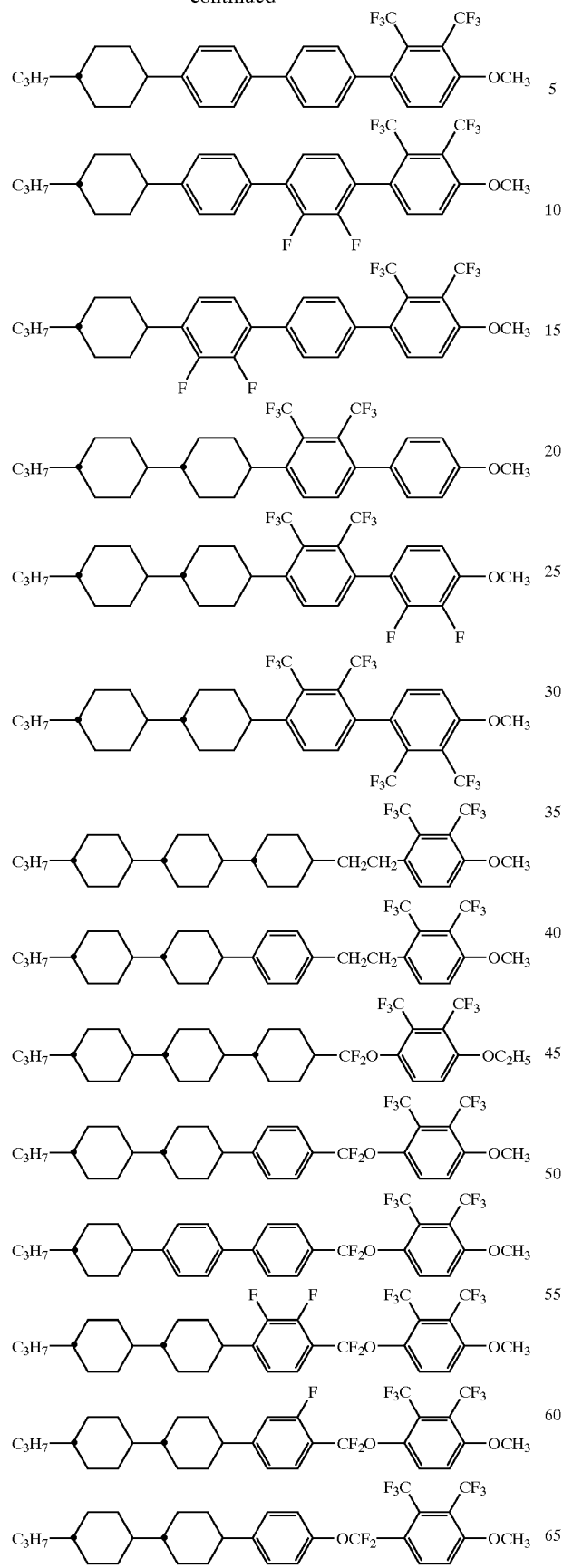
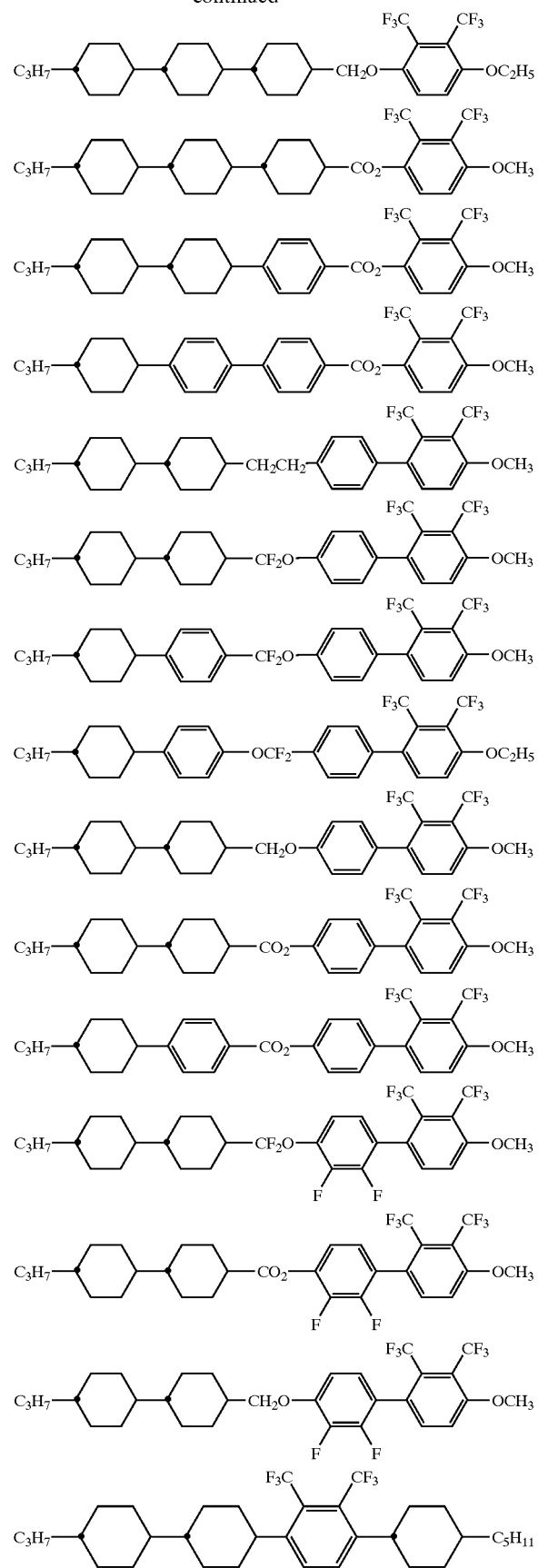

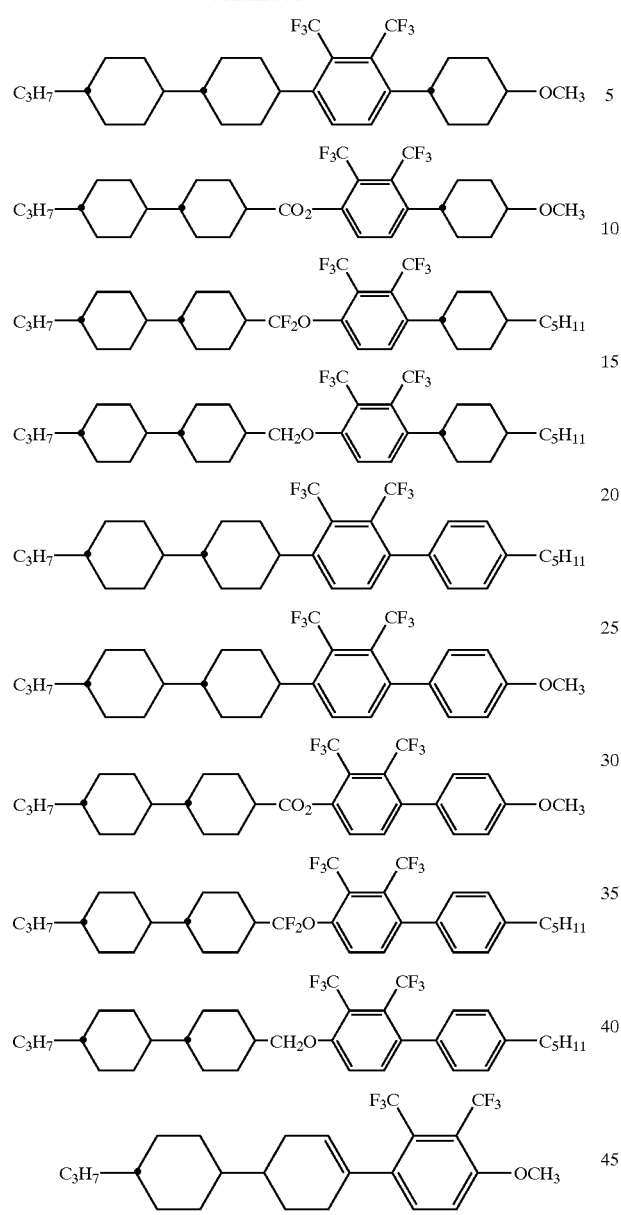
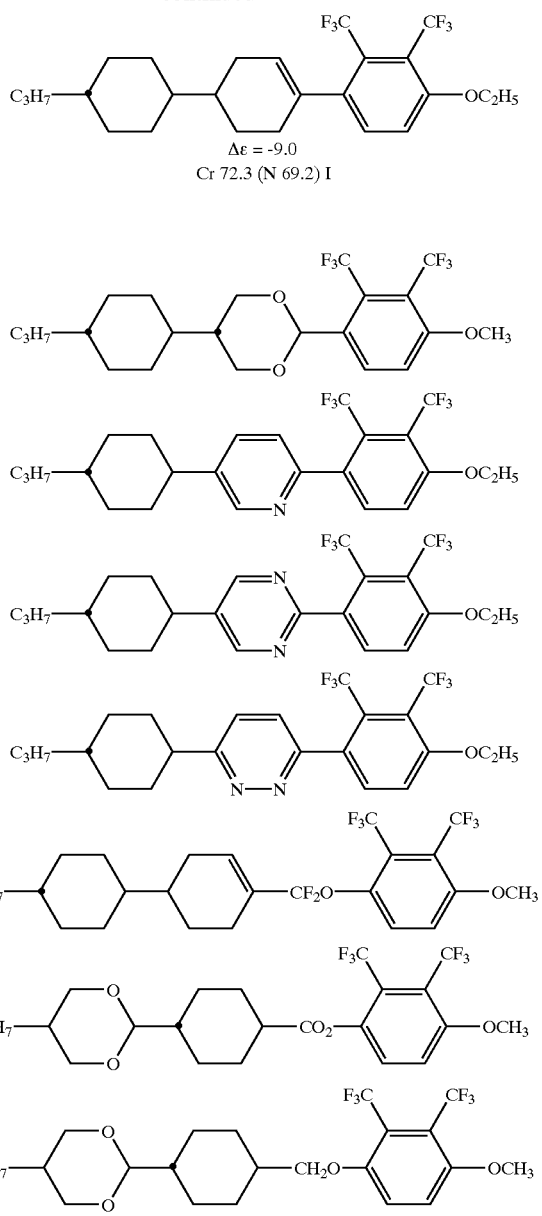
TABLE 1
Method for Description of Compounds Using Symbols
R—(Al)—Z1----Zn—(An)—X
| 1) Left Terminal Group R— | Symbol | 3) Bonding Group —Zn— | Symbol |
|---|---|---|---|
| $C_nH_{2n+1}$— | n- | —C2H4— | 2 |
| $C_nH_{2n+1}O$— | nO— | —C4H8— | 4 |
| $C_nH_{2n+1}OC_mH_{2m+1}$— | nOm- | —COO— | E |
| $CH_2=CH$— | V— | —C≡C— | T |
| $CH_2=CHC_nH_{2n}$— | Vn- | —CH=CH— | V |
| $C_nH_{2n+1}CH=CHC_mH_{2m}$— | nVm- | —CF_2O— | CF2O |
| $C_nH_{2n+1}CH=CHC_mH_{2m}CH=CHC_kH_{2k}$— | nVmVk- | —OCF_2— | OCF2 |

TABLE 1-continued

Method for Description of Compounds Using Symbols
R—(Al)—Z1----Zn—(An)—X

| | | | |
|---|---|---|---|
| CF$_2$=CH— | | VFF— | |
| CF$_2$=CHC$_n$H$_{2n}$— | | VFFn- | |

| 2) Ring Structure —An— | Symbol | 4) Right Terminal Group —X | Symbol |
|---|---|---|---|
|  | B | —F | —F |
| 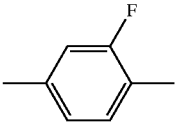 | B(F) | —Cl | —CL |
| 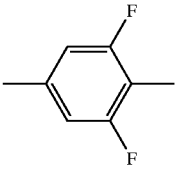 | B(F, F) | —CN | —C |
|  | H | —CF$_3$ | —CF3 |
|  | Ch | —OCF$_3$ | —OCF3 |
| 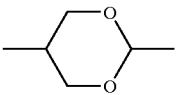 | G | —OCF$_2$H | —OCF2H |
| 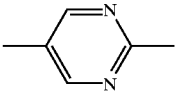 | Py | —C$_n$H$_{2n+1}$ | -n |
|  | B(2F, 3F) | —OC$_n$H$_{2n+1}$ | —On |
| 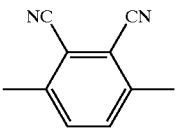 | B(2CN, 3CN) | —COOCH$_3$ | -EMe |
| 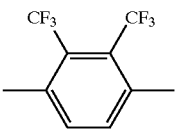 | B(2CF3, 3CF3) | —C$_n$H$_{2n}$CH=CH$_2$ | -nV |
| | | —C$_m$H$_{2m}$CH=CHC$_n$H$_{2n+1}$ | -mVn |
| | | —CH=CF$_2$ | -VFF |
| | | C$_n$H$_{2n}$CH=CF$_2$ | -nVFF |

5) Examples of Description

Example 1 3-H2B(F, F)B(F)-F

TABLE 1-continued

Method for Description of Compounds Using Symbols
R—(A1)—Z1----Zn—(An)—X

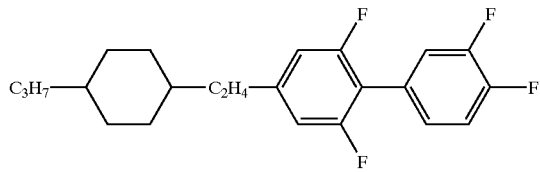

Example 2  2CF2O-B(F)BB-Cl

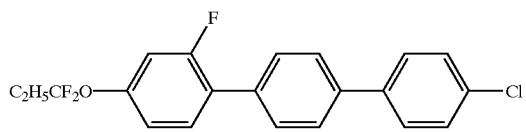

Example 3  3-GHEB(F, F)-F

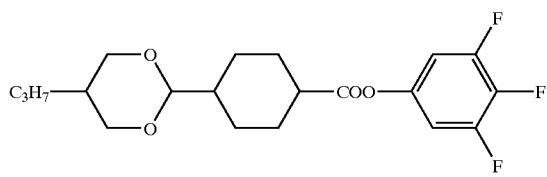

Representative compositions of this invention are summarized in Composition Examples 1 to 21. The compounds which are components of a composition are first shown with their respective amounts (weight percent). For example, "4.0%" in Composition Example 1 stands for 4.0 weight percent. A symbol of "." in 4.0% is a decimal point. The compounds are presented by the symbols of a left terminal group, a bonding group, a ring structure, and a right terminal group, according to the rules in Table 1 described above. Configuration of 1,4-cyclohexylene and 1,3-dioxane-2,5-diyl is trans. No symbol of a terminal group means that the terminal group is hydrogen. Next, physical properties of the composition are shown. The physical properties were measured based on the method described in the Standard of Electric Industries Association of Japan, EIAJ ED-2521A.

Phase transition temperature of nematic-isotropic liquid (NI; ° C.): A sample was placed on a hot plate of a melting point apparatus equipped with a polarization microscope and was heated at the rate of 1° C. per minute. The temperature was measured when a part of the sample began to change from a nematic phase to isotropic liquid.

Viscosity ($\eta$; Measured at 20° C.; mPa·s): E-type rotary viscometer was used for the measurement of viscosity.

Optical Anisotropy (Refractive Index Anisotropy; $\Delta n$; measured at 25° C.): Optical anisotropy was measured using Abbe refractometer by the aid of light having wavelength of 589 nanometers.

Dielectric Anisotropy ($\Delta\epsilon$; Measured at 25° C.)
1) Composition Having a Value of Positive $\Delta\epsilon$: A sample was poured into a liquid crystal cell in which the gap between two glass plates is 9 micrometers and a twist angle is 80 degrees. A dielectric constant ($\epsilon\|$) that is parallel to a liquid crystal molecule was measured by applying 20 volt to the cell. A dielectric constant ($\epsilon\perp$) that is perpendicular to a liquid crystal molecule was measured by applying 0.5 volt. A value of dielectric anisotropy was calculated from the formula: $\Delta\epsilon=\epsilon\|-\epsilon\perp$.

2) Composition having a value of negative $\Delta\epsilon$: A sample was poured into a liquid crystal cell having homeotropic alignment and a dielectric constant ($\epsilon\|$) was measured by applying 0.5 volt. A sample was poured into a liquid crystal cell having homogeneous alignment and a dielectric constant ($\epsilon\perp$) was measured by applying 0.5 volt. A value of dielectric anisotropy was calculated from the formula: $\Delta\epsilon=\epsilon\|-\epsilon\perp$.

Threshold Voltage (Vth; Measured at 25° C; volt): A sample was poured into a liquid crystal display element with a normally white mode, in which the gap between two glass plates was (0.5/$\Delta n$) micrometer and a twist angle was 80 degree. $\Delta n$ is a value of optical anisotropy measured by the method described above. Rectangle waves with a frequency of 32 Hz were applied to the element. Voltage of the rectangle waves was increased and a value of the voltage was measured when the transmission of light passing through the element became 90%.

| Composition Example 1 | |
|---|---|
| 3-HHCF2OB(2CF3, 3CF3)-O1 | 4.0% |
| 3-HEB-O4 | 28.0% |
| 4-HEB-O2 | 20.0% |
| 5-HEB-O1 | 20.0% |
| 3-HEB-O2 | 18.0% |
| 5-HEB-O2 | 10.0% |
| NI = 75.3 (° C.); $\eta$ = 21.1 (mPa . s); $\Delta n$ = 0.088. | |

| Composition Example 2 | |
|---|---|
| 3-HB(2CF3, 3CF3)-O2 | 12.0% |
| 5-HB(2CF3, 3CF3)-O2 | 11.0% |
| 3-HH-2 | 5.0% |

-continued

| | |
|---|---|
| 3-HH-4 | 6.0% |
| 3-HH-O1 | 4.0% |
| 3-HH-O3 | 5.0% |
| 5-HH-O1 | 4.0% |
| 3-HHB(2F, 3F)-O2 | 14.0% |
| 5-HHB(2F, 3F)-O2 | 15.0% |
| 3-HHB(2F, 3F)-2 | 24.0% |

NI = 93.0 (° C.); $\Delta n = 0.074$; $\Delta \epsilon = -4.5$.

Composition Example 3

| | |
|---|---|
| 3-HHB(2CF3, 3CF3)-O2 | 12.0% |
| 5-HHB(2CF3, 3CF3)-O2 | 13.0% |
| 3-HH-5 | 5.0% |
| 3-HH-4 | 5.0% |
| 3-HH-O1 | 6.0% |
| 3-HH-O3 | 6.0% |
| 3-HB-O1 | 5.0% |
| 3-HB-O2 | 5.0% |
| 3-HB(2F, 3F)-O2 | 10.0% |
| 5-HB(2F, 3F)-O2 | 10.0% |
| 3-HHB(2F, 3F)-2 | 4.0% |
| 2-HHB(2F, 3F)-1 | 4.0% |
| 3-HHEH-3 | 5.0% |
| 3-HHEH-5 | 5.0% |
| 4-HHEH-3 | 5.0% |

Composition Example 4

| | |
|---|---|
| 3-BCF2OB(2CF3, 3CF3)-O1 | 12.0% |
| 3-BB(2F, 3F)-O4 | 10.0% |
| 5-BB(2F, 3F)-O4 | 10.0% |
| 2-BB(2F, 3F)B-3 | 25.0% |
| 3-BB(2F, 3F)B-5 | 13.0% |
| 5-BB(2F, 3F)B-5 | 14.0% |
| 5-BB(2F, 3F)B-7 | 16.0% |

NI = 70.5 (° C.); $\Delta n = 0.198$; $\Delta \epsilon = -3.5$.

Composition Example 5

| | |
|---|---|
| 3-HHEB(2CF3, 3CF3)-O1 | 9.0% |
| 3-HHBB(2CF3, 3CF3)-O1 | 7.0% |
| 3-HB-O1 | 15.0% |
| 3-HB-O2 | 6.0% |
| 3-HEB(2F, 3F)-O2 | 9.0% |
| 4-HEB(2F, 3F)-O2 | 9.0% |
| 2-BB2B-O2 | 6.0% |
| 3-BB2B-O2 | 6.0% |
| 5-BB2B-O1 | 6.0% |
| 5-BB2B-O2 | 6.0% |
| 1-B2BB(2F)-5 | 7.0% |
| 3-B2BB(2F)-5 | 7.0% |
| 5-B(F)BB-O2 | 7.0% |

NI = 91.3 (° C.); $\eta = 35.1$ (mPa·s); $\Delta n = 0.151$.

Composition Example 6

| | |
|---|---|
| 3-HB(2CF3, 3CF3)-O2 | 16.0% |
| 5-HB(2CF3, 3CF3)-O2 | 21.0% |
| 3-HHB(2CF3, 3CF3)-O2 | 14.0% |
| 5-HHB(2CF3, 3CF3)-O2 | 20.0% |
| 3-HH-O1 | 8.0% |
| 5-HH-O1 | 4.0% |
| 3-HH-4 | 5.0% |
| 2-HHB(2F, 3F)-1 | 5.0% |
| 3-HHB(2F, 3F)-1 | 7.0% |

NI = 39.6 (° C.); $\Delta n = 0.056$; $\Delta \epsilon = -5.8$.

Composition Example 7

| | |
|---|---|
| 3-HCF2OB(2CF3, 3CF3)-O2 | 12.0% |
| 3-HHCF2OB(2CF3, 3CF3)-O2 | 13.0% |
| 3-HB-Cl | 15.0% |
| 3-HH-4 | 5.0% |
| 5-HB(2F, 3F)-O2 | 12.0% |
| 2-HHB(2F, 3F)-1 | 12.0% |
| 3-HHB(2F, 3F)-1 | 12.0% |
| 5-HHB(2F, 3F)-O2 | 13.0% |
| 3-HHB-1 | 6.0% |

NI = 74.1 (° C.); $\eta = 51.4$ (mPa·s); $\Delta n = 0.084$; $\Delta \epsilon = -3.6$.

Composition Example 8

| | |
|---|---|
| 3-HHB(2CF3, 3CF3)-O1 | 3.0% |
| 5-HHB(2CF3, 3CF3)-O1 | 3.0% |
| 3-HH1OB(2CF3, 3CF3)-O1 | 3.0% |
| 5-HH1OB(2CF3, 3CF3)-O2 | 3.0% |
| 3-HB-O1 | 15.0% |
| 3-HH-4 | 5.0% |
| 3-HB(2F, 3F)-O2 | 12.0% |
| 5-HB(2F, 3F)-O2 | 12.0% |
| 2-HHB(2F, 3F)-1 | 12.0% |
| 3-HHB(2F, 3F)-O2 | 13.0% |
| 5-HHB(2F, 3F)-O2 | 13.0% |
| 6-HEB(2F, 3F)-O2 | 6.0% |

Composition Example 9

| | |
|---|---|
| 3-HBB(2CF3, 3CF3)-O1 | 3.0% |
| 3-HB-O2 | 20.0% |
| 1O1-HH-3 | 6.0% |
| 1O1-HH-5 | 5.0% |
| 3-HH-EMe | 12.0% |
| 4-HEB-O1 | 9.0% |
| 4-HEB-O2 | 7.0% |
| 5-HEB-O1 | 8.0% |
| 3-HHB-1 | 6.0% |
| 3-HHB-3 | 6.0% |
| 6-HEN-O4 | 3.0% |
| 3-HEN-O5 | 4.0% |
| 4-HEN-O5 | 3.0% |
| 5-HEN-O5 | 2.0% |
| 2-HBEN-O2 | 2.0% |
| 4-HBEN-O4 | 4.0% |

Composition Example 10

| | |
|---|---|
| 3-HCF2OB(2CF3, 3CF3)-O2 | 3.0% |
| 3-HHCF2OB(2CF3, 3CF3)-O1 | 3.0% |
| 1V2-BEB(F, F)-C | 5.0% |
| 3-HB-C | 20.0% |
| V2-HB-C | 6.0% |
| 1-BTB-3 | 5.0% |
| 2-BTB-1 | 10.0% |
| 3-HH-4 | 11.0% |
| 3-HHB-1 | 11.0% |
| 3-H2BTB-2 | 4.0% |
| 3-H2BTB-3 | 4.0% |
| 3-H2BTB-4 | 4.0% |
| 3-HB(F)TB-2 | 6.0% |
| 3-HB(F)TB-3 | 5.0% |
| 3-HHB-C | 3.0% |

NI = 88.4 (° C.); $\eta = 19.9$ (mPa·s); $\Delta n = 0.161$; $\Delta \epsilon = 6.7$; Vth = 2.14 (V).

Composition Example 11

| | |
|---|---|
| 3-BCF2OB(2CF3, 3CF3)-O1 | 4.0% |
| 3-HBCF2OB(2CF3, 3CF3)-O1 | 4.0% |
| 2-BEB(F)-C | 5.0% |
| 3-BEB(F)-C | 4.0% |
| 4-BEB(F)-C | 12.0% |
| 1V2-BEB(F, F)-C | 16.0% |
| 3-HB-O2 | 6.0% |
| 3-HH-4 | 3.0% |
| 3-HHB-F | 3.0% |
| 3-HHB-1 | 4.0% |
| 3-HHB-O1 | 4.0% |
| 3-HBEB-F | 4.0% |
| 3-HHEB-F | 7.0% |
| 5-HHEB-F | 7.0% |
| 3-H2BTB-2 | 4.0% |
| 3-H2BTB-3 | 4.0% |
| 3-H2BTB-4 | 4.0% |
| 3-HB(F)TB-2 | 5.0% |

NI = 81.3 (° C.); $\eta = 46.8$ (mPa·s); $\Delta n = 0.141$; $\Delta \epsilon = 27.5$; Vth = 1.06 (V).

Composition Example 12

| | |
|---|---|
| 5-HB(2CF3, 3CF3)-O2 | 10.0% |
| 3-HHB(2CF3, 3CF3)-O2 | 10.0% |
| 2-HB-C | 5.0% |
| 3-HB-C | 12.0% |
| 3-HB-O2 | 5.0% |
| 2-BTB-1 | 3.0% |
| 3-HHB-1 | 8.0% |
| 3-HHB-F | 4.0% |

| -continued | |
|---|---|
| 3-HHB-Cl | 5.0% |
| 3-HHB-3 | 4.0% |
| 3-HHEB-F | 4.0% |
| 5-HHEB-F | 4.0% |
| 2-HHB(F)-F | 7.0% |
| 3-HHB(F)-F | 7.0% |
| 5-HHB(F)-F | 7.0% |
| 3-HHB(F, F)-F | 5.0% |
| Composition Example 13 | |
| 3-HB(2CF3, 3CF3)-O2 | 3.0% |
| V2-HB-C | 12.0% |
| 1V2-HB-C | 12.0% |
| 3-HB-C | 24.0% |
| 3-HB(F)-C | 5.0% |
| 2-BTB-1 | 2.0% |
| 3-HH-4 | 5.0% |
| 3-HH-VFF | 6.0% |
| 2-HHB-C | 3.0% |
| 3-HHB-C | 6.0% |
| 3-HB(F)TB-2 | 8.0% |
| 3-H2BTB-2 | 5.0% |
| 3-H2BTB-3 | 5.0% |
| 3-H2BTB-4 | 4.0% |
| NI = 86.7 (° C.); η = 20.6 (mPa · s); Δn = 0.155; Δε = 8.6; Vth = 2.00 (V). | |
| Composition Example 14 | |
| 3-HHB(2CF3, 3CF3)-O2 | 3.0% |
| 5-HHB(2CF3, 3CF3)-O2 | 3.0% |
| 3-HBB(2CF3, 3CF3)-O1 | 3.0% |
| 1V2-BEB(F, F)-C | 6.0% |
| 3-HB-C | 18.0% |
| 2-BTB-1 | 10.0% |
| 5-HH-VFF | 30.0% |
| 1-BHH-VFF | 8.0% |
| 1-BHH-2VFF | 2.0% |
| 3-H2BTB-2 | 5.0% |
| 3-H2BTB-3 | 4.0% |
| 3-H2BTB-4 | 4.0% |
| 3-HHB-1 | 4.0% |
| Composition Example 15 | |
| 3-HHEB(2CF3, 3CF3)-O1 | 3.0% |
| 3-HH1OB(2CF3, 3CF3)-O1 | 3.0% |
| 5-HH1OB(2CF3, 3CF3)-O2 | 3.0% |
| 5-HBCF2OB(F, F)-C | 3.0% |
| 5-HB(F, F)CF2OB(F, F)-C | 3.0% |
| 3-HB-C | 18.0% |
| 2-BTB-1 | 10.0% |
| 5-HH-VFF | 30.0% |
| 1-BHH-VFF | 8.0% |
| 1-BHH-2VFF | 2.0% |
| 3-H2BTB-2 | 5.0% |
| 3-H2BTB-3 | 4.0% |
| 3-H2BTB-4 | 4.0% |
| 3-HHB-1 | 4.0% |
| Composition Example 16 | |
| 3-HCF2OB(2CF3, 3CF3)-O1 | 4.0% |
| 3-HHCF2OB(2CF3, 3CF3)-O1 | 4.0% |
| 3-HB-CL | 16.0% |
| 3-HH-4 | 12.0% |
| 3-HH-5 | 4.0% |
| 3-HHB-F | 4.0% |
| 3-HHB-CL | 3.0% |
| 4-HHB-CL | 4.0% |
| 3-HHB(F)-F | 10.0% |
| 4-HHB(F)-F | 9.0% |
| 5-HHB(F)-F | 9.0% |
| 5-HBB(F)-F | 4.0% |
| 5-HBBH-1O1 | 3.0% |
| 3-HHB(F, F)-F | 2.0% |
| 4-HHB(F, F)-F | 3.0% |
| 5-HHB(F, F)-F | 3.0% |
| 3-HH2BB(F, F)-F | 3.0% |
| 4-HH2BB(F, F)-F | 3.0% |
| NI = 111.0 (° C.); η = 23.9 (mPa · s); Δn = 0.090; Δε = 2.8; Vth = 3.06 (V). | |

| -continued | |
|---|---|
| Composition Example 17 | |
| 3-HB(2CF3, 3CF3)-O2 | 5.0% |
| 5-HHB(2CF3, 3CF3)-O2 | 5.0% |
| 5-HB-F | 12.0% |
| 6-HB-F | 9.0% |
| 7-HB-F | 7.0% |
| 2-HHB-OCF3 | 7.0% |
| 3-HHB-OCF3 | 7.0% |
| 4-HHB-OCF3 | 7.0% |
| 5-HHB-OCF3 | 5.0% |
| 3-HH2B-OCF3 | 4.0% |
| 5-HH2B-OCF3 | 4.0% |
| 3-HHB(F, F)-OCF3 | 5.0% |
| 3-HBB(F)-F | 10.0% |
| 3-HB2B(F)-F | 3.0% |
| 3-HB(F)BH-3 | 3.0% |
| 5-HBBH-3 | 3.0% |
| 3-HHB(F, F)-OCF2H | 4.0% |
| Composition Example 18 | |
| 3-HH2B(2CF3, 3CF3)-O1 | 2.0% |
| 5-HH2B(2CF3, 3CF3)-O2 | 2.0% |
| 3-HH1OB(2CF3, 3CF3)-O1 | 2.0% |
| 5-HH1OB(2CF3, 3CF3)-O2 | 2.0% |
| 7-HB(F)-F | 5.0% |
| 5-H2B(F)-F | 5.0% |
| 3-HB-O2 | 10.0% |
| 3-HH-4 | 5.0% |
| 2-HHB(F)-F | 10.0% |
| 3-HHB(F)-F | 10.0% |
| 5-HHB(F)-F | 10.0% |
| 3-H2HB(F)-F | 5.0% |
| 2-HBB(F)-F | 3.0% |
| 3-HBB(F)-F | 3.0% |
| 5-HBB(F)-F | 6.0% |
| 2-H2BB(F)-F | 5.0% |
| 3-H2BB(F)-F | 6.0% |
| 3-HHB-O1 | 5.0% |
| 3-HHB-3 | 4.0% |
| Composition Example 19 | |
| 3-BCF2OB(2CF3, 3CF3)-O1 | 5.0% |
| 7-HB(F, F)-F | 5.0% |
| 3-H2HB(F, F)-F | 12.0% |
| 4-H2HB(F, F)-F | 6.0% |
| 3-HHB(F, F)-F | 10.0% |
| 3-HBB(F, F)-F | 10.0% |
| 3-HHEB(F, F)-F | 10.0% |
| 4-HHEB(F, F)-F | 3.0% |
| 5-HHEB(F, F)-F | 3.0% |
| 2-HBEB(F, F)-F | 3.0% |
| 3-HBEB(F, F)-F | 5.0% |
| 5-HBEB(F, F)-F | 3.0% |
| 3-HGB(F, F)-F | 15.0% |
| 3-HBCF2OB-OCF3 | 4.0% |
| 3-HHBB(F, F)-F | 6.0% |
| NI = 69.7 (° C.); η = 36.3 (mPa · s); Δn = 0.084; Δε = 12.3; Vth = 1.45 (V). | |
| Composition Example 20 | |
| 3-HHEB(2CF3, 3CF3)-O1 | 4.0% |
| 3-HHBB(2CF3, 3CF3)-O1 | 4.0% |
| 7-HB(F)-F | 7.0% |
| 5-HB-CL | 3.0% |
| 3-HH-4 | 9.0% |
| 3-HH-EMe | 23.0% |
| 3-HHEB(F, F)-F | 10.0% |
| 4-HHEB(F, F)-F | 5.0% |
| 3-HHEB-F | 8.0% |
| 4-HGB(F, F)-F | 5.0% |
| 5-HGB(F, F)-F | 6.0% |
| 2-H2GB(F, F)-F | 4.0% |
| 3-H2GB(F, F)-F | 5.0% |
| 5-GHB(F, F)-F | 7.0% |
| NI = 78.6 (° C.); η = 27.3 (mPa · S); Δn = 0.064; Δε = 4.6; Vth = 2.03 (V). | |

-continued

Composition Example 21

| | |
|---|---|
| 5-HB(2CF3, 3CF3)-O2 | 5.0% |
| 3-HHB(2CF3, 3CF3)-O2 | 8.0% |
| 5-HHB(2CF3, 3CF3)-O2 | 11.0% |
| 3-HB(F, F)CF2OB(F, F)-F | 15.0% |
| 3-BB(F, F)CF2OB(F, F)-F | 15.0% |
| 3-HBB(F, F)-F | 15.0% |
| 5-HBB(F, F)-F | 12.0% |
| 3-HHB(F, F)-F | 8.0% |
| 2-HHBB(F, F)-F | 3.0% |
| 3-HHBB(F, F)-F | 5.0% |
| 5-HHBB(F, F)-F | 3.0% |

In Composition Example 10 described above, when the optically active compound (Op-4) of 0.8 wt % based on the composition was added to the composition, the value of the pitch was 11.3 micrometers. In Composition Example 19 described above, when the optically active compound (Op-5) of 0.25 wt % based on the composition was added to the composition, the value of the pitch was 62.3 micrometers.

Effect of the Invention

The liquid crystal compound of this invention is stable chemically and has excellent miscibility with other liquid crystal compounds, large and negative dielectric anisotropy, and proper optical anisotropy. The composition comprising the compound has large specific resistance and a large voltage holding ratio, and the composition is useful for a liquid crystal display element.

What is claimed is:

1. A liquid crystal compound represented by formula (1):

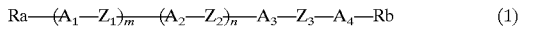

wherein Ra and Rb independently are alkyl having 1 to 20 carbons, any —$CH_2$— in the alkyl may be replaced by —O—, —S—, —CH=CH—, or —C≡C—, and any hydrogen may be replaced by halogen; $A_1$, $A_2$, $A_3$, and $A_4$ independently are 1,4-cyclohexylene, 1,4-cyclohexenylene, 1,3-dioxane-2,5-diyl, 1,4-phenylene, pyridine-2,5-idiyl, pyrimidine-2,5-diyl, pyridazine-3,6-diyl, or 2,3-bis(trifluoromethyl)-1,4-phenylene, any hydrogen in these rings may be replaced by halogen, and at least one of $A_1$, $A_2$, $A_3$, and $A_4$ is 2,3-bis(trifluoromethyl)-1,4-phenylene; $Z_1$, $Z_2$ and $Z_3$ independently are a single bond, —$(CH_2)_2$—, —$(CF_2)_2$—, —COO—, —OCO—, —$CH_2O$—, —$OCH_2$—, —$CF_2O$—, —$OCF_2$—, —CH=CH—, —CF=CF—, —C≡C—, —$(CH_2)_4$—, —$(CH_2)_3O$—, or —$O(CH_2)_3$—; m and n independently are 0 or 1.

2. The compound according to claim 1 wherein m and n are 0 in formula (1) described in claim 1.

3. The compound according to claim 1 wherein m is 0 and n is 1 in formula (1) described in claim 1.

4. The compound according to claim 1 wherein m is 1 and n is 1 in formula (1) described in claim 1.

5. The compound according to claim 1 wherein Ra and Rb independently are alkyl having 1 to 20 carbons, alkoxy having 1 to 19 carbons or alkenyl having 2 to 21 carbons.

6. The compound according to claim wherein Ra and Rb independently are alkyl having 1 to 20 carbons, alkoxy having 1 to 19 carbons or alkenyl having 2 to 21 carbons; and $Z_1$, $Z_2$ and $Z_3$ independently are a single bond, —$(CH_2)_2$—, —$(CH_2)_4$—, —$CF_2O$—, or —$OCF_2$—.

7. The compound according to claim 6 wherein at least one of $Z_1$, $Z_2$ and $Z_3$ is —$CF_2O$—.

8. A compound represented by formulas (a) to (m):

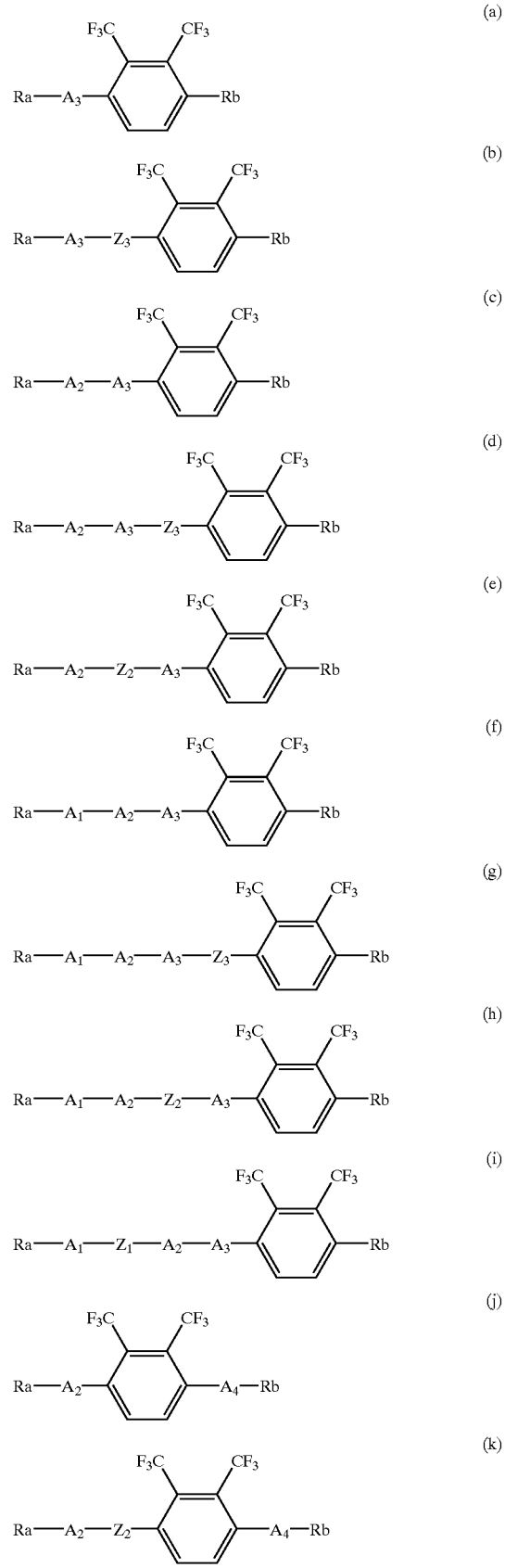

-continued

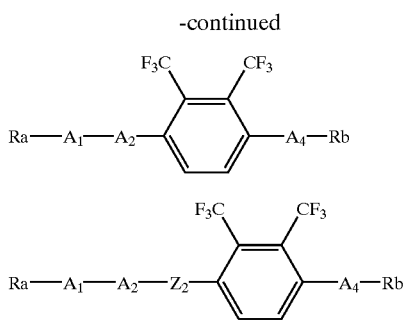

wherein Ra and Rb independently are alkyl having 1 to 20 carbons, any —CH₂— in the alkyl may be replaced by —O— or —CH=CH—, and any hydrogen may be replaced by halogen; $A_1$, $A_2$, $A_3$, and $A_4$ independently are 1,4-cyclohexylene, 1,4-cyclohexenylene, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, 2,3,5,6-tetrafluoro-1,4-phenylene, pyridine-2,5-diyl, 3-fluoropyridine-2,5-diyl, pyrimidine-2,5-diyl, pyridazine-3,6-diyl, or 2,3-bis(trifluoromethyl)-1,4-phenylene, and at least one of $A_1$, $A_2$, $A_3$, and $A_4$ is 2,3-bis(trifluoromethyl)-1,4-phenylene; and $Z_1$, $Z_2$ and $Z_3$ independently are a single bond, —(CH₂)₂—, —(CF₂)₂—, —COO—, —OCO—, —CH₂O—, —OCH₂—, —CF₂O—, —OCF₂—, —CH=CH—, —CF=CF—, —C≡C—, —(CH₂)₄—, —(CH₂)₃O—, or —O(CH₂)₃—.

9. A liquid crystal composition comprising at least one compound described in claim 1.

10. The composition according to claim 9, further comprising at least one compound selected from the group consisting of the compounds represented by formulas (2), (3) and (4):

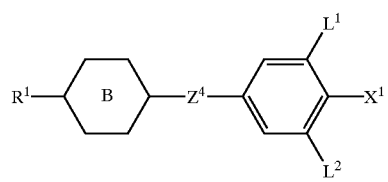

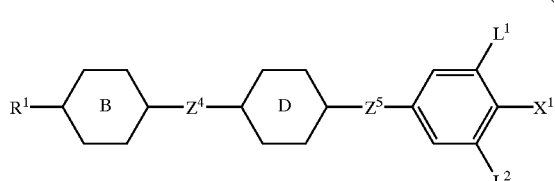

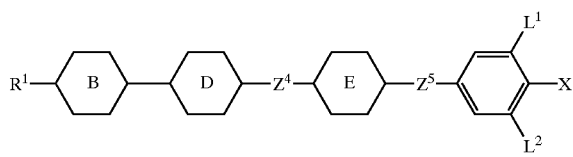

wherein $R^1$ is alkyl having 1–10 carbons, any —CH₂— in the alkyl may be replaced by —O— or —CH=CH—, and any hydrogen may be replaced by fluorine; $X^1$ is fluorine, chlorine, —OCF₃, —OCHF₂, —CF₃, —CHF₂, —CH₂F, —OCF₂CHF₂, or —OCF₂CHFCF₃; rings B and D independently are 1,4-cyclohexylene, 1,3-dioxane-2,5-diyl or 1,4-phenylene in which any hydrogen may be replaced by fluorine;

ring E is 1,4-cyclohexylene or 1,4-phenylene in which any hydrogen may be replaced by fluorine; and $Z^4$ and $Z^5$ independently are —(CH₂)₂—, —(CH₂)₄—, —COO—, —CF₂O—, —OCF₂—, —CH=CH—, or a single bond; and $L^1$ and $L^2$ independently are hydrogen or fluorine.

11. The composition according to claim 9, further comprising at least one compound selected from the group consisting of the compounds represented by formulas (5) and (6):

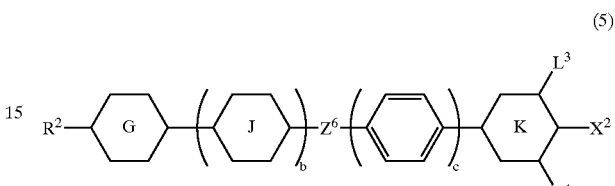

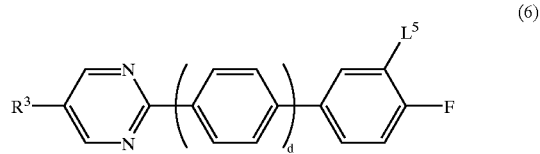

wherein $R^2$ and $R^3$ independently are alkyl having 1 to 10 carbons, any —CH₂— in the alkyl may be replaced by —O— or —CH=CH— and any hydrogen may be replaced by fluorine; $X^2$ is —CN or —C≡C—CN; ring G is 1,4-cyclohexylene, 1,4-phenylene, 1,3-dioxane-2,5-diyl, or pyrimidine-2,5-diyl; ring J is 1,4-cyclohexylene, pyrimidine-2,5-diyl or 1,4-phenylene in which any hydrogen may be replaced by fluorine; ring K is 1,4-cyclohexylene or 1,4-phenylene; $Z^6$ is —(CH₂)₂—, —COO—, —CF₂O—, —OCF₂—, or a single bond; $L^3$, $L^4$ and $L^5$ independently are hydrogen or fluorine; and b, c and d independently are 0 or 1.

12. The composition according to claim 9, further comprising at least one compound selected from the group consisting of the compounds represented by formulas (7), (8) and (9):

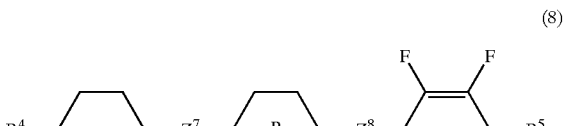

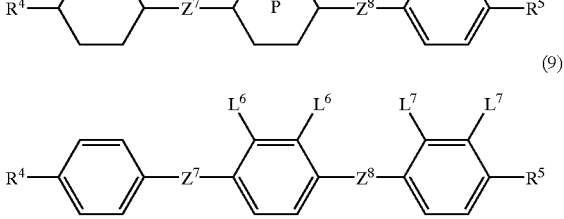

wherein $R^4$ and $R^5$ independently are alkyl having 1 to 10 carbons, any —CH₂— in the alkyl may be replaced by —O— or —CH=CH—, and any hydrogen may be replaced by fluorine; rings M and P independently are 1,4-cyclohexylene or 1,4-phenylene; $Z^7$ and $Z^8$ independently are —(CH$_2$)$_2$—, —COO— or a single bond; L$^6$ and L$^7$ independently are hydrogen or fluorine, and at least one of L$^6$ and L$^7$ is fluorine.

13. The composition according to claim 10, further comprising at least one compound selected from the group consisting of the compounds represented by formulas (10), (11) and (12):

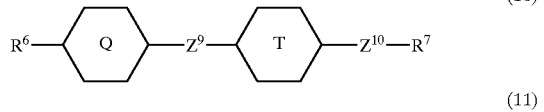
(10)

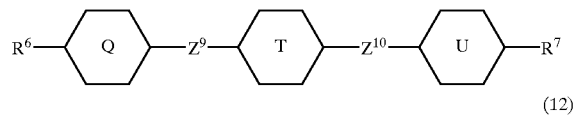
(11)

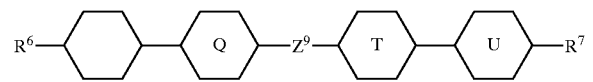
(12)

wherein R$^6$ and R$^7$ independently are alkyl having 1 to 10 carbons, any —CH$_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; Z$^9$ and Z$^{10}$ independently are —C≡C—, —COO—, —(CH$_2$)$_2$—, —CH=CH—, or a single bond. a single bond.

14. The composition according to claim 11, further comprising at least one compound selected from the group consisting of the compounds represented by formulas (10), (11) and (12):

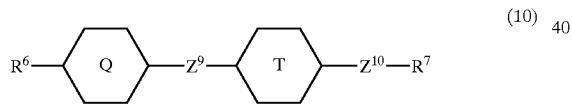
(10)

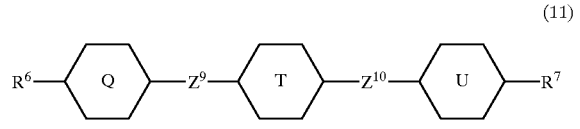
(11)

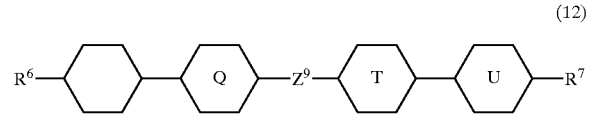
(12)

wherein R$^6$ and R$^7$ independently are alkyl having 1 to 10 carbons, any —CH$_2$— in the alkyl may be replaced by —O— or —CH=CH —, and any hydrogen may be replaced by fluorine; rings Q, T and U independently are 1,4-cyclohexylene, pyrimidine-2,5-diyl or 1,4-phenylene in which any hydrogen may be replaced by fluorine; Z$^9$ and Z$^{10}$ independently are —C≡C—, —COO—, —(CH$_2$)$_2$—, —CH=CH—, or a single bond.

15. The composition according to claim 12, further comprising at least one compound selected from the group consisting of the compounds represented by formulas (10), (11) and (12):

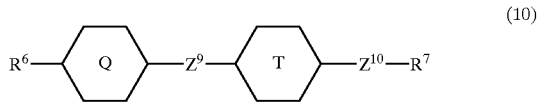
(10)

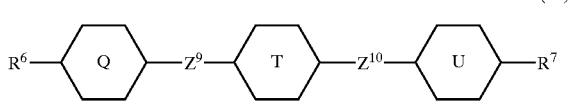
(11)

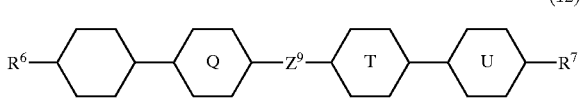
(12)

wherein R$^6$ and R$^7$ independently are alkyl having 1 to 10 carbons, any —CH$_2$— in the alkyl may be replaced by —O— or —CH=CH—, and any hydrogen may be replaced by fluorine; rings Q, T and U independently are 1,4-cyclohexylene, pyrimidine-2,5-diyl or 1,4-phenylene in which any hydrogen may be replaced by fluorine; Z$^9$ and Z$^{10}$ independently are —C≡C—, —COO—, —(CH$_2$)$_2$—, —CH=CH—, or a single bond.

16. The composition according to claim 13, further comprising at least one compound selected from the group consisting of the compounds represented by formulas (5) and (6):

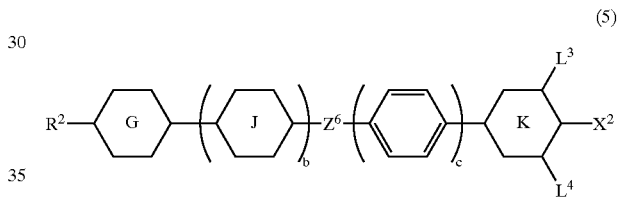
(5)

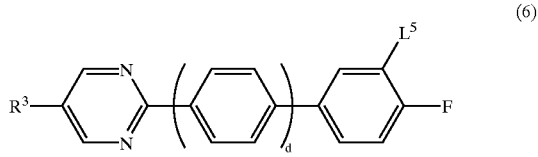
(6)

wherein R$^2$ and R$^3$ independently are alkyl having 1 to 10 carbons, any —CH$_2$— in the alkyl may be replaced by —O— or —CH=CH— and any hydrogen may be replaced by fluorine; X$^2$ is —CN or —C≡C—CN; ring G is 1,4-cyclohexylene, 1,4-phenylene, 1,3-dioxane-2,5-diyl, or pyrimidine-2,5-diyl; ring J is 1,4-cyclohexylene, pyrimidine-2,5-diyl or 1,4-phenylene in which any hydrogen may be replaced by fluorine; ring K is 1,4-cyclohexylene or 1,4-phenylene; Z$^6$ is —(CH$_2$)$_2$—, —COO—, —CF$_2$O—, —OCF$_2$—, or a single bond; L$^3$, L$^4$ and L$^5$ independently are hydrogen or fluorine; and b, c and d independently are 0 or 1.

17. The composition according to claim 9, further comprising at least one optically active compound.

18. A liquid crystal display element comprising the composition described in claim 9.

19. The compound according to claim 2 wherein Ra and Rb independently are alkyl having 1 to 20 carbons, alkoxy having 1 to 19 carbons or alkenyl having 2 to 21 carbons.

20. The compound according to claim 3 wherein Ra and Rb independently are alkyl having 1 to 20 carbons, alkoxy having 1 to 19 carbons or alkenyl having 2 to 21 carbons.

21. compound according to claim 4 wherein Ra and Rb independently are alkyl having 1 to 20 carbons, alkoxy having 1 to 19 carbons or alkenyl having 2 to 21 carbons.

22. The compound according to claim 3 wherein Ra and Rb independently are alkyl having 1 to 20 carbons, alkoxy having 1 to 19 carbons or alkenyl having 2 to 21 carbons; and $Z_1$, $Z_2$ and $Z_3$ independently are a single bond, $-(CH_2)_2-$, $-(CH_2)_4-$, $-CF_2O-$, or $-OCF_2-$.

23. The compound according to claim 4 wherein Ra and Rb independently are alkyl having 1 to 20 carbons, alkoxy having 1 to 19 carbons or alkenyl having 2 to 21 carbons; and $Z_1$, $Z_2$ and $Z_3$ independently are a single bond, $-(CH_2)_2-$, $-(CH_2)_4-$, $-CF_2O-$, or $-OCF_2-$.

24. The compound according to claim 22 wherein at least one of $Z_1$, $Z_2$ and $Z_3$ is $-CF_2O-$.

25. The compound according to claim 23 wherein at least one of $Z_1$, $Z_2$ and $Z_3$ is $-CF_2O-$.

26. A liquid crystal display element comprising the composition described in claim 10.

27. A liquid crystal display element comprising the composition described in claim 11.

28. A liquid crystal display element comprising the composition described in claim 12.

29. A liquid crystal display element comprising the composition described in claim 13.

30. A liquid crystal display element comprising the composition described in claim 14.

31. A liquid crystal display element comprising the composition described in claim 15.

32. A liquid crystal display element comprising the composition described in claim 16.

* * * * *